US012782287B2

(12) United States Patent
LaChapelle et al.

(10) Patent No.: US 12,782,287 B2
(45) Date of Patent: *Nov. 3, 2026

(54) RAMAN SPECTROSCOPY SYSTEM

(71) Applicant: Haemanthus, Inc., Austin, TX (US)

(72) Inventors: Joseph G. LaChapelle, Philomath, OR (US); Roger S. Cannon, Oviedo, FL (US)

(73) Assignee: Haemanthus, Inc., Austin, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 18/930,095

(22) Filed: Oct. 29, 2024

(65) Prior Publication Data

US 2025/0277744 A1 Sep. 4, 2025

Related U.S. Application Data

(63) Continuation of application No. 18/762,412, filed on Jul. 2, 2024, now Pat. No. 12,203,862.

(Continued)

(51) Int. Cl.
*G01J 3/44* (2006.01)
*G01J 3/02* (2006.01)

(Continued)

(52) U.S. Cl.
CPC ............ *G01N 21/65* (2013.01); *G01J 3/0218* (2013.01); *G01J 3/0224* (2013.01); *G01J 3/0275* (2013.01);

(Continued)

(58) Field of Classification Search
CPC ......... G01N 21/65; G01N 2201/06113; G01N 2201/0612; G01N 2201/08; G01J 3/0218;

(Continued)

(56) References Cited

U.S. PATENT DOCUMENTS

| | | | |
|---|---|---|---|
| 4,598,715 | A | 7/1986 | Machler |
| 5,106,387 | A | 4/1992 | Kittrell |

(Continued)

FOREIGN PATENT DOCUMENTS

| | | |
|---|---|---|
| CN | 112097953 | 12/2020 |
| CN | 218739076 | 3/2023 |

(Continued)

OTHER PUBLICATIONS

Lin, Y., et al. "Multi-cancer early detection based on serum surface-enhanced Raman spectroscopy with deep learning: a large-scale case-control study." BMC Medicine, vol. 23, Article No. 97, 2025, https://doi.org/10.1186/s12916-025-03887-5.

(Continued)

*Primary Examiner* — Abdullahi Nur
(74) *Attorney, Agent, or Firm* — Sprinkle IP Law Group

(57) ABSTRACT

In one embodiment, a system includes a pump light source configured to produce a pump beam of light at a pump frequency and a Stokes light source configured to produce a Stokes beam of light at a Stokes frequency, where the pump and Stokes frequencies are offset by a frequency offset Ω. The system also includes one or more optical elements configured to: direct the pump and Stokes beams of light to a sample, and collect a Raman signal produced by coherent Raman scattering of the pump and Stokes beams of light at the sample. The system further includes an optical receiver configured to detect the Raman signal. The optical receiver includes a probe light source configured to produce a probe beam of light at a probe frequency, where the probe light source includes a wavelength-tunable laser.

31 Claims, 25 Drawing Sheets

Related U.S. Application Data

(60) Provisional application No. 63/560,521, filed on Mar. 1, 2024.

(51) Int. Cl.
*G01J 3/10* (2006.01)
*G01J 3/447* (2006.01)
*G01N 21/65* (2006.01)

(52) U.S. Cl.
CPC ............... *G01J 3/10* (2013.01); *G01J 3/4412* (2013.01); *G01J 3/447* (2013.01); *G01J 2003/102* (2013.01); *G01N 2201/06113* (2013.01); *G01N 2201/0612* (2013.01); *G01N 2201/08* (2013.01)

(58) Field of Classification Search
CPC .......... G01J 3/0224; G01J 3/0275; G01J 3/10; G01J 3/4412; G01J 3/447; G01J 2003/102; G01J 3/44
See application file for complete search history.

(56) References Cited

U.S. PATENT DOCUMENTS 5,280,788 A 1/1994 Janes
5,418,797 A 5/1995 Bashkansky
5,510,895 A 4/1996 Sahagen
5,526,112 A 6/1996 Sahagen
5,565,982 A 10/1996 Lee
5,769,791 A 6/1998 Benaron
5,849,595 A 12/1998 Alfano
5,983,125 A 11/1999 Alfano
6,208,887 B1 3/2001 Clarke
6,485,413 B1 11/2002 Boppart
6,564,087 B1 5/2003 Pitris
8,873,041 B1 10/2014 Chai
9,086,533 B1 7/2015 Wach
9,594,023 B2 3/2017 Tamada
9,638,638 B2 5/2017 Huber et al.
12,618,714 B2 5/2026 LaChapelle et al.
2002/0122246 A1 9/2002 Teamey
2003/0045798 A1 3/2003 Hular
2004/0073120 A1 4/2004 Motz
2004/0127776 A1 7/2004 Walker
2004/0247268 A1 12/2004 Ishihara
2005/0203419 A1 9/2005 Ramanujam
2007/0078500 A1 4/2007 Ryan
2007/0167836 A1 7/2007 Scepanovic
2007/0239033 A1 10/2007 Teamey
2008/0037024 A1 2/2008 Backman
2008/0214940 A1 9/2008 Benaron
2008/0221456 A1 9/2008 Babchenko
2008/0267562 A1 10/2008 Wang
2008/0304074 A1 12/2008 Brennan, III
2009/0088615 A1 4/2009 Robinson
2009/0177094 A1 7/2009 Brown
2009/0185191 A1 7/2009 Boppart
2010/0020318 A1 1/2010 Lee
2010/0317964 A1 12/2010 Hendriks
2011/0218445 A1 9/2011 Braun
2011/0251494 A1 10/2011 Hendriks
2011/0270093 A1 11/2011 Desjardins
2011/0282166 A1 11/2011 Chen
2012/0029360 A1 2/2012 Hendriks
2012/0092662 A1 4/2012 Langbein
2012/0116234 A1 5/2012 Farcy
2012/0220880 A1 8/2012 Zuluaga
2012/0287428 A1 11/2012 Tamada
2013/0050683 A1 2/2013 Hendriks
2013/0217989 A1 8/2013 Hendriks
2013/0310680 A1 11/2013 Werahera
2014/0046197 A1 2/2014 Lucassen
2014/0121538 A1 5/2014 Hendriks
2014/0213911 A1 7/2014 Bierhoff
2014/0236023 A1 8/2014 Day
2014/0236024 A1 8/2014 Bierhoff
2014/0268131 A1* 9/2014 Tamada ................ G01J 3/0218
356/301
2014/0354987 A1 12/2014 Satoh
2015/0080712 A1 3/2015 Van Keersop
2015/0148629 A1 5/2015 Wilson
2015/0182206 A1 7/2015 Hendriks
2015/0204790 A1 7/2015 Yonetani
2015/0265256 A1 9/2015 Bierhoff
2015/0313471 A1 11/2015 Dholakia
2015/0359525 A1 12/2015 Hendriks
2016/0256101 A1 9/2016 Aharoni
2016/0278694 A1 9/2016 Aharoni
2016/0344158 A1 11/2016 Onose
2017/0052015 A1 2/2017 Swanson
2018/0088044 A1 3/2018 Wijbrans
2018/0238738 A1 8/2018 Alfano
2018/0323572 A1 11/2018 Mildren et al.
2020/0015684 A1 1/2020 Stone
2020/0085308 A1 3/2020 Day
2020/0124530 A1 4/2020 Stolow et al.
2021/0068665 A1 3/2021 Pahlevaninezhad
2021/0381985 A1 12/2021 Rigneault
2021/0404958 A1 12/2021 Min
2022/0015635 A1 1/2022 Sipple
2022/0042916 A1 2/2022 Notingher
2022/0155233 A1* 5/2022 Zeng ......................... G01J 3/44
2022/0202292 A1 6/2022 Anderson
2022/0317044 A1* 10/2022 Anderson .............. G01N 21/65
2022/0409100 A1 12/2022 Sipple
2023/0172443 A1 6/2023 Bec
2024/0041328 A1 2/2024 Mannion
2024/0130171 A1 4/2024 Wang
2024/0131267 A1 4/2024 Wanner
2025/0017471 A1 1/2025 Goth
2025/0134386 A1 5/2025 Puppels
2025/0277699 A1 9/2025 LaChapelle et al.
2025/0277701 A1 9/2025 LaChapelle et al.
2025/0277702 A1 9/2025 LaChapelle et al.
2025/0277742 A1 9/2025 LaChapelle et al.
2025/0277743 A1 9/2025 LaChapelle et al.
2025/0277745 A1 9/2025 LaChapelle et al.
2025/0277746 A1 9/2025 LaChapelle et al.
2026/0000341 A1 1/2026 Alix
2026/0165585 A1 6/2026 Stat et al.
2026/0165587 A1 6/2026 Cannon et al.
2026/0165616 A1 6/2026 Gupta et al.
2026/0168849 A1 6/2026 LaChapelle et al.
2026/0168850 A1 6/2026 Gupta et al.
2026/0168855 A1 6/2026 Stat et al.

FOREIGN PATENT DOCUMENTS

CN 116327138 6/2023
DE 10311452 4/2006
EP 1760424 3/2007
JP 2011180504 9/2011
JP 2015222276 12/2015
JP 2016029340 3/2016
WO WO2008144831 12/2008
WO WO2009081358 7/2009
WO WO2013084621 6/2013
WO WO2015121115 8/2015
WO WO2020075548 9/2021
WO WO2022204441 9/2022
WO WO2023/058710 4/2023

OTHER PUBLICATIONS

Chen, X., et al. "Applications of Data Characteristic AI-Assisted Raman Spectroscopy in Pathological Classification." Analytical Chemistry, vol. 96, No. 16, Apr. 23, 2024, pp. 6158-6169, https://doi.org/10.1021/acs.analchem.3c04930.
Zhang, Y., et al. "From Genotype to Phenotype: Raman Spectroscopy and Machine Learning for Label-Free Single-Cell Analysis." ACS Nano, vol. 18, No. 28, Jul. 16, 2024, pp. 18101-18117, https://doi.org/10.1021/acsnano.4c04282.

(56) References Cited

OTHER PUBLICATIONS

Belmerabet, R., et al. "Multilayered assembly of graphene oxide and silver nanoprisms on pyramidal arrays as highly efficient SERS-assisted biosensing platform." Chinese Journal of Physics, vol. 97, Oct. 2025, pp. 839-849, https://doi.org/10.1016/j.cjph.2025.07.031.
Nesbitt, D., et al. "Vibrational Energy Flow in Highly Excited Molecules: Role of Intramolecular Vibrational Redistribution." The Journal of Physical Chemistry, vol. 100, 1996, pp. 12735-12756.
Toppings, N., et al. "A rapid near-patient detection system for SARS-CoV-2 using saliva." Scientific Reports, vol. 11, Article No. 13378, 2021, https://doi.org/10.1038/s41598-021-92677-z.
Carlomagno, C., et al. "Identification of the Raman Salivary Fingerprint of Parkinson's Disease Through the Spectroscopic-Computational Combinatory Approach." Frontiers in Neuroscience, vol. 15, Oct. 26, 2021, Article 704963, https://doi.org/10.3389/fnins.2021.704963.
Ryzhikova, E., et al. "Raman spectroscopy of blood serum for Alzheimer's disease diagnostics: specificity relative to other types of dementia." Journal of Biophotonics, vol. 8, No. 7, Jul. 2015, pp. 584-596, doi: 10.1002/jbio.201400060.
Chen, C., et al. "Applications of Raman spectroscopy in the diagnosis and monitoring of neurodegenerative diseases." Frontiers in Neuroscience, vol. 18, Jan. 17, 2024, Article 1301107, https://doi.org/10.3389/fnins.2024.1301107.
Polykretis, P., et al. "Raman Spectroscopy Techniques for the Investigation and Diagnosis of Alzheimer's Disease." Frontiers in Bioscience (Scholar Edition), vol. 14, No. 3, Aug. 1, 2022, Article 22, https://doi.org/10.31083/j.fbs1403022.
Coles et al. "Molecular Insights into α-Synuclein Fibrillation: A Raman Spectroscopy and Machine Learning Approach." ACS Chemical Neuroscience, vol. 16, No. 4, Feb. 19, 2025, pp. 687-698, https://doi.org/10.1021/acschemneuro.4c00726.
Pruccoli, A., et al. "High Sensitivity Stimulated Raman Scattering Microscopy with Electronic Resonance Enhancement." ChemPhysChem, vol. 25, No. 19, Oct. 2024, https://doi.org/10.1002/cphc.202400309.
Jain et al. "Scientific Advances in Cancer Detection Using Raman Spectroscopy." Asian Pacific Journal of Cancer Prevention, vol. 25, No. 11, Nov. 1, 2024, pp. 3977-3986, https://doi.org/10.31557/APJCP.2024.25.11.3977.
Dzelve et al. "Utility of Raman Spectroscopy in Pulmonary Medicine." Advances in Respiratory Medicine, vol. 92, No. 5, 2024, pp. 421-428, https://doi.org/10.3390/arm92050038.
Khristoforova et al. "Raman spectroscopy in chronic heart failure diagnosis based on human skin analysis." Journal of Biophotonics, vol. 16, No. 7, Jul. 2023, https://doi.org/10.1002/jbio.202300016.
Thomas et al. "Raman spectroscopy assisted tear analysis: A label free, optical approach for noninvasive disease diagnostics." Experimental Eye Research, vol. 243, 2024, 109913, https://doi.org/10.1016/j.exer.2024.109913.
Hu et al. "Stimulated Raman scattering imaging by continuous-wave laser excitation." Optics Letters, vol. 38, No. 9, 2013, pp. 1479-1481, https://doi.org/10.1364/OL.38.001479.
International Search Report and Written Opinion issued for International Application No. PCT/US2024/053635, mailed Nov. 21, 2024, 6 pages.
International Search Report and Written Opinion issued for International Application No. PCT/US2025/016826, mailed May 15, 2025, 10 pages.
Wolfe, T. J., et al. "A study of major cannabinoids via Raman spectroscopy and density functional theory." Spectrochimica Acta Part A: Molecular and Biomolecular Spectroscopy, vol. 303, Jul. 11, 2023, p. 123133, https://doi.org/10.1016/j.saa.2023.123133.
Hédoux, A., et al. "Raman spectroscopy of racemic ibuprofen: Evidence of molecular disorder in phase II." International Journal of Pharmaceutics, vol. 421, No. 1, 2011, pp. 45-52, https://doi.org/10.1016/j.ijpharm.2011.09.015.
Zhang, S., et al. "Raman spectroscopy study on xylitol at low- and high-temperature conditions." Journal of Molecular Structure, vol. 1321, No. 3, 2025, p. 140032, https://doi.org/10.1016/j.molstruc.2024.140032.
Balcers, O., et al. "Study of ergocalciferol and cholecalciferol (Vitamin D): Modeled optical properties and optical detection using absorption and Raman spectroscopy." Spectrochimica Acta Part A: Molecular and Biomolecular Spectroscopy, vol. 269, 2022, p. 120725, https://doi.org/10.1016/j.saa.2021.120725.
Jenkins, C. A., et al. "A high-throughput serum Raman spectroscopy platform and methodology for colorectal cancer diagnostics." Analyst, vol. 143, No. 24, 2018, pp. 6014-6024, https://doi.org/10.1039/C8AN01323C.
Xia, Z., et al. "Giant Enhancement of Raman Scattering by a Hollow-Core Microstructured Optical Fiber Allows Single Exosome Probing." ACS Sensors, vol. 8, No. 4, 2023, pp. 1799-1809, https://doi.org/10.1021/acssensors.3c00131.
Bilal, M., et al. "Optical Screening of Female Breast Cancer from Whole Blood Using Raman Spectroscopy." Applied Spectroscopy, vol. 71, No. 5, 2017, pp. 1004-1013, https://doi.org/10.1177/0003702816667516.
Gaba, F., et al. "Raman Spectroscopy in Prostate Cancer: Techniques, Applications and Advancements." Cancers, vol. 14, No. 6, 2022, p. 1535, https://doi.org/10.3390/cancers14061535.
Xiong, C. C., et al. "Rapid and precise detection of cancers via label-free SERS and deep learning." Analytical and Bioanalytical Chemistry, vol. 415, 2023, pp. 3449-3462, https://doi.org/10.1007/s00216-023-04730-7.
Enejder, A. M. K., et al. "Blood analysis by Raman spectroscopy." Optics Letters, vol. 27, 2002, pp. 2004-2006, https://doi.org/10.1364/OL.27.002004.
Casella, M., et al. "Raman and SERS recognition of β-carotene and haemoglobin fingerprints in human whole blood." Spectrochimica Acta Part A: Molecular and Biomolecular Spectroscopy, vol. 79, No. 5, 2011, pp. 915-919, https://doi.org/10.1016/j.saa.2011.03.048.
Da Silva, A. M., et al. "Spectral model for diagnosis of acute leukemias in whole blood and plasma through Raman spectroscopy." Journal of Biomedical Optics, vol. 23, No. 10, 2018, pp. 1-11, https://doi.org/10.1117/1.JBO.23.10.107002.
Wang, Q., et al. "Simultaneous detection of glucose, triglycerides, and total cholesterol in whole blood by Fourier-Transform Raman spectroscopy." Spectrochimica Acta Part A: Molecular and Biomolecular Spectroscopy, vol. 260, 2021, p. 119906, https://doi.org/10.1016/j.saa.2021.119906.
Premasiri, W. R., et al. "Surface-Enhanced Raman Scattering of Whole Human Blood, Blood Plasma, and Red Blood Cells: Cellular Processes and Bioanalytical Sensing." The Journal of Physical Chemistry B, vol. 116, No. 31, 2012, pp. 9376-9386, https://doi.org/10.1021/jp304932g.
Gottschall, T., et al. "Advances in laser concepts for multiplex, coherent Raman scattering micro-spectroscopy and imaging." TrAC Trends in Analytical Chemistry, vol. 102, 2018, pp. 103-109, https://doi.org/10.1016/j.trac.2018.01.010.
Biswas, S., et al. "Coherent Two-Dimensional and Broadband Electronic Spectroscopies." Chemical Reviews, vol. 122, No. 3, 2022, pp. 4257-4321, https://doi.org/10.1021/acs.chemrev.1c00623.
Cho, M., et al. "Coherent Two-Dimensional Optical Spectroscopy." Chemical Reviews, vol. 108, No. 4, 2008, pp. 1331-1418, https://doi.org/10.1021/cr078377b.
Lee, J. H., et al. "Detection of hazardous chemical using dual-wavelength Raman spectroscopy in the ultraviolet region." Spectrochimica Acta Part A: Molecular and Biomolecular Spectroscopy, vol. 287, No. 1, 2023, p. 122061, https://doi.org/10.1016/j.saa.2022.122061.
McDonnell, R. P., et al. "Direct Probe of Vibrational Fingerprint and Combination Band Coupling." The Journal of Physical Chemistry Letters, vol. 15, No. 14, 2024, pp. 3975-3981, https://doi.org/10.1021/acs.jpclett.4c00297.
Chen, P. C., et al. "High Resolution Coherent 2D Spectroscopy." The Journal of Physical Chemistry A, vol. 114, No. 43, 2010, pp. 11365-11375, https://doi.org/10.1021/jp102401s.

(56) References Cited

OTHER PUBLICATIONS

Yellampalle, B., et al. "High-sensitivity explosives detection using dual-excitation-wavelength resonance-Raman detector." Proceedings of SPIE, vol. 9073, 2014, p. 90730H, https://doi.org/10.1117/12.2050441.
Chen, P. C., et al. "Multidimensional Pattern Recognition in High-Resolution 2D and 3D Spectra of Gas-Phase Molecules." Accounts of Chemical Research, vol. 56, No. 11, 2023, pp. 1295-1303, https://doi.org/10.1021/acs.accounts.2c00637.
Yellampalle, B., et al. "Performance comparison of single and dual-excitation-wavelength resonance-Raman explosives detectors." Proceedings of SPIE, vol. 10183, 2017, p. 101830E, https://doi.org/10.1117/12.2262636.
Fu, D., et al. "Quantitative Chemical Imaging with Multiplex Stimulated Raman Scattering Microscopy." Journal of the American Chemical Society, vol. 134, No. 8, 2012, pp. 3623-3626, https://doi.org/10.1021/ja210081h.
Zhang, D., et al. "Quantitative Vibrational Imaging by Hyperspectral Stimulated Raman Scattering Microscopy and Multivariate Curve Resolution Analysis." Analytical Chemistry, vol. 85, No. 1, 2013, pp. 98-106, https://doi.org/10.1021/ac3019119.
Spencer, A. P., et al. "Quantum coherence selective 2D Raman-2D electronic spectroscopy." Nature Communications, vol. 8, No. 1, 2017, p. 14732, https://doi.org/10.1038/ncomms14732.
Schulze, H. G., et al. "Rapid Vector-Based Peak Fitting and Resolution Enhancement for Correlation Analyses of Raman Hyperspectra." Applied Spectroscopy, vol. 77, No. 8, 2023, pp. 957-969, https://doi.org/10.1177/00037028231176805.
Chen, P. C., et al. "Two-Dimensional Coherent Double Resonance Electronic Spectroscopy." The Journal of Physical Chemistry A, vol. 112, No. 14, 2008, pp. 2999-3001, https://doi.org/10.1021/jp710247h.
Chen, p. C., et al. "Two-Dimensional Spectroscopy Isolates Infrared Rovibrational Patterns." The Journal of Physical Chemistry Letters, vol. 15, No. 5, 2024, pp. 1234-1240, https://doi.org/10.1021/acs.jpclett.3c03254.
Gogal'ová, Z., et al. "An improved design of the fused silica capillary flow cell for absorbance detection in microcolumn liquid chromatography." Analytica Chimica Acta, vol. 1238, 2023, p. 340637, https://doi.org/10.1016/j.aca.2022.340637.
Compaan, A., et al. "Coherent anti-Stokes Raman scattering with counterpropagating laser beams." Optics Letters, vol. 4, 1979, pp. 170-172, https://doi.org/10.1364/OL.4.000170.
Smetanin, S. N., et al. "Determination of the stimulated raman scattering threshold for a pump pulse of arbitrary width." Optics and Spectroscopy, vol. 121, No. 3, 2016, pp. 395-404, https://doi.org/10.1134/S0030400X1608021X.
Ginovart, F., et al. "Polarization effects in stimulated Raman scattering." Physics Letters A, vol. 194, No. 5-6, 1994, pp. 397-404, https://doi.org/10.1016/0375-9601(94)90330-1.
Baranov, A. V., et al. "Spectroscopy of resonance hyper-Raman scattering of light." Soviet Physics Uspekhi, vol. 33, No. 10, 1990, p. 812, https://doi.org/10.1070/PU1990v033n10ABEH002635.
Xiong, H., et al. "Stimulated Raman excited fluorescence spectroscopy and imaging." Nature Photonics, vol. 13, No. 6, 2019, pp. 412-417, https://doi.org/10.1038/s41566-019-0396-4.
Nestor, J., et al. "Stimulated Raman Gain Spectroscopy Utilizing Counter-propagating Pulsed Dye Lasers." Applied Spectroscopy, vol. 35, 1981, pp. 81-85.
Perry, B., et al. "Stimulated Raman scattering with a tightly focused pump beam." Optics Letters, vol. 10, 1985, pp. 146-148, https://doi.org/10.1364/OL.10.000146.
Min, W., et al. "The Duality of Raman Scattering." Accounts of Chemical Research, vol. 57, No. 14, 2024, pp. 1896-1905, https://doi.org/10.1021/acs.accounts.4c00159.
Verma, S.P., et al. "Erythrocyte membranes undergo cooperative, pH-sensitive state transitions in the physiological temperature range: evidence from Raman spectroscopy." Proc. Natl. Acad. Sci. USA, vol. 73, 1976, pp. 3558-3561, https://doi.org/10.1073/pnas.73.10.3558.
Aslanian, D., et al. "Thermotropic State Transition in Isolated Platelet Membranes Studied by Raman Spectroscopy." European Journal of Biochemistry, vol. 131, 1983, pp. 555-558, https://doi.org/10.1111/j.1432-1033.1983.tb07298.x.
Tuschel, D. "Raman Thermometry." Spectroscopy, vol. 31, 2016, pp. 8-13.
Ghita, A., et al. "Sensitivity of Transmission Raman Spectroscopy Signals to Temperature of Biological Tissues." Scientific Reports, vol. 8, 2018, pp. 8379, https://doi.org/10.1038/s41598-018-25465-x.
Arachchige, C.M., et al. "Raman scattering applied to human breath analysis." TrAC Trends in Analytical Chemistry, vol. 177, 2024, pp. 117791, https://doi.org/10.1016/j.trac.2024.117791.
Han, Y., et al. "Sweat Sensor Based on Wearable Janus Textiles for Sweat Collection and Microstructured Optical Fiber for Surface-Enhanced Raman Scattering Analysis." ACS Sensors, vol. 8, 2023, pp. 4774-4781, https://doi.org/10.1021/acssensors.3c01863.
Li, Y., et al. "Flexible Wearable Plasmonic Paper-Based Microfluidics with Expandable Channel and Adjustable Flow Rate for Portable Surface-Enhanced Raman Scattering Sweat Sensing." ACS Photonics, vol. 11, 2024, pp. 613-625, https://doi.org/10.1021/acsphotonics.3c01490.
Dybas, J., et al. "Trends in biomedical analysis of red blood cells—Raman spectroscopy against other spectroscopic, microscopic and classical techniques." TrAC Trends in Analytical Chemistry, vol. 146, 2022, pp. 116481, https://doi.org/10.1016/j.trac.2021.116481.
Goulart, A.C.C., et al. "Diagnosing COVID-19 in human serum using Raman spectroscopy." Lasers in Medical Science, vol. 37, 2022, pp. 2217-2226, https://doi.org/10.1007/s10103-021-03488-7.
Lister, A.P., et al. "Multi-Excitation Raman Spectroscopy for Label-Free, Strain-Level Characterization of Bacterial Pathogens in Artificial Sputum Media." Analytical Chemistry, vol. 94, 2022, pp. 669-677, https://doi.org/10.1021/acs.analchem.1c02501.
Cheng, I-F., et al. "Rapid (<5 min) Identification of Pathogen in Human Blood by Electrokinetic Concentration and Surface-Enhanced Raman Spectroscopy." Scientific Reports, vol. 3, 2013, pp. 2365, https://doi.org/10.1038/srep02365.
Xiong, C., et al. "Multi-branch attention Raman network and surface-enhanced Raman spectroscopy for the classification of neurological disorders." Biomedical Optics Express, vol. 15, 2024, pp. 3523-3540, https://doi.org/10.1364/BOE.514196.
Macleod, N., et al. "Broadband standoff detection of large molecules by mid-infrared active coherent laser spectrometry." Optics Express, vol. 23, 2015, pp. 912-928, https://doi.org/10.1364/OE.23.000912.
Sharma, S.K., et al. "Detection of Chemicals with Standoff Raman Spectroscopy." Spectroscopy Supplements, 2011.
Macleod, N.A., et al. "High sensitivity stand-off detection and quantification of chemical mixtures using an active coherent laser spectrometer (ACLaS)." Proceedings of SPIE, vol. 9824, 2016, pp. 98240B, https://doi.org/10.1117/12.2223045.
Narlagiri, L.M., et al. "Recent trends in laser-based standoff detection of hazardous molecules." TrAC Trends in Analytical Chemistry, vol. 153, 2022, pp. 116645, https://doi.org/10.1016/j.trac.2022.116645.
Glenn, R., et al. "Single Broadband Phase-Shaped Pulse Stimulated Raman Spectroscopy for Standoff Trace Explosive Detection." The Journal of Physical Chemistry Letters, vol. 7, 2016, pp. 117-125, https://doi.org/10.1021/acs.jpclett.5b01894.
Coluccelli, N., et al. "Standoff detection of bacterial spores by field deployable coherent Raman spectroscopy." Scientific Reports, vol. 13, 2023, pp. 2634, https://doi.org/10.1038/s41598-023-29589-7.
Zachhuber, B., et al. "Stand-off Raman spectroscopy of explosives." Proceedings of SPIE, vol. 7838, 2010, pp. 78380F, https://doi.org/10.1117/12.864564.
Zachhuber, B., et al. "Stand-Off Spatial Offset Raman Spectroscopy for the Detection of Concealed Content in Distant Objects." Analytical Chemistry, vol. 83, 2011, pp. 9438-9442, https://doi.org/10.1021/ac2021008.
Emmons, E., et al. "Waveguide-Enhanced Raman Spectroscopy for Field Detection of Threat Materials." Devcom CBC @ DTRA CBD S&T Conference, 2022.

(56) References Cited

OTHER PUBLICATIONS

Khristoforova, Y., et al. "Raman-Based Techniques in Medical Applications for Diagnostic Tasks: A Review." International Journal of Molecular Sciences, vol. 24, 2023, pp. 15605, https://doi.org/10.3390/ijms242115605.
Cherukulappurath, S. "Surface-Enhanced Raman Spectroscopy for Biomedical Applications: A Review." Sensors & Transducers, vol. 197, 2016, pp. 1-13.
Buhas, B.A., et al. "Label-Free SERS of Urine Components: A Powerful Tool for Discriminating Renal Cell Carcinoma through Multivariate Analysis and Machine Learning Techniques." International Journal of Molecular Sciences, vol. 25, 2024, pp. 3891, https://doi.org/10.3390/ijms25073891.
Almasoud, N., et al. "Rapid detection and quantification of paracetamol and its major metabolites using surface enhanced Raman scattering." Analyst, vol. 148, 2023, pp. 1805-1814, https://doi.org/10.1039/D3AN00249G.
Fu, Q., et al. "Rapid identification of the resistance of urinary tract pathogenic bacteria using deep learning-based spectroscopic analysis." Analytical and Bioanalytical Chemistry, vol. 413, 2021, pp. 7401-7410, https://doi.org/10.1007/s00216-021-03691-z.
Aitekenov, S., et al. "Surface-enhanced Raman spectroscopy (SERS) for protein determination in human urine." Sensing and Bio-Sensing Research, vol. 38, 2022, pp. 100535, https://doi.org/10.1016/j.sbsr.2022.100535.
Gala De Pablo, J., et al. "High-Throughput Raman Flow Cytometry and Beyond." Accounts of Chemical Research, vol. 54, 2021, pp. 2132-2143, https://doi.org/10.1021/acs.accounts.1c00001.
Vyas, B., et al. "Raman hyperspectroscopy of saliva and machine learning for Sjögren's disease diagnostics." Scientific Reports, vol. 14, 2024, pp. 11135, https://doi.org/10.1038/s41598-024-59850-6.
Bégin, S., et al. "Coherent anti-Stokes Raman scattering hyperspectral tissue imaging with a wavelength-swept system." Biomedical Optics Express, vol. 2, 2011, pp. 1296-1306, https://doi.org/10.1364/BOE.2.001296.
Eravuchira, P.J., et al. "Hollow core photonic crystal fiber-assisted Raman spectroscopy as a tool for the detection of Alzheimer's disease biomarkers." Journal of Biomedical Optics, vol. 25, 2020, pp. 077001, https://doi.org/10.1117/1.JBO.25.7.077001.
Qi, D., et al. "Chemical concentration measurement in blood serum and urine samples using liquid-core optical fiber Raman spectroscopy." Applied Optics, vol. 46, 2007, pp. 1726-1734, https://doi.org/10.1364/AO.46.001726.
Aitekenov, S., et al. "Raman, Infrared and Brillouin Spectroscopies of Biofluids for Medical Diagnostics and for Detection of Biomarkers." Critical Reviews in Analytical Chemistry, vol. 53, 2022, pp. 1561-1590, https://doi.org/10.1080/10408347.2022.2036941.
Staritzbichler, R., et al. "Raman spectroscopy on blood serum samples of patients with end-stage liver disease." PLOS One, vol. 16, 2021, pp. e0256045, https://doi.org/10.1371/journal.pone.0256045.
Chu, Q., et al. "Volumetric enhancement of Raman scattering for fast detection based on a silver-lined hollow-core fiber." Optics Express, vol. 27, 2019, pp. 10370-10382, https://doi.org/10.1364/OE.27.010370.
Nagli, L., et al. "Absolute Raman cross-sections of some explosives: Trend to UV." Optical Materials, vol. 30, 2008, pp. 1747-1754, https://doi.org/10.1016/j.optmat.2007.11.019.
Gao, X., et al. "Absolute Stimulated Raman Cross Sections of Molecules." The Journal of Physical Chemistry Letters, vol. 14, 2023, pp. 5701-5708, https://doi.org/10.1021/acs.jpclett.3c01064.
McAnally, M.O., et al. "Quantitative Determination of the Differential Raman Scattering Cross Sections of Glucose by Femtosecond Stimulated Raman Scattering." Analytical Chemistry, vol. 89, 2017, pp. 6931-6935, https://doi.org/10.1021/acs.analchem.7b01335.
Wilcox, P.G., et al. "Raman Spectra and Cross Sections of Chemical Warfare Agents, Agent Simulants, and Explosives Using 213 NM Deep-Ultraviolet Laser Excitation." Defense Technical Information Center, 2018.
Colles, M.J., et al. "Relative and Absolute Raman Scattering Cross Sections in Liquids." The Journal of Chemical Physics, vol. 56, 1972, pp. 3384-3391, https://doi.org/10.1063/1.1677709.
De Gelder, J., et al. "Reference database of Raman spectra of biological molecules." Journal of Raman Spectroscopy, vol. 38, 2007, pp. 1133-1147, https://doi.org/10.1002/jrs.1734.
Lee, W., et al. "Spread spectrum SERS allows label-free detection of attomolar neurotransmitters." Nature Communications, vol. 12, 2021, pp. 159, https://doi.org/10.1038/s41467-020-20413-8.
Suchita, et al. "Stimulated Raman Scattering in Toluene for Efficient New Wavelength Generation." 12th International Conference on Fiber Optics and Photonics, 2014, pp. S5A.34, https://doi.org/10.1364/PHOTONICS.2014.S5A.34.
Miao, R., et al. "Hollow-core anti-resonant optical fibers for chemical and biomedical sensing." Sensing and Bio-Sensing Research, vol. 46, 2024, pp. 100701, https://doi.org/10.1016/j.sbsr.2024.100701.
Cundiff, S.T., et al. "Optical multidimensional coherent spectroscopy." Physics Today, vol. 66, 2013, pp. 44-49, https://doi.org/10.1063/PT.3.2047.
Coherent, Inc. "Simplified One-Beam 2D Electronic Spectroscopy using a Millijoule Amplifier and HCF." Coherent White Paper, 2019.
Office Action issued for U.S. Appl. No. 18/762,415, mailed Jan. 16, 2026, 22 pages.
Nakae, et al., "Terahertz Coherent Raman Spectroscopy of Dimethyl Sulfoxide and Water Mixtures Using Frequency Chirped Pulses," IEEE, Dec. 1, 2016, 2 pages.
Office Action issued for U.S. Appl. No. 18/762,240, mailed Jan. 16, 2026, 23 pages.
Office Action issued for U.S. Appl. No. 18/774,723, mailed Jan. 9, 2026, 9 pages.
Notice of Allowance issued for U.S. Appl. No. 18/821,845, mailed Feb. 18, 2026, 12 pages.
Notice of Allowance issued for U.S. Appl. No. 19/349,623, mailed Apr. 1, 2026, 15 pages.
Office Action issued for U.S. Appl. No. 18/892,075, mailed Apr. 2, 2026, 35 pages.
Notice of Allowance issued for U.S. Appl. No. 18/762,415, mailed May 7, 2026, 8 pages.
Office Action issued for U.S. Appl. No. 18/762,420, mailed May 5, 2026, 23 pages.
Notice of Allowance issued for U.S. Appl. No. 18/774,723, mailed May 11, 2026, 9 pages.
Notice of Allowance issued for U.S. Appl. No. 19/020,938, mailed Jun. 3, 2026, 10 pages.
Notice of Allowance issued for U.S. Appl. No. 19/069,522, mailed Jun. 17, 2026, 17 pages.
Office Action issued for U.S. Appl. No. 19/069,507, mailed Jun. 17, 2026, 27 pages.
Office Action issued for U.S. Appl. No. 19/069,513, mailed Jun. 17, 2026, 21 pages.
Notice of Allowance issued for U.S. Appl. No. 19/069,535, mailed Jul. 2, 2026, 11 pages.

* cited by examiner

RAMAN SPECTROSCOPY SYSTEM

This application is a continuation of U.S. patent application Ser. No. 18/762,412, filed 2 Jul. 2024, issued as U.S. Pat. No. 12,203,862, which claims the benefit of U.S. Provisional Patent Application No. 63/560,521, filed 1 Mar. 2024, the entireties of which are expressly incorporated by reference herein.

TECHNICAL FIELD

This disclosure generally relates to Raman spectroscopy systems and methods that use Raman scattering.

BACKGROUND

Raman spectroscopy is an optical measurement technique that can be applied to the study of molecular dynamics (e.g., to investigate vibrational and rotational states of molecules). Molecules typically exhibit molecular vibrations with frequencies ranging from less than 10 terahertz (THz) to approximately 100 THz, which corresponds to wavenumbers of approximately 300 $cm^{-1}$ to 3000 $cm^{-1}$ and wavelengths of approximately 30 to 3 micrometers (μm). Raman spectroscopy is based on the inelastic scattering of photons (referred to as Raman scattering) that occurs when light interacts with molecular vibrations or phonons in a sample. Raman scattering causes the energy (or equivalently, the frequency) of scattered light to be shifted, and this shift in energy can provide information about the vibrational modes of molecules in the sample.

Raman spectroscopy can be used in various chemical sensing applications to identify molecular components in a sample. Since many molecules exhibit a unique Raman scattering spectrum, the spectrum of Raman-scattered light produced when light interacts with a sample can serve as a fingerprint to sense or identify various molecular species within the sample. A sample illuminated with light may produce Raman scattered light at different wavelengths from the illumination light, and measurement of the spectrum of the Raman scattered light is typically performed in the optical domain. For example, the spectrum of Raman scattered light can be measured using an optical spectrometer which separates the Raman scattered light into its optical frequency components using a diffractive element, such as a diffraction grating.

DETAILED DESCRIPTION

Figure 1:
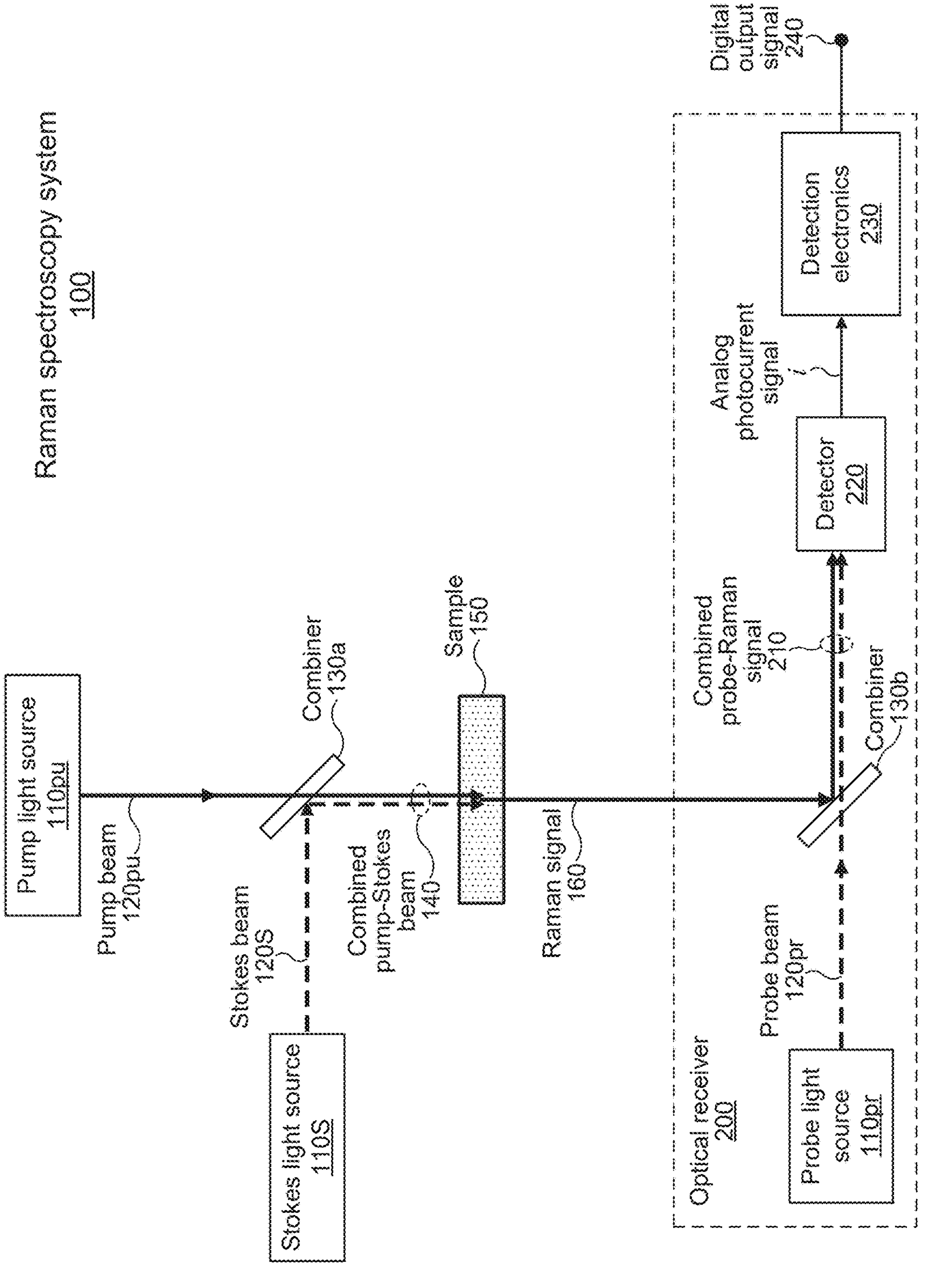
FIGS. 1-2 each illustrates an example Raman spectroscopy system.
Figure 2:
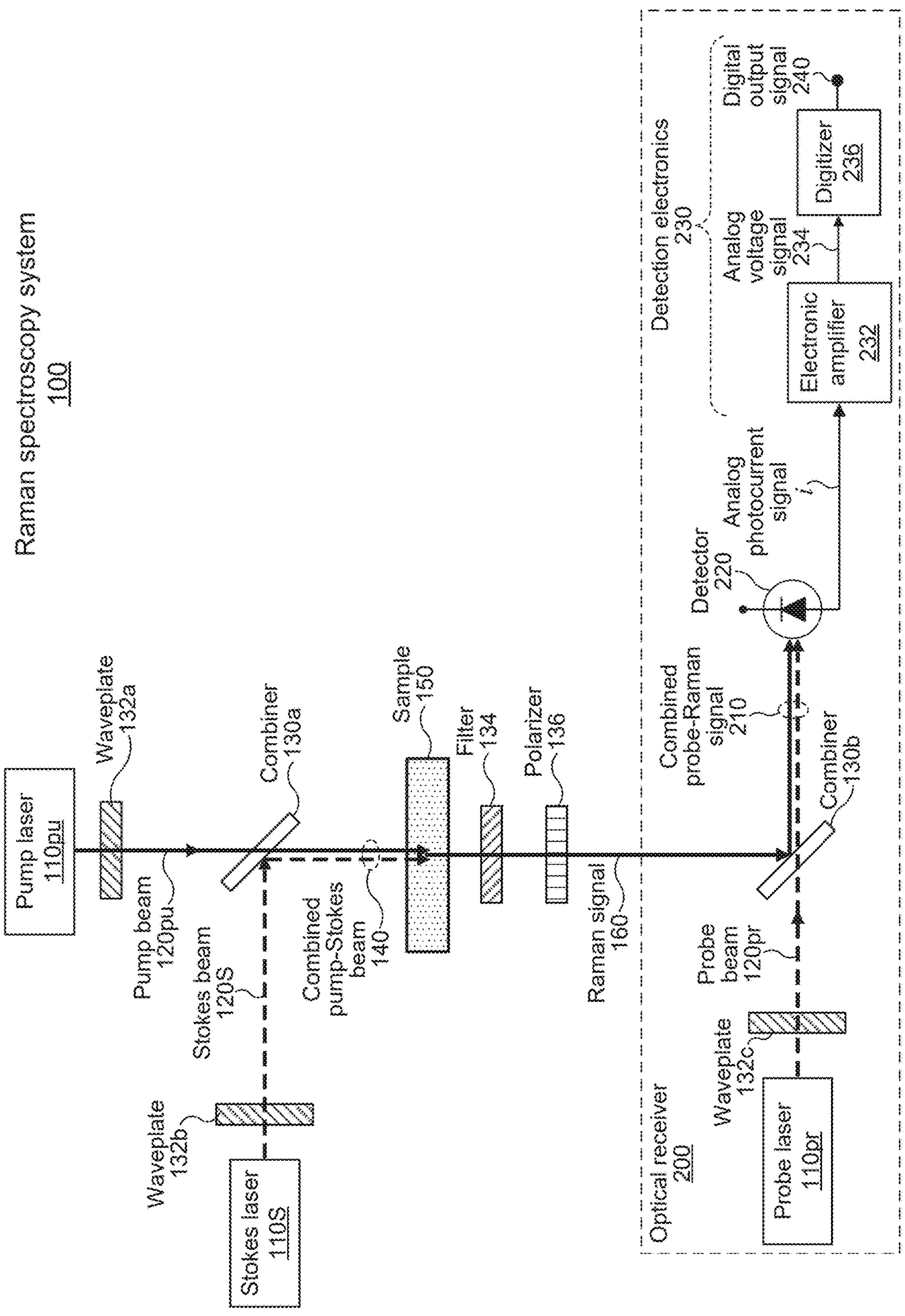

FIGS. 1-2 each illustrates an example Raman spectroscopy system 100. The Raman spectroscopy system 100 in each of FIGS. 1-2 may detect a Raman signal 160 by coherently mixing the Raman signal 160 with a probe beam of light **120*pr* produced by a probe light source 110*pr*. The Raman spectroscopy system 100 in each of FIGS. 1-2** may be referred to as a coherent Raman spectroscopy system, a coherent Raman spectroscopy system with heterodyne detection, or a high-resolution coherent Raman spectroscopy system. One or more of the systems or methods described herein may be applied to any suitable form of coherent Raman spectroscopy or coherent Raman scattering (CRS), such as for example, coherent anti-Stokes Raman scattering (CARS), stimulated Raman scattering (SRS), or Raman-induced Kerr effect (RIKE).

The Raman spectroscopy system 100 in FIG. 1 includes a pump light source 110*pu* that produces a pump beam of light 120*pu* and a Stokes light source 110S that produces a Stokes beam of light 120S. The pump light source 110*pu* produces the pump beam of light 120*pu* at a pump frequency, which may be referred to as a first frequency and may be represented by $v_1$, $v_{pu}$, $\omega_1$, or $\omega_{pu}$. The pump light source 110*pu* may be referred to as a first light source, and the pump beam of light 120*pu* may be referred to as a first beam of light. The Stokes light source 110S produces the Stokes beam of light 120S at a Stokes frequency, which may be referred to as a second frequency and may be represented by $v_2$, $v_S$, $\omega_2$, or $\omega_S$. The Stokes light source 110S may be referred to as a second light source, and the Stokes beam of light 120S may be referred to as a second beam of light. The pump and Stokes frequencies may be offset by a frequency offset $\Omega$, where $\Omega$ equals $v_{pu}-v_S$ (or equivalently, $\Omega=v_1-v_2$). Generally, the pump frequency $v_{pu}$ is greater than the Stokes frequency $v_S$, and the frequency offset $\Omega$ is a positive value. The pump and Stokes light sources in FIG. 1 may each include a laser. For example, the Raman spectroscopy system 100 in FIG. 2 includes a pump laser 110*pu* that produces a pump beam of light 120*pu* and a Stokes laser 110S that produces a Stokes beam of light 120S.

In FIGS. 1-2, the pump beam 120*pu* and the Stokes beam 120S are directed to a sample 150, and the sample 150 produces a Raman signal 160 in response to the pump and Stokes beams. For example, the Raman signal 160 may be produced by coherent Raman scattering of the pump and Stokes beams within the sample 150. A Raman spectroscopy system may include one or more optical elements that direct the pump beam 120*pu* and the Stokes beam 120S to a sample 150. Additionally, the optical elements may collect the Raman signal 160 produced by the sample 150 in response to the pump beam 120*pu* and Stokes beam 120S and may direct the Raman signal 160 to an optical receiver 200. The optical elements may include free-space optics, fiber-optic components, waveguide-based optics, metamaterials, or any combination thereof. For example, the optical elements may include a mirror, lens, optical combiner (e.g., beamsplitter), optical fiber, photonic integrated circuit (PIC), optical waveguide, or metamaterial-based optic. As another example, the optical combiner 130*a* in each of FIGS. 1-2 may be a free-space dichroic beamsplitter that transmits light at the pump-beam wavelength and reflects light at the Stokes-beam wavelength. The combiner 130*a* may combine the pump beam 120*pu* and the Stokes beam 120S to produce a combined pump-Stokes beam 140 that is directed to the sample 150. The pump and Stokes beams may be combined so that they are substantially overlapped with one another and propagate along approximately the same direction. Alternatively, a Raman spectroscopy system 100 may not include a pump-Stokes optical combiner 130*a*, and the pump beam 120*pu* and the Stokes beam 120S may be directed to a sample 150 as separate beams (e.g., the pump and Stokes beams may be overlapped or combined at the sample rather than being combined earlier). As another example, the optical elements may include a lens (not illustrated in FIGS. 1-2) that focuses the pump-Stokes beam 140 onto the sample 150. Additionally, the optical elements may include a lens (not illustrated in FIGS. 1-2) that collects the Raman signal 160 to produce a Raman-signal beam that is directed to the optical receiver 200.

In FIGS. 1-2 the combined pump-Stokes beam 140 is directed to one side of the sample 150, and the Raman signal 160 is emitted from the opposite side of the sample. A Raman signal 160 that is collected and directed to an optical receiver 200 may be emitted from a sample 150 in any suitable direction. For example, a Raman signal 160 that is sent to an optical receiver 200 may be emitted from a sample 150 in a forward-scattered direction (e.g., as illustrated in FIGS. 1-2), in a backward-scattered direction (e.g., back towards the pump or Stokes beam), or in a sideways-scattered direction (e.g., in a direction approximately orthogonal to the combined pump-Stokes beam 140 in FIGS. 1-2).

The Raman spectroscopy system 100 in each of FIGS. 1-2 includes an optical receiver 200 that detects the Raman signal 160 produced by the sample 150. The optical receiver 200 (which may be referred to as a heterodyne optical receiver or a high-resolution optical receiver) may detect the Raman signal 160 using an optical heterodyne technique in which the Raman signal 160 is coherently mixed with a probe beam of light 120*pr*. The optical receiver 200 in FIG. 1 includes a probe light source 110*pr* that produces a probe beam of light 120*pr* at a probe frequency. The probe light source 110*pr* may be referred to as a third light source, and the probe beam of light 120*pr* may be referred to as a third beam of light. The probe frequency may be referred to as a third frequency and may be represented by $v_3$, $v_{pr}$, $\omega_3$, or $\omega_{pr}$. The probe light source 110*pr* in FIG. 1 may include a laser. For example, the optical receiver 200 in FIG. 2 includes a probe laser 110*pr* that produces a probe beam of light 120*pr*.

The optical combiner 130*b* in each of FIGS. 1-2 may be a dichroic or a non-dichroic beamsplitter that combines the Raman signal 160 and the probe beam 120*pr* to produce a combined probe-Raman signal 210 that is directed to a detector 220. An optical receiver 200 may include one or more optical detectors 220, where each detector is configured to coherently mix a portion of a Raman signal 160 with at least a portion of a probe beam 120*pr* to produce an electronic signal. Each of the optical receivers 200 in FIGS. 1-2 includes one detector 220 that receives the combined probe-Raman signal 210. The Raman signal 160 and the probe beam 120*pr* are coherently mixed at the detector 220, and this heterodyne mixing process produces an electronic signal, which in FIGS. 1-2 is indicated as analog photocurrent signal i. In FIGS. 1-2, the detection electronics 230 receives the photocurrent signal i and produces a digital output signal 240 that corresponds to the photocurrent signal. The digital output signal 240 may be sent to a processor, and the processor may determine a characteristic of the analog photocurrent signal i based on the digital output signal 240. For example, the characteristic of the analog photocurrent signal (or the characteristic of an analog voltage signal that corresponds to the photocurrent signal) determined by the processor may include one or more of: a peak amplitude, an average amplitude, an amplitude at a particular frequency, an amplitude at a particular time, an amplitude at a frequency center, an amplitude at a temporal center, an area, a frequency, a phase, and a polarization. An analog photocurrent signal may be referred to as a photocurrent, a photocurrent signal, or a current signal, and an analog voltage signal may be referred to as a voltage signal.

In FIGS. 1-2, the probe beam 120*pr* does not travel through the sample 150, and the probe beam is combined with the Raman signal 160 after the Raman signal has exited the sample 150. In other embodiments, a Raman spectroscopy system 100 may include a probe laser 110*pr* that produces a probe beam 120*pr* that is directed through the sample 150. For example, the probe beam 120*pr* may be combined with the pump beam 120*pu* and the Stokes beam 120S, and all three beams may be directed to the sample 150. The probe beam 120*pr* may travel through the sample 150 and may exit the sample along with the Raman signal 160. The optical receiver 200 may not include a combiner 130*b*, since the probe beam 120*pr* and the Raman signal 160 may already be combined after they exit the sample 150. The probe beam 120*pr* and the Raman signal 160 may be directed to a detector 220 without being transmitted or reflected by an optical combiner 130*b*.

The detection electronics 230 in FIG. 2 includes an electronic amplifier 232 and a digitizer 236. The electronic amplifier 232 may include a transimpedance amplifier that amplifies the photocurrent signal i to produce an analog voltage signal 234 that corresponds to the photocurrent signal i (e.g., the photocurrent signal i and the analog voltage signal 234 may have similar temporal shapes or may include similar electronic frequency components). The electronic amplifier 232 may include an additional gain stage that further amplifies an intermediate voltage signal produced by the transimpedance amplifier to produce the voltage signal 234. Additionally, the electronic amplifier 232 may include an electronic filter (e.g., a low-pass, high-pass, or band-pass filter) that filters the photocurrent signal or voltage signal. For example, the electronic amplifier 232 may include (i) a high-pass filter that removes a DC offset and low-frequency components (e.g., frequency components below 10 MHz) from the photocurrent signal or (ii) a band-pass filter that removes the DC and low-frequency components as well as high-frequency components (e.g., frequency components above 5 GHz). Herein, an electronic signal produced in response to coherent mixing may refer to a current signal (e.g., a photocurrent i produced by a detector 220) or may refer to a corresponding voltage signal (e.g., a voltage signal 234 produced by an electronic amplifier that amplifies a photocurrent produced by a detector to produce the voltage signal). In FIG. 2, the digitizer 236 receives the voltage signal 234 and produces a digital output signal 240 that includes a digital representation of the voltage signal 234. The digital output signal 240 may be a time-domain digital representation of the voltage signal 234. The digital output signal 240 may be referred to as corresponding to or representing the voltage signal 234 or the photocurrent signal i. The digitizer 236 may include an analog-to-digital converter (ADC) that produces a digital version of the voltage signal 234. Additionally or alternatively, the digitizer 236 may include a peak detector that determines a peak value of the voltage signal 234.

A Raman spectroscopy system 100 may include one or more optical detectors 220. An optical detector 220 (which may be referred to as a detector, photodetector, or photodiode) may include a PN photodiode, PIN photodiode, avalanche photodiode (APD), single-photon avalanche diode (SPAD), silicon photomultiplier (SiPM), or photomultiplier tube (PMT). A PN photodiode refers to a photodiode structure formed by a p-doped semiconductor and an n-doped semiconductor, where the PN acronym refers to the structure having p-doped and n-doped regions. A PIN photodiode refers to a photodiode structure formed by an undoped intrinsic semiconductor region located between p-doped and n-doped regions, where the PIN acronym refers to the structure having p-doped, intrinsic, and n-doped regions. A PN photodiode, PIN photodiode, APD, or SPAD may include any suitable semiconductor material, such as for example, silicon, germanium, gallium arsenide (GaAs), aluminum gallium arsenide (AlGaAs), indium gallium arsenide (InGaAs), indium aluminum arsenide (InAlAs), indium arsenide antimonide (InAsSb), aluminum arsenide antimonide (AlAsSb), aluminum indium arsenide antimonide (AlInAsSb), or silicon germanium (SiGe). For example, the Raman signal 160 and the probe beam 120*pr* in FIGS. 1-2 may each have a wavelength in the 400-1100 nanometer (nm) range, and the detector 220 may include a silicon PIN photodiode. As another example, the Raman and probe beams in FIGS. 1-2 may each have a wavelength in the 1000-1700 nm range, and the detector 220 may include an InGaAs PIN photodiode.

In order for a detector 220 to detect an optical signal, the wavelength of the optical signal must be within the detector's wavelength range of responsivity (e.g., approximately 400-1100 nm for a silicon detector, and approximately 1000-1700 nm for an InGaAs detector) and a frequency of an amplitude modulation of the optical signal must be within the electronic bandwidth of the detector. The electronic bandwidth (Δf) of a detector 220 refers to the range of electronic modulation frequencies over which a detector may detect an optical signal, where detection of the optical signal refers to (i) the detector producing a photocurrent signal i that corresponds to the optical signal and (ii) an electronic amplifier 232 producing a voltage signal 234 that corresponds to the photocurrent signal. If a silicon detector 220 has an electronic bandwidth that extends from 100 MHz to 5 GHz, then the detector may detect optical signals with (i) wavelengths between approximately 400 nm and 1100 nm and (ii) amplitude modulation between 100 MHz and 5 GHz. For example, a 900-nm optical signal with an amplitude modulation at a frequency between 100 MHz and 5 GHz may be detected by the silicon detector 220. The silicon detector 220 may not detect a continuous-wave or substantially constant portion of a 900-nm optical signal (e.g., the substantially constant portion of the optical signal may produce a DC current in the detector that may be electronically filtered out), and the silicon detector 220 may not detect a portion of the optical signal with an amplitude modulation greater than approximately 5 GHz. Herein, reference to the electronic bandwidth (Δf) of a detector 220 may refer to (i) the electronic bandwidth of just the detector or (ii) the overall bandwidth of the detector in combination with an electronic amplifier 232.

A detector 220 may have an electronic bandwidth Δf between approximately 100 MHz and approximately 50 GHz. For example, the detector 220 in each of FIGS. 1-2 may have an electronic bandwidth between 100 MHz and 10 GHz. As another example, the detector 220 in each of FIGS. 1-2 may have an electronic bandwidth that extends from a low-frequency cutoff to a high-frequency cutoff. The low-frequency cutoff may be approximately DC (i.e., zero hertz), 1 MHz, 10 MHz, 50 MHz, or 100 MHz, and the high-frequency cutoff may be approximately 500 MHz, 1 GHz, 2 GHz, 5 GHz, 10 GHz, 20 GHz, or 50 GHz. The electronic bandwidth of a detector 220 may refer to the bandwidth of only the detector 220. For example, a detector 220 may have an electronic bandwidth that extends from DC to 10 GHz, and the detector may be referred to as having a 10-GHz bandwidth that extends from DC to 10 GHz. Alternatively, the electronic bandwidth of a detector 220 may refer to the overall bandwidth of the detector in combination with an electronic amplifier 232 that amplifies the photocurrent signal i produced by the detector. An electronic amplifier 232 may have a low-frequency cutoff (e.g., DC, 1 MHz, 10 MHz, 50 MHz, or 100 MHz) and a high-frequency cutoff (e.g., 500 MHz, 1 GHz, 2 GHz, 5 GHz, 10 GHz, 20 GHz, or 50 GHz), and a detector-amplifier combination may be referred to as having an electronic bandwidth that extends from the low-frequency cutoff to the high-frequency cutoff. For example, if the detector bandwidth extends from DC to 10 GHz, and the electronic amplifier bandwidth extends from DC to 5 GHz, then the detector (or, the detector-amplifier combination) may be referred to as having an electronic bandwidth of 5 GHz that extends from DC to 5 GHz. As another example, if the detector bandwidth extends from DC to 10 GHz, and the electronic amplifier bandwidth extends from 100 MHz to 5 GHz, then the detector may be referred to as having an electronic bandwidth of 4.9 GHz that extends from 100 MHz to 5 GHz.

A Raman spectroscopy system 100 may include one or more optical waveplates that change or rotate the polarization of a beam of light. For example, a half-wave plate may be used to rotate a linearly polarized beam of light to a different polarization orientation (e.g., from vertically polarized to horizontally polarized), and a quarter-wave plate may be used to convert a linearly polarized beam of light to a circular or elliptical polarization. The pump laser 110*pu* in FIG. 2 may produce linearly polarized light, and the waveplate 132*a* may be a half-wave plate that rotates the polarization of the pump beam 120*pu* prior to the pump beam being directed to the sample 150. Alternatively, the waveplate 132*a* may be a quarter-wave plate that converts the linearly polarized pump beam 120*pu* to a circular or elliptical polarization prior to the pump beam being directed to the sample 150. Similarly, the Stokes laser 110S in FIG. 2 may produce linearly polarized light, and the waveplate 132*b* may be (i) a half-wave plate that rotates the polarization of the Stokes beam 120S or (ii) a quarter-wave plate that converts the Stokes beam 120S to a circular or elliptical polarization.

The probe laser 110*pr* in FIG. 2 may produce linearly polarized light, and the waveplate 132*c* may be (i) a half-wave plate that rotates the polarization of the probe beam 120*pr* or (ii) a quarter-wave plate that converts the probe beam 120*pr* to a circular or elliptical polarization prior to the probe beam being combined with the Raman signal 160. Changing the polarization of the probe beam 120*pr* may allow the Raman signal 160 and the probe beam to be coherently mixed. The polarization of the probe beam 120*pr* can be changed so that it has both horizontal and vertical polarization components, which ensures that at least a portion of the probe beam 120*pr* and the Raman signal 160 have polarizations that are oriented in the same direction so that their electric fields may be added together.

Each of the optical waveplates 132 in FIG. 2 may be a free-space optical element, a fiber-optic component, a waveguide-based optical element, or a metamaterial-based optic. Additionally, each of the optical waveplates 132 in FIG. 2 may be a fixed waveplate or an adjustable waveplate. A fixed waveplate may have a fixed optical phase difference between the two axes of the waveplate (e.g., a quarter-wave plate may have a one-quarter wavelength phase difference, and a half-wave plate may have a one-half wavelength phase difference). An adjustable waveplate may allow for the phase difference between the two axes of the waveplate to be dynamically changed. For example, an electronically adjustable waveplate may include a Pockels cell, a liquid crystal device, or a photoelastic modulator that allows the phase difference to be adjusted electronically so that the waveplate can be dynamically configured to act as a waveplate having any suitable phase difference (e.g., a phase difference between zero wavelengths and one-half wavelength). An adjustable waveplate may switch between (i) applying no phase difference to incident light so that the transmitted light has the same polarization as the incident light and (ii) applying a one-quarter wavelength or one-half wavelength phase difference so that linearly polarized incident light is converted to circularly polarized light or is rotated to a different polarization. For example, the pump laser 110*pu* in FIG. 2 may produce vertically polarized light, and the waveplate 132*a* may be an adjustable waveplate that switches between (i) applying no polarization rotation to the pump beam 120*pu* so that the pump beam remains vertically polarized and (ii) applying a 90-degree rotation to the pump-beam polarization so that the pump beam 120*pu* after the waveplate 132*a* is horizontally polarized. Dynamically changing the polarization of the pump beam 120*pu* may allow the Raman spectroscopy system 100 in FIG. 2 to perform measurements at two different pump-beam polarizations, which may produce additional data for characterization of the sample 150.

In some embodiments, an optical waveplate 132 may be a metamaterial-based waveplate. A metamaterial refers to an engineered material having features or repeating patterns at scales smaller than the wavelength of light interacting with the metamaterial. A metamaterial may be configured to act as a mirror, lens, waveplate, diffractive optical element, optical combiner, or optical waveguide. A metamaterial-based waveplate may affect the polarization of a beam of light based on wavelength. For example, the Raman spectroscopy system 100 in FIG. 2 may include a metamaterial-based waveplate (not illustrated in FIG. 2) located after the combiner 130*a* and before the sample 150. The metamaterial waveplate may change the polarization of the pump beam 120*pu* from linear to circular while preserving the polarization of the Stokes beam 120S (e.g., the Stokes beam may remain linearly polarized and may not be significantly changed by the waveplate).

A Raman spectroscopy system 100 may include an optical filter that transmits light at one or more wavelengths and blocks light at one or more other wavelengths. The optical filter 134 in FIG. 2 is located between the sample 150 and the optical receiver 200 and may be configured to substantially transmit one or more optical wavelengths associated with the Raman signal 160 and substantially block one or more wavelengths associated with the pump beam 120*pu* or the Stokes beam 120S. For example, the optical filter 134 may transmit greater than 90% of the Raman signal 160 and may block greater than 90% of both the pump and Stokes beams. As another example, the optical filter 134 may transmit greater than 90% of the Raman signal 160 and the Stokes beam 120S, and the optical filter 134 may block greater than 98% of the pump beam 120*pu*.

A Raman spectroscopy system 100 may include an optical polarizer that transmits light having a particular polarization (e.g., horizontal) and blocks light having an orthogonal polarization (e.g., vertical). The optical polarizer 136 in FIG. 2 is located between the sample 150 and the optical receiver 200 and may be oriented to transmit light with a polarization associated with the Raman signal. Additionally, the polarizer 136 may block a polarization associated with the pump or Stokes beams. For example, the Stokes beam 120S incident on the sample 150 may be vertically polarized, and the Raman signal 160 may be at least partially horizontally polarized. The polarizer 136 may be oriented to block vertically polarized light and transmit horizontally polarized light so that the Stokes beam 120S is blocked and the Raman signal 160 is at least partially transmitted by the polarizer. A Raman spectroscopy system 100 may include both an optical filter 134 and an optical polarizer 136. For example, the optical filter 136 in FIG. 2 may be configured to transmit the Raman signal 160 and the Stokes beam 120S and block the pump beam 120*pu*. Additionally, the Raman signal 160 and the Stokes beam 120S may be orthogonally polarized, and the polarizer 136 may be oriented to transmit the Raman signal 160 and block the Stokes beam 120S. Using a filter or polarizer located after the sample 150 to block light from the pump beam 120*pu* or the Stokes beam 120S may reduce noise in the system by reducing the amount of unwanted background light that reaches the detector 220.

The sample 150 in FIGS. 1-2 may be a solid, liquid, or gas, or any combination thereof. The sample 150 may include a biological material, an organic material, an inorganic material, a crystalline material, an amorphous solid material, or any other suitable material or combination of suitable materials. For example, the sample 150 may include a drug, mineral, food, contaminant, or explosive material that produces a Raman signal 160 in response to excitation by the pump and Stokes beams. As another example, the sample 150 may be a biological material (e.g., blood, urine, saliva, sweat, or cerebrospinal fluid) and a component or molecule (e.g., glucose or cortisol) that is part of the biological material may produce a Raman signal 160. As another example, the sample 150 may be water or wastewater that may include a contaminant, virus, bacteria, or an indicator of an infectious disease. The Raman signal 160 may be produced by coherent Raman scattering of the pump and Stokes beams within the sample 150, and the frequency offset Ω between the pump and Stokes beams may be approximately equal to a vibrational frequency or an electronic-transition frequency of a particular material that is part of the sample. The vibrational frequency of the particular material may correspond to a molecular vibration of a molecule, or in the case of a crystalline material, may correspond to a lattice vibration of a crystal. For example, the sample 150 may include glucose, and the frequency offset Ω may be approximately equal to a frequency of a molecular vibration of glucose.

The Raman spectroscopy systems 100 in FIGS. 1-2 may perform one or more measurements of a sample 150, and each measurement may include determining a characteristic of an electronic signal that results from the coherent mixing of the Raman signal 160 and the probe beam 120*pr*. The electronic signal may include a photocurrent i or a corresponding voltage signal 234. The frequency offset Ω may be approximately equal to a vibrational frequency or electronic-transition frequency of a particular material, and based on the one or more measurements, a processor may determine whether the particular material is present in the sample 150. Additionally or alternatively, the processor may determine an amount or a concentration of the particular material in the sample based on the measurements. For example, the frequency offset Ω may be approximately equal to a vibrational frequency of glucose, and, based on one or more optical heterodyne measurements of a Raman signal 160 produced by a sample 150, the processor may determine (i) whether glucose is present in the sample or (ii) an amount or a concentration of glucose in the sample. The amount of glucose that is present in the sample 150 may be proportional to the amplitude of a photocurrent signal i produced by coherent mixing of the Raman signal 160 and the probe beam 120*pr*. Based on the amplitude of the photocurrent signal i, the processor may determine the amount or concentration of glucose in the sample 150.

A technical advantage of a coherent Raman spectroscopy system 100 as described herein is a higher spectral resolution or a better chemical sensitivity than a conventional Raman spectroscopy system. As such, a Raman spectroscopy system 100 as described herein may be referred to as a high-resolution Raman spectroscopy system or as a high-resolution coherent Raman spectroscopy system. In a conventional Raman spectroscopy system, a Raman signal produced by a sample may be measured in the optical domain using an optical spectrometer. A spectrometer typically uses a dispersive optical element (e.g., a diffraction grating) to separate the Raman signal into its various spectral components. However, this type of measurement performed in the optical domain typically has a spectral resolution on the order of 1 $cm^{-1}$ (or, about 30 GHz). In contrast, the spectral resolution of a coherent Raman spectroscopy system with heterodyne detection, as described herein, is determined primarily by the spectral linewidth $\Delta v_{pr}$ of the probe beam 120*pr* that is coherently mixed with the Raman signal 160. The probe laser 110*pr* may include a wavelength-tunable laser diode with a linewidth of 200 MHz or less, which corresponds to a spectral resolution of the Raman spectroscopy system 100 of less than 200 MHz (or, less than 0.007 $cm^{-1}$). This 200-MHz spectral resolution is more than 100 times better than the 30-GHz spectral resolution of a conventional Raman spectroscopy system. In some embodiments, the probe laser 110*pr* may have a linewidth of 1 MHz or less, which corresponds to a spectral resolution of the Raman spectroscopy system 100 of less than 1 MHz (or, less than $33\times10^{-6}$ $cm^{-1}$). A related advantage of a coherent Raman spectroscopy system 100 is that the signal capture and analysis are performed in the electronic domain (e.g., at electronic frequencies between DC and 50 GHz) rather than in the optical domain (e.g., at optical frequencies between 60 THz and 1,000 THz). The coherent mixing of two optical signals (Raman signal 160 and probe beam 120*pr*) produces an electronic signal which can be analyzed with relatively high resolution compared to an optical signal. This electronic signal analysis, along with the relatively narrow spectral linewidth of the probe laser 110*pr*, provides a coherent Raman spectroscopy system 100 with a high spectral resolution. Additionally, the wavelength tunability of the probe laser 110*pr* allows a Raman spectrum of a material to be determined at multiple frequencies with high spectral resolution.

The higher spectral resolution of a coherent Raman spectroscopy system 100 may provide a corresponding improvement in the ability of the coherent Raman spectroscopy system to sense various chemical species. For example, a high-resolution coherent Raman spectroscopy system 100 may be able to distinguish between different chemical species that have Raman peaks located relatively close together, whereas a conventional Raman spectroscopy system may not be able to resolve spectral features below about 1 $cm^{-1}$. Additionally, the higher spectral resolution of a coherent Raman spectroscopy system 100 may allow for lower concentrations of materials to be detected, as compared to a conventional Raman spectroscopy system. For example, a coherent Raman spectroscopy system 100 may be able to detect small deviations in the chemical signature of a biological sample, which may indicate the presence of damage or a mutation, which in turn may be correlated with a disease or pathogen.

Another technical advantage of a coherent Raman spectroscopy system 100 as described herein is its relatively compact size. A coherent Raman spectroscopy system may be packaged in a relatively compact enclosure as compared to a conventional Raman spectroscopy system. Since the spectral resolution of an optical spectrometer scales inversely with the optical path length of the spectrometer (e.g., a longer path length provides better spectral resolution), an optical spectrometer with a spectral resolution around 1 $cm^{-1}$ can be quite large or bulky. In contrast, since the spectral resolution of a coherent Raman spectroscopy system is determined primarily by the spectral linewidth of the probe laser 110*pr*, a coherent Raman spectroscopy system does not require a long optical path length to provide high spectral resolution. Thus, an enclosure for a coherent Raman spectroscopy system may be significantly smaller than that for a conventional Raman spectroscopy system. In some embodiments, a coherent Raman spectroscopy system may be packaged as a compact device that may be referred to as a lab-on-a-chip or a spectrometer on a chip. For example, a coherent Raman spectroscopy system may be packaged as a wearable device that provides ongoing, continual monitoring for a person or an animal.

Figure 3:
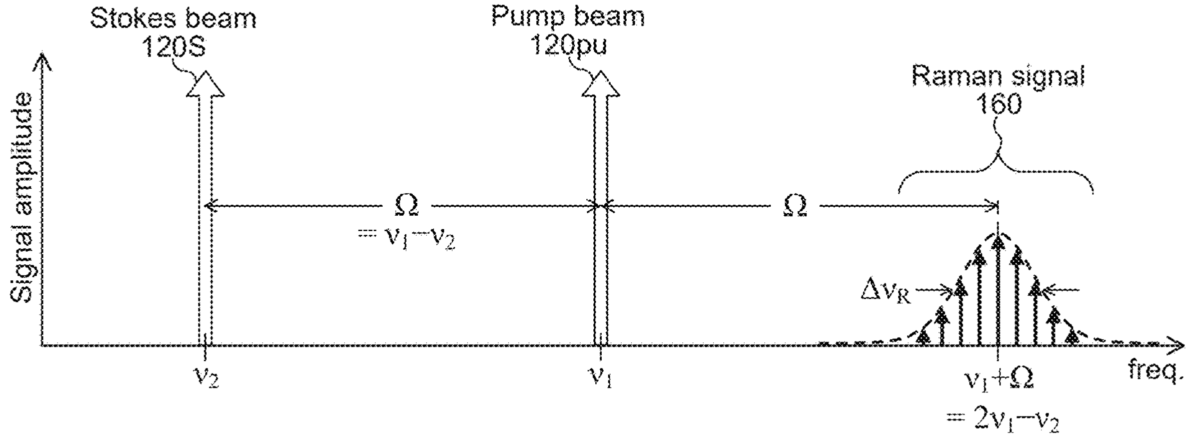
FIGS. 3-4 each illustrates an example Raman signal produced by coherent Raman scattering.
Figure 4:
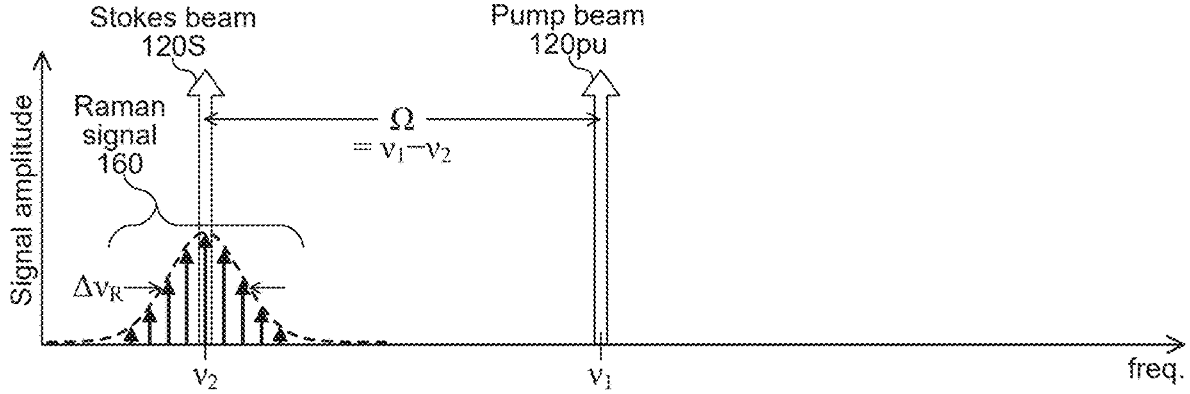

FIGS. 3-4 each illustrates an example Raman signal 160 produced by coherent Raman scattering. In a coherent Raman spectroscopy system 100, the pump beam 120*pu* and the Stokes beam 120S are directed to a sample 150, which produces a Raman signal 160 by coherent Raman scattering of the pump and Stokes beams within the sample. The frequency of the pump beam 120*pu* is $v_1$, and the frequency of the Stokes beam 120S is $v_2$. The frequency offset Ω between the pump and Stokes beams equals $v_1-v_2$. The frequencies of the pump and Stokes beams may be set so that the frequency offset Ω is approximately equal to a vibrational frequency or an electronic-transition frequency of a particular material. A coherent Raman spectroscopy system 100 may measure a Raman signal 160 produced by a sample 150 to determine (i) whether the particular material is present in the sample or (ii) an amount or a concentration of the particular material within the sample.

The frequency offset $\Omega_2$ between the pump and Stokes beams may be any suitable fixed or adjustable value between approximately 5 terahertz (THz) and approximately 100 THz. Expressed in wavenumbers, this corresponds to the frequency offset Ω being between approximately 167 $cm^{-1}$ and approximately 3336 $cm^{-1}$. For example, in a coherent Raman spectroscopy system 100, the pump beam 120*pu* may have a wavelength between approximately 1220 nanometers (nm) and approximately 1450 nm (which corresponds to a pump-beam frequency $v_1$ between approximately 246 THz and approximately 207 THz), and the Stokes beam 120S may have a wavelength between approximately 1490 nm and approximately 1570 nm (which corresponds to a Stokes-beam frequency $v_2$ between approximately 201 THz and approximately 191 THz). This system may produce pump and Stokes beams having a frequency offset Ω between approximately 5.6 THz and approximately 54.8 THz (or, in wavenumbers, between approximately 185 $cm^{-1}$ and 1827 $cm^{-1}$). For example, if the pump beam 120*pu* has a wavelength of 1330 nm (or equivalently, a frequency $v_1$ of 225.4 THz) and the Stokes beam 120S has a wavelength of 1550 nm (or equivalently, a frequency $v_2$ of 193.4 THz), then the frequency offset Ω between the pump and Stokes beams is approximately 32 THz (or, in wavenumbers, 1067 $cm^{-1}$). The pump and Stokes beams in a Raman spectroscopy system 100 may each have any suitable wavelength between approximately 300 nm and approximately 5,000 nm. For example, if the pump beam 120*pu* has a wavelength of approximately 785 nm (or equivalently, a frequency $v_1$ of 381.9 THz) and the Stokes beam 120S has a wavelength of approximately 840 nm (or equivalently, a frequency $v_2$ of 356.9 THz), then the frequency offset Ω between the pump and Stokes beams is approximately 25 THz (or, in wavenumbers, 834 $cm^{-1}$). As another example, the pump beam 120*pu* may have a wavelength between approximately 700 nm and approximately 850 nm, between approximately 890 nm and approximately 920 nm, or between approximately 1000 nm and approximately 1100 nm.

The Raman signal 160 in each of FIGS. 3-4 is an optical signal with a spectral linewidth of $\Delta v_R$. In FIG. 3, the Raman signal 160 has a center frequency approximately equal to $2v_1-v_2$ (which is equal to $v_1+\Omega$, since $\Omega=v_1-v_2$). The center frequency of a Raman signal 160 may refer to the frequency of a central peak or the frequency of an approximate center of the Raman signal. Additionally or alternatively, the center frequency of a Raman signal 160 may correspond to a Raman peak of an associated Raman spectrum. The Raman signal 160 in FIG. 3 may be produced by coherent anti-Stokes Raman scattering (CARS) in which the pump and Stokes beams interact with a sample 150 to produce a Raman signal 160 at or around the frequency $2v_1-v_2$. For example, if the pump and Stokes beams have respective wavelengths of 1064 nm and 1550 nm (which corresponds to frequencies of approximately 281.8 THz and 193.4 THz), then the frequency offset Ω is 88.3 THz (or, 2947 $cm^{-1}$), and the anti-Stokes Raman signal 160 has a center wavelength of approximately 810 nm (which corresponds to a frequency of approximately 370 THz). The Raman signal 160 in FIG. 4, which overlaps the frequency of the Stokes beam 120S, may be produced by stimulated Raman scattering. The Raman signal 160 in FIG. 4 may be centered at or near the frequency $v_2$ of the Stokes beam 120S. For example, the Raman signal 160 in FIG. 4 may have a center frequency that is within approximately 200 GHz (or, 6.7 $cm^{-1}$) of the Stokes-beam frequency $v_2$.

Figure 5:
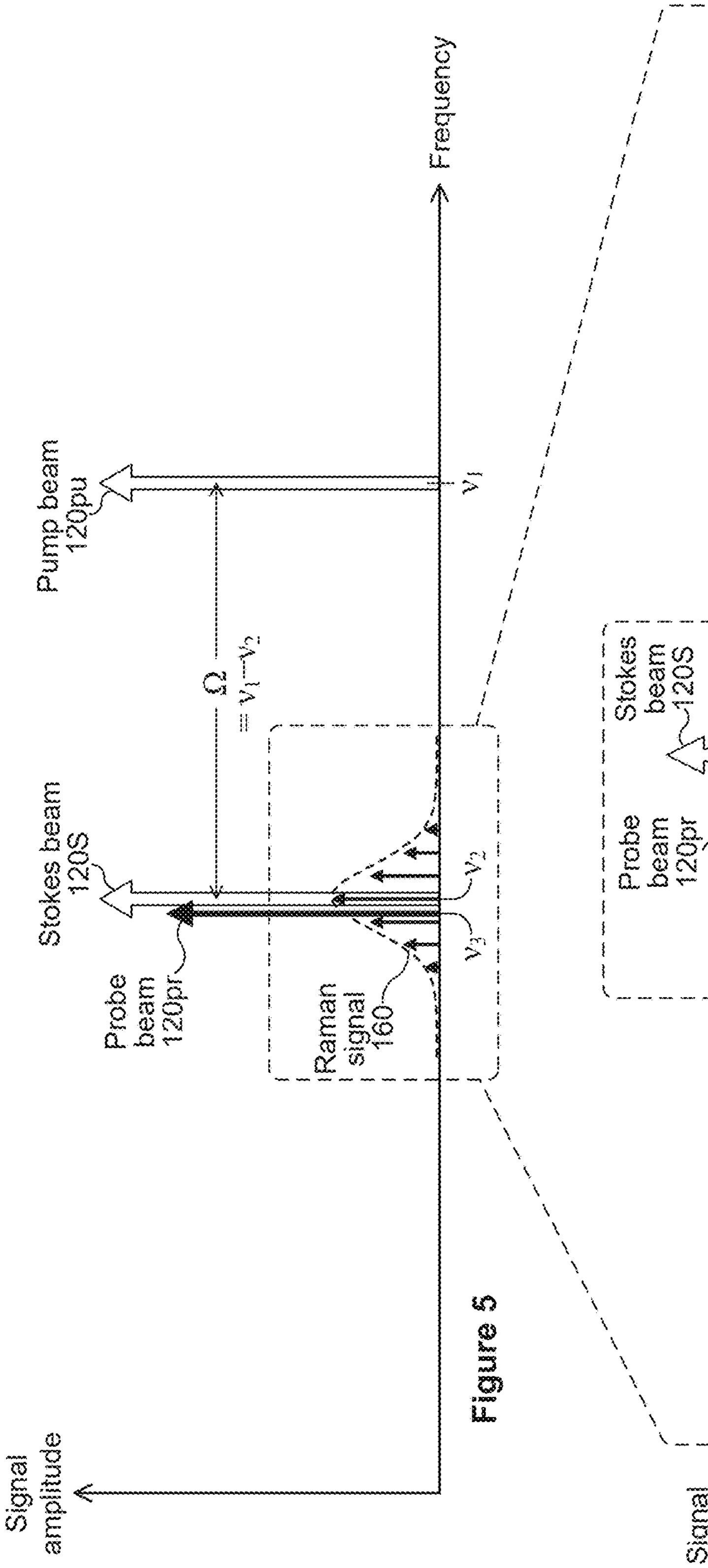
FIG. 5 illustrates the example Raman signal of FIG. 4 along with a probe beam.

FIG. 5 illustrates the example Raman signal 160 of FIG. 4 along with a probe beam 120*pr*. The Raman signal 160 may be produced by stimulated Raman scattering of the pump beam 120*pu* and Stokes beam 120S, and the probe beam 120*pr* may be used to measure the Raman signal. The Raman signal 160 is centered at or near the frequency $v_2$ of the Stokes beam 120S, and the frequency $v_3$ of the probe beam of light 120*pr* overlaps the Raman signal 160 and is relatively close to the frequency $v_2$ of the Stokes beam of light 120S (e.g., the probe-beam frequency $v_3$ may be within 200 GHz of the Stokes-beam frequency $v_2$). In a coherent Raman spectroscopy system 100, the pump frequency $v_1$, Stokes frequency $v_2$, and probe frequency $v_3$ may each be between approximately 60 THz and approximately 1,000 THz (which corresponds to a wavelength between approximately 5,000 nm and approximately 300 nm). For example, in FIG. 5 the pump frequency $v_1$ may be 291 THz (which corresponds to a wavelength of approximately 1030 nm), the Stokes frequency $v_2$ may be 240.03 THz (which corresponds to a wavelength of approximately 1249.00 nm), and the probe frequency $v_3$ may be 240.00 THz (which corresponds to a wavelength of approximately 1249.14 nm).

Each of the light sources 110 of a coherent Raman spectroscopy system 100 may include a wavelength-tunable light source. A wavelength-tunable light source refers to a light source 110 that can produce light at multiple different wavelengths within a range of wavelengths (or equivalently, at multiple different frequencies within a range of frequencies). For example, the probe light source 110*pr* in FIG. 1 may be a wavelength-tunable light source where the wavelength of the probe beam 120*pr* is adjustable over an 80-nm wavelength range from 1490 nm to 1570 nm (which corresponds to a 10.3 THz frequency range from approximately 201.2 THz to approximately 191.0 THz). At any given time, a wavelength-tunable light source 110 may operate at any one of the different wavelengths within its wavelength-tuning range. For example, during a first period of time, the probe light source 110*pr* with a 1490-1570 nm wavelength-tuning range may produce a probe beam 120*pr* at 1500 nm, and during a subsequent second period of time, the probe light source may be tuned to operate at 1560 nm. A wavelength-tunable light source may be adjustable over a frequency range that corresponds to a wavelength range having a width or span between approximately 10 nm and approximately 100 nm. For example, the width of the wavelength-tuning range of a wavelength-tunable light source may be approximately 10 nm, 20 nm, 30 nm, 40 nm, 50 nm, 60 nm, 80 nm, or 100 nm. A wavelength-tuning range from 1490 nm to 1570 nm may be referred to as having an 80-nm width or an 80-nm span. Around 1550 nm, a 10-nm wavelength-tuning range corresponds to a frequency-tuning range of approximately 1.25 THz (or equivalently, 41.6 $cm^{-1}$), and a 100-nm wavelength-tuning range corresponds to a frequency-tuning range of approximately 12.5 THz (or equivalently, 416 $cm^{-1}$). Around 1050 nm, a 10-nm wavelength-tuning range corresponds to a frequency-tuning range of approximately 2.72 THz (or equivalently, 90.7 $cm^{-1}$), and a 100-nm wavelength-tuning range corresponds to a frequency-tuning range of approximately 27.3 THz (or equivalently, 909 $cm^{-1}$). A wavelength-tunable light source may be referred to as a frequency-tunable light source or a tunable light source.

Each of the light sources 110 of a coherent Raman spectroscopy system 100 may include one or more laser diodes, and each of the laser diodes may be a fixed-wavelength laser diode or a wavelength-tunable laser diode. A fixed-wavelength laser diode may operate at a single wavelength or within a relatively narrow wavelength range (e.g., within 0.1 nm of a particular wavelength). A fixed-wavelength laser diode may include a distributed feedback (DFB) laser diode, a distributed Bragg reflector (DBR) laser diode, a fiber-Bragg-grating (FBG) stabilized laser diode, a temperature-stabilized laser diode, or any other suitable fixed-wavelength laser diode. A wavelength-tunable laser diode may produce light at multiple different wavelengths within a range of wavelengths. For example, a wavelength-tunable laser diode may be configured to produce light at any wavelength within a wavelength range having a width between approximately 10 nm and approximately 100 nm. At any given time, a wavelength-tunable laser diode may operate at any one wavelength of multiple different wavelengths within a range of wavelengths. A wavelength-tunable laser diode may include an external-cavity laser diode, a thermally tuned laser diode, or a sampled-grating distributed Bragg reflector (SG-DBR) laser. For example, a wavelength-tunable SG-DBR laser may have a 40-nm wavelength-tuning range that extends from 1530 nm to 1570 nm, and the SG-DBR laser may be adjustable to operate at any single wavelength within the 40-nm wavelength range. A wavelength-tunable laser diode may be referred to as a frequency-tunable laser diode or a tunable laser diode. For example, a tunable laser with a 40-nm wavelength-tuning range that extends from 1530 nm to 1570 nm may also be referred to as a frequency-tunable laser with a 5.0-THz frequency-tuning range that extends from approximately 191 THz to approximately 196 THz.

Each of the light sources 110 of a coherent Raman spectroscopy system 100 may include one or more of the following: light-emitting diode (LED), super-luminescent light source, short-pulse laser, broadband light source, fiber laser, solid-state laser, quantum-cascade laser. For example, a light source that produces light over a relatively broad range of wavelengths (e.g., a super-luminescent light source, short-pulse laser, or broadband light source) may be used to investigate a sample over the broad range of wavelengths without having to use a wavelength-tunable light source.

Figure 6:
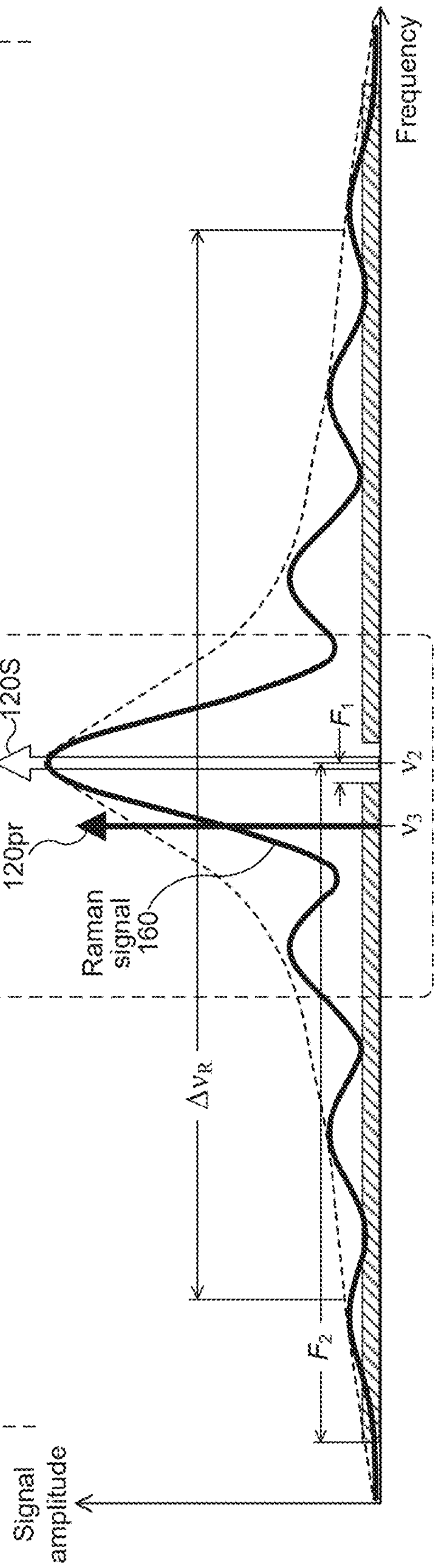
FIG. 6 illustrates an expanded view of a portion of the Raman signal of FIG. 5.

FIG. 6 illustrates an expanded view of a portion of the Raman signal 160 of FIG. 5. The portion of FIG. 5 enclosed by the dashed-line box is expanded in FIG. 6. The peak of the Raman signal 160 in FIG. 6 is approximately coincident with the frequency $v_2$ of the Stokes beam 120S, and the frequency $v_3$ of the probe beam 120*pr* overlaps the Raman signal.

The Raman signal 160 in FIG. 6 is an optical signal with a spectral linewidth of $\Delta v_R$. The spectral linewidth of a Raman signal 160 may have a value between approximately 30 GHz and 300 GHz (or, in wavenumbers, between approximately 1 $cm^{-1}$ and approximately 10 $cm^{-1}$). The spectral linewidth $\Delta v_R$ of a Raman signal 160 may represent the spectral width of a peak of the Raman signal (e.g., a full-width-at-half-maximum of the peak) or may represent an approximate extent or width of the full Raman signal. For example, the spectral linewidth $\Delta v_R$ of the Raman signal 160 in FIG. 13 corresponds to a full-width-at-half-maximum of a peak of the Raman signal. In FIG. 6, the spectral linewidth $\Delta v_R$ of the Raman signal 160 corresponds to an extent or width of the full Raman signal. For example, the spectral linewidth of a Raman signal 160 may equal a spectral width at which an envelope of the Raman signal has decreased to a particular level (e.g., to 50%, 20%, or 10% of a peak value). The envelope may be a curve that decreases monotonically away from a peak of the Raman signal and approximately follows an overall shape of the Raman signal. In FIG. 6, the dashed-line curve that traces the peaks of the Raman signal 160 represents an envelope of the Raman signal, and the spectral linewidth $\Delta v_R$ corresponds to a full-width-at-10% of the Raman-signal envelope (i.e., the points at which the envelope has decreased to 10% of its maximum value).

In a coherent Raman spectroscopy system 100, the difference between the frequency $v_2$ of the Stokes beam 120S and the frequency $v_3$ of the probe beam 120*pr* may be greater than a low-frequency limit $F_1$ and less than a high-frequency limit $F_2$ (i.e., $F_1<|v_2-v_3|<F_2$). For example, the low-frequency limit $F_1$ may be approximately 1 MHz, 10 MHz, 50 MHz, 100 MHz, 200 MHz, 500 MHz, or 1 GHz, and the high-frequency limit $F_2$ may be approximately 10 GHz, 20 GHz, 50 GHz, 100 GHz, 200 GHz, 500 GHz, or 1 THz. As another example, the low-frequency limit $F_1$ may be related to the spectral linewidth $\Delta v_{pr}$ of the probe beam 120*pr* and the spectral linewidth $\Delta v_S$ of the Stokes beam 120S (e.g., $F_1$ may be greater than $\Delta v_{pr}+\Delta v_S$). As another example, the high-frequency limit $F_2$ may be related to the spectral linewidth $\Delta v_R$ of a Raman signal 160 (e.g., $F_2$ may be approximately equal (0.5) $\Delta v_R$, $\Delta v_R$, or $2\Delta v_R$). As another example, $F_1$ may be 100 MHz and $F_2$ may be 200 GHz, which indicates that the frequency $v_2$ of the Stokes beam 120S and the frequency $v_3$ of the probe beam 120*pr* may differ by greater than 100 MHz and less than 200 GHz (i.e., 100 MHz$<|v_2-v_3|<$200 GHz). The frequencies $F_1$ and $F_2$ represent the frequency range with respect to the Stokes-beam frequency $v_2$ over which the probe-beam frequency $v_3$ may be scanned. The two hatched rectangles along the frequency axis in FIG. 6 represent the allowed frequency ranges for the probe beam 120*pr*. The frequency of the probe beam 120*pr* may be (i) between $v_2-F_2$ and $v_2-F_1$ or (ii) between $v_2+F_1$ and $v_2+F_2$. In an optical receiver 200, the probe beam 120*pr* and the Raman signal 160 may be coherently mixed together at an optical detector 220. The frequency $v_3$ of the probe beam 120*pr* may be kept away from the frequency $v_2$ of the Stokes beam 120S by at least the low-frequency limit $F_1$ (e.g., $|v_2-v_3|>F_1$) to avoid mixing between the probe and Stokes beams, which could cause the detector to produce an unwanted electronic signal not related to the mixing between the probe beam and Raman signal. Additionally, the frequency $v_3$ of the probe beam 120*pr* may be kept within the high-frequency limit $F_2$ of the frequency $v_2$ of the Stokes beam 120S (e.g., $|v_2-v_3|<F_2$), since measurements outside the high-frequency limit may not produce a significant electronic signal.

Figure 7:
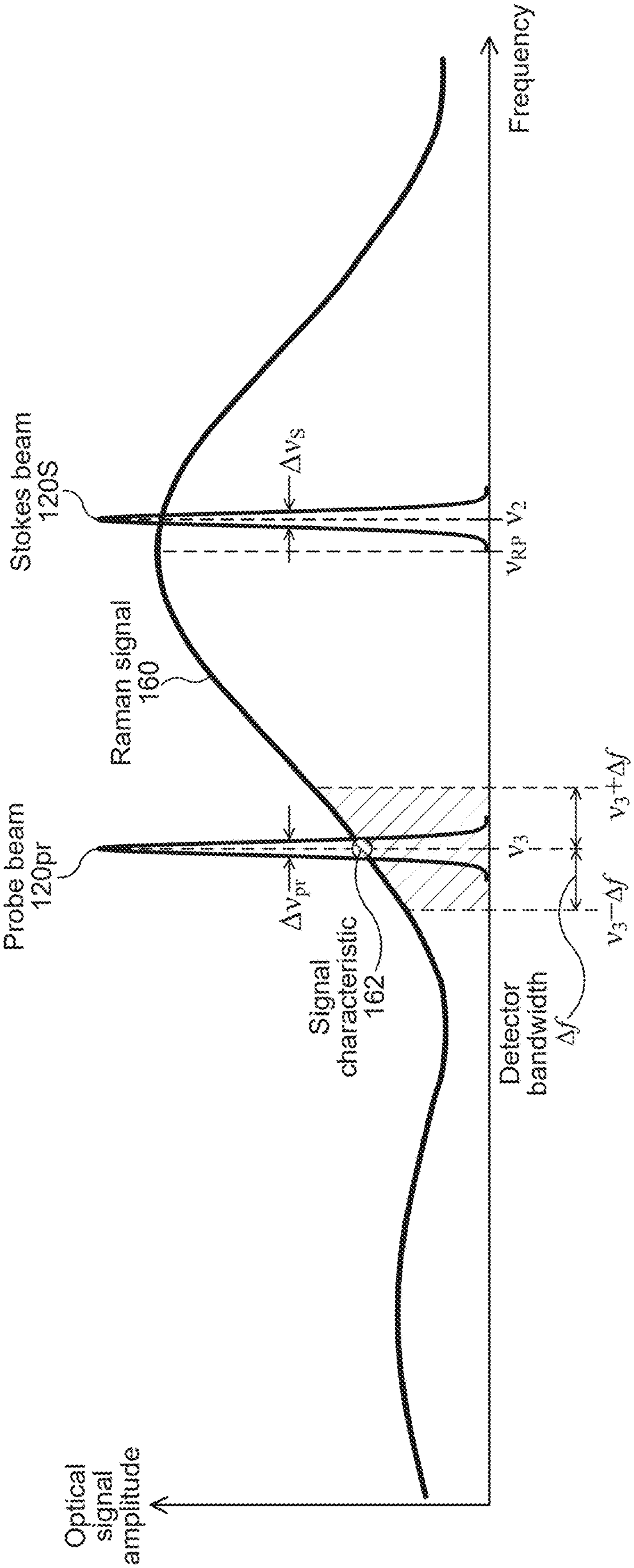
FIG. 7 illustrates an expanded view of a portion of the Raman signal of FIG. 6.

FIG. 7 illustrates an expanded view of a portion of the Raman signal 160 of FIG. 6. The portion of FIG. 6 enclosed by the dashed-line box is expanded in FIG. 7. The peak of the Raman signal 160 in FIG. 7 is located at frequency $v_{RP}$, and the Stokes beam 120S is located at the Stokes frequency $v_2$. The Raman-signal peak frequency $v_{RP}$ may correspond to a Raman peak of a material that is part of a sample 150 being measured by a Raman spectroscopy system 100. For example, the difference between the pump-beam frequency $v_1$ and the Raman-signal peak frequency $v_{RP}$ may equal a vibrational frequency Ω of the material (e.g., $v_1-v_{RP}=\Omega$). In some embodiments, a Stokes light source 110S may be operated so that the Stokes-beam frequency $v_2$ is approximately equal to the Raman-signal peak frequency $v_{RP}$, and in other embodiments (e.g., as illustrated in FIG. 7), the Stokes-beam frequency $v_2$ may be slightly off-resonance or detuned with respect to the Raman-signal peak frequency $v_{RP}$. For example, in FIG. 7, the Stokes-beam frequency $v_2$ may differ from the Raman-signal peak frequency $v_{RP}$ by less than or equal to 30 GHz, 10 GHz, 5 GHz, or 1 GHz.

The beams of light 120 produced by the pump, Stokes, and probe light sources 110 in a Raman spectroscopy system 100 may each have a spectral linewidth of less than 200 MHz. Additionally, one or more of the beams of light 120 may have a spectral linewidth of less than 1 MHz. For example, the spectral linewidth of a beam of light 120 may be less than 200 MHz, 100 MHz, 50 MHz, 10 MHz, 1 MHz, or 100 KHz. In FIG. 7, the spectral linewidth $\Delta v_{pr}$ of the probe beam 120*pr* and the spectral linewidth $\Delta v_S$ of the Stokes beam 120S may each be less than 200 MHz. In some embodiments, the probe light source 110*pr* may be configured to produce a probe beam 120*pr* having a relatively narrow spectral linewidth, which may allow a Raman spectroscopy system 100 to measure a Raman spectrum with a high degree of spectral resolution. For example, the spectral linewidth $\Delta v_{pr}$ of the probe beam 120*pr* in FIG. 7 may be less than 1 MHz.

An optical receiver 200 of a coherent Raman spectroscopy system 100 may include one or more detectors 220, where each detector is configured to coherently mix a portion of a Raman signal 160 with at least a portion of a probe beam of light 120*pr* to produce an electronic signal. For an optical receiver 200 with a single detector 220, all or most of the probe beam of light 120*pr* may be mixed with the Raman signal 160. For an optical receiver 200 with multiple detectors 220, the probe beam of light 120*pr* may be split so that a portion of the probe beam of light is sent to each of the detectors. For example, in an optical receiver 200 with four detectors 220, the probe beam 120*pr* may be split into four portions, and each detector may receive one of the four portions of the probe beam. Similarly, for an optical receiver 200 with a single detector 220, all or most of the Raman signal 160 may be sent to the single detector, and for an optical receiver with multiple detectors 220, the Raman signal 160 may be split so that a portion of the Raman signal is sent to each of the detectors.

Coherent mixing of a probe beam 120*pr* and a Raman signal 160, which may be referred to as heterodyne detection, may occur when the two optical signals are optically combined and then detected by a detector 220. Optically combining the probe beam 120*pr* and the Raman signal 160 may refer to combining the two optical signals so that their electric fields are summed together. For example, the probe beam and Raman signal may be combined (e.g., with an optical combiner 130) so that the two signals are substantially coaxial and travel together in the same direction and along approximately the same optical path. Additionally, the probe beam and Raman signal may be combined so that at least a portion of their polarizations have the same orientation to allow at least a portion of their electric fields to be summed together. Once the probe beam and Raman signal are optically combined to produce a combined probe-Raman signal 210, the probe beam and Raman signal may be coherently mixed at a detector 220. The detector 220 may produce a photocurrent signal i corresponding to the coherent mixing of the probe beam 120*pr* and a portion of the Raman signal 160.

The portion of a Raman signal 160 that is coherently mixed with a probe beam of light 120*pr* at a detector 220 to produce an electronic signal may refer to a spectral portion of the Raman signal. The spectral portion of a Raman signal 160 that is coherently mixed with a probe beam 120*pr* may include optical frequency components of the Raman signal that are within a particular frequency range of the frequency $v_3$ of the probe beam of light, where the particular frequency range is based on or depends on the electronic bandwidth Δf of the optical detector 220. In FIG. 7, the hatched region around the probe frequency $v_3$ represents the spectral portion of the Raman signal 160 that is coherently mixed with the probe beam 120*pr*. The particular frequency range illustrated by the hatched region extends from $v_3-\Delta f$ to $v_3+\Delta f$, where Δf is the electronic bandwidth of the detector. The particular frequency range includes the optical frequency components of the Raman signal 160 that are coherently mixed with the probe beam 120*pr* to produce an electronic signal.

The electronic signal produced by the detector 220 in response to the coherent mixing of the portion of the Raman signal 160 and probe beam 120*pr* may include one or more electronic frequency components, where each electronic frequency component has a frequency less than or equal to approximately Δf. For example, the electronic bandwidth Δf of the optical detector may be 10 GHz, and the electronic signal produced by the detector may include one or more electronic frequency components having frequencies less than or equal to approximately 10 GHz. Other optical frequency components of the Raman signal 160 that are outside the hatched region (e.g., optical frequencies less than $v_3-\Delta f$ and greater than $v_3+\Delta f$) may produce a coherent-mixing response in the detector 220. However, since these Raman-signal optical frequency components would produce an electronic response at frequencies greater than Δf (which is outside of the electronic bandwidth of the detector), these optical frequency components will not result in any significant contribution to the electronic signal. The electronic bandwidth of the detector 220 effectively limits or filters the optical frequency components of the Raman signal 160 that are measured by the optical receiver 200 to optical frequency components that are within a particular frequency range of the probe frequency. Accordingly, the electronic bandwidth of the detector 220, in combination with the relatively narrow spectral linewidth of the probe beam 120*pr*, may allow a Raman spectroscopy system 100 to measure a Raman signal 160 with a high degree of spectral resolution. Herein, an optical frequency or an optical frequency component refers to a signal in the optical domain between approximately 60 THz and approximately 1,000 THz, and an electronic frequency or an electronic frequency component refers to a signal in the electronic domain between 0 Hz and approximately 50 GHz.

The electronic signal that results from coherent mixing of a Raman signal 160 and a probe beam 120*pr* may include a coherent-mixing term that is proportional to a product of (i) $E_R$, the amplitude of the electric field of the Raman signal and (ii) $E_{pr}$, the amplitude of the electric field of the probe beam. The photocurrent signal i produced by a detector 220 in response to the coherent mixing of a Raman signal 160 and a probe beam 120*pr* may be proportional to the square of the summed electric fields of the probe beam 120*pr* and a spectral portion of the Raman signal 160. This type of detector 220 that produces a photocurrent signal i that is proportional to the square of a received electric field may be referred to as a square-law detector. The photocurrent signal i may be expressed as $i(t)=k|\varepsilon_R(t)+\varepsilon_{pr}(t)|^2$, where k is a constant (e.g., k may account for the responsivity of the detector 220 as well as other constant parameters or conversion factors). For clarity, the constant k or other constants (e.g., conversion constants or factors of 2 or 4) may be excluded from expressions herein related to the photocurrent i or the voltage signal 234. In the above expression for i(t), $\varepsilon_R(t)$ is the electric field of the Raman signal 160, and $\varepsilon_{pr}(t)$ is the electric field of the probe beam 120*pr*. The electric field of the Raman signal 160 may be expressed as $E_R \cos[2\pi v_R t+\phi_R]$, where $E_R$ is the amplitude of the electric field of the Raman signal. The electric field of the probe beam 120*pr* may be expressed as $E_{pr} \cos[2\pi v_3 t+\phi_{pr}]$, where $E_{pr}$ is the amplitude of the electric field of probe beam. The frequency $v_R$ is the optical frequency of the electric field of the spectral portion of the Raman signal 160 that is coherently mixed with the probe beam 120*pr*. The frequency $v_R$ may include the optical frequency components of the Raman signal 160 from $v_3-\Delta f$ to $v_3+\Delta f$, where $\Delta f$ is the electronic bandwidth of the detector. The frequency $v_3$ is the optical frequency of the electric field of the probe beam 120*pr*. The term OR is the phase of the electric field of the Raman signal 160, and the term $\phi_{pr}$ is the phase of the electric field of the probe beam 120*pr*.

The above expression for the photocurrent signal i may be expanded and written as $$i(t) = E_R^2 + E_{pr}^2 + 2E_R E_{pr}\cos[2\pi(v_R - v_3)t + \Delta\phi],$$

where, for clarity, the constant k is not included. In this expanded expression for the photocurrent signal i(t), the first term $$E_R^2$$

corresponds to the optical power ($P_R$) of the Raman signal 160, and the second term $$E_{pr}^2$$

corresponds to the optical power ($P_{pr}$) of the probe beam 120*pr*. The third term in the above expression is $2E_RE_{pr} \cos[2\pi(v_R-v_3)t+\Delta\phi]$ and may be referred to as a coherent-mixing term that represents coherent mixing between the electric fields of the Raman signal 160 and probe beam 120*pr*. The phase difference $\Delta\phi$ is the phase difference between the electric fields of the Raman signal and the probe beam (e.g., $\Delta\phi=\phi_R-\phi_{pr}$). The coherent-mixing term is proportional to $E_R \times E_{pr}$, which is the product of the electric-field amplitudes of the Raman signal 160 and the probe beam 120*pr*. Additionally, the coherent-mixing term includes a cosine function that varies in time based on the frequency difference $(v_R-v_3)$ between the Raman signal 160 and the probe beam 120*pr*. Since the spectral portion of the Raman signal 160 that is coherently mixed with the probe beam 120*pr* includes the optical frequency components of the Raman signal from $v_3-\Delta f$ to $v_3+\Delta f$, the frequency-difference term $(v_R-v_3)$ may include frequency components from zero to $\Delta f$. Accordingly, the coherent-mixing term may be referred to as including multiple electronic frequency components, where each electronic frequency component is proportional to $E_RE_{pr} \cos[2\pi ft+\Delta\phi]$. The frequency f, which may be referred to as an electronic frequency, is equal to the frequency difference $(v_R-v_3)$ and has a value between zero and $\Delta f$. The coherent-mixing term may also be expressed as $2\sqrt{P_R}\sqrt{P_{pr}} \cos[2\pi ft+\Delta\phi]$, where $P_R$ is the optical power of the Raman signal 160 and $P_{pr}$ is the optical power of the probe beam 120*pr*.

Figure 8:
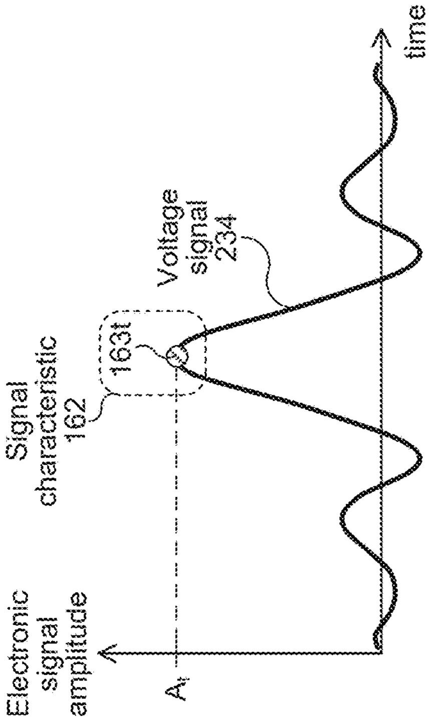
FIGS. 8-10 illustrate time-domain and frequency-domain plots of an example electronic signal resulting from coherent mixing of the Raman signal and probe beam of FIG. 7.
Figure 9:
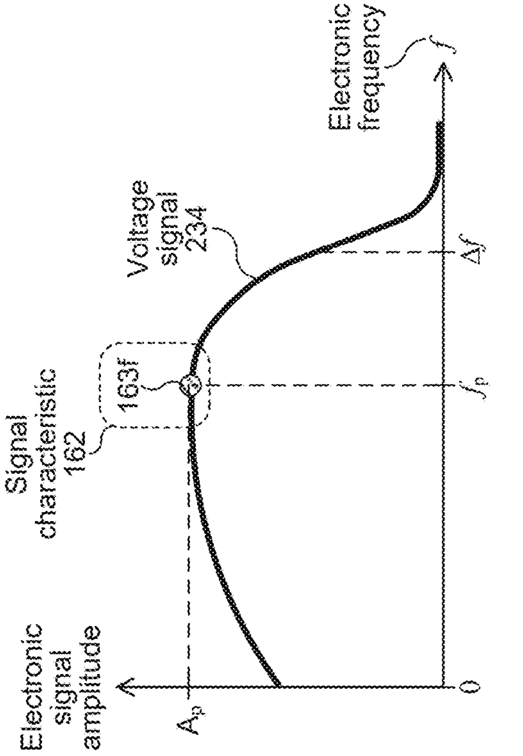
Figure 10:
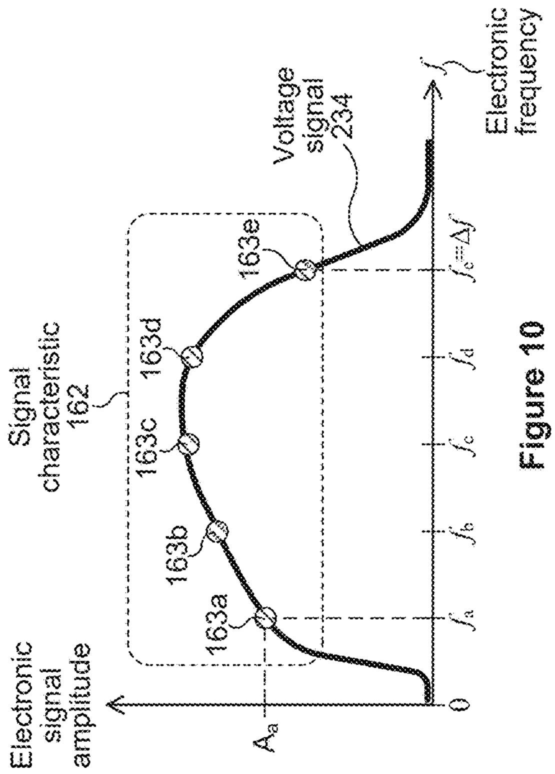

FIGS. 8-10 illustrate time-domain and frequency-domain plots of an example electronic signal resulting from coherent mixing of the Raman signal 160 and probe beam 120*pr* of FIG. 7. The electronic signal produced by a detector 220 may be a photocurrent signal i, and an electronic amplifier 232 may produce a voltage signal 234 that corresponds to the photocurrent signal i. The voltage signal 234 may be approximately proportional to the photocurrent signal i, and both the voltage and photocurrent signals may be proportional to $P_R+P_{pr}+2\sqrt{P_R}\sqrt{P_{pr}} \cos[2\pi ft+\Delta\phi]$, where the electronic frequency f is equal to the frequency difference $(v_R-v_3)$. The electronic frequency f may take on multiple values (or a continuous range of values) between zero and $\Delta f$, and so, the voltage signal 234 in the time domain may be viewed as a summation over these multiple frequency components. In the frequency domain, the voltage signal 234 may have frequency components that extend from DC to $\Delta f$ (or, for an amplifier 232 with a low-frequency cutoff filter, from the low-frequency cutoff to $\Delta f$). The two terms $P_R$ and $P_{pr}$ represent the optical powers of the Raman signal and probe beam. Over the time duration of a measurement, the powers of the Raman signal and probe beam may be approximately constant, and so the contribution of $P_R+P_{pr}$ in the above expression may correspond to a DC offset with little or no time variation. An electronic amplifier 232 may include a high-pass or band-pass filter that removes or attenuates the DC or low-frequency components, resulting in an electronic signal with little or no DC offset (e.g., as illustrated by the time-domain voltage signal 234 in FIG. 8).

The signal characteristic 162 in each of FIGS. 7-10 represents a characteristic of an electronic signal (e.g., a characteristic of a photocurrent signal i or a characteristic of a corresponding voltage signal 234) associated with a Raman signal 160. A signal characteristic 162 may be determined from a digital signal 240, where the digital signal is a digital representation of a photocurrent signal i or a voltage signal 234. A characteristic 162 of an electronic signal may be determined by a processor of a Raman spectroscopy system 100 and may include one or more data points 163, where each data point represents: a peak amplitude, an average amplitude, an amplitude at a particular frequency, an amplitude at a particular time, an amplitude at a frequency center, an amplitude at a temporal center, an area, a frequency (e.g., an electronic frequency or an optical frequency), a phase, or a polarization. A Raman spectroscopy system 100 may measure one or more signal characteristics 162 associated with one or more Raman signals 160, and based on the measured characteristics, a processor may determine (i) whether a particular material is present in a sample or (ii) an amount or a concentration of the particular material in the sample.

FIG. 8 illustrates an example time-domain plot of a voltage signal 234 resulting from coherent mixing of the Raman signal 160 and probe beam 120*pr* of FIG. 7. A digitizer 236 (e.g., an ADC) may produce a digital signal 240 that represents the voltage signal 234 in the time domain, and a processor may determine a characteristic 162 of the electronic signal based on the digital signal. The signal characteristic 162 in FIG. 8 includes a single data point 163*t* which represents a peak amplitude $A_t$ of the time-domain voltage signal 234. The signal characteristic 162 may also include the optical frequency $v_3$ that the probe beam 120*pr* was set to when the electronic signal was obtained. Other time-domain-type data points 163 associated with the signal characteristic 162 in FIG. 8 may include (i) an amplitude of the time-domain voltage signal 234 at a particular time (e.g., at a temporal center) or (ii) an area associated with the voltage signal. For an area associated with the voltage signal 234, a processor may first convert the voltage signal into a non-negative signal (e.g., by taking the absolute value or by squaring the values of the voltage signal) and then integrate the non-negative signal to determine an area under the curve.

A processor of a Raman spectroscopy system 100 may determine a Fourier transform of a digital signal 240. A voltage signal 234 may be a time-domain signal, and the digital signal 240 may be a time-domain digital representation of the voltage signal 234. The Fourier transform of the digital signal 240 may produce a frequency-domain representation of the voltage signal 234. From the Fourier transform, the processor may determine one or more electronic frequency components of the voltage signal 234. Determining a frequency component of a voltage signal 234 may include determining an amplitude of the frequency-domain voltage signal at a particular frequency (e.g., at 4 GHz). FIGS. 9-10 each illustrates an example frequency-domain plot of a voltage signal 234 resulting from coherent mixing of the Raman signal 160 and probe beam 120*pr* of FIG. 7. The frequency-domain plots may be determined by taking a Fourier transform (e.g., a discrete Fourier transform or a fast Fourier transform) of a time-domain digital signal 240 that represents a time-domain voltage signal 234. The x-axis of each of the frequency-domain plots in FIGS. 9-10 is labeled as "electronic frequency" to clarify and distinguish it from the x-axis of the frequency-domain plots in FIGS. 3-7. The x-axis of each of the frequency-domain plots in FIGS. 3-7 may be referred to as an "optical frequency," where the pump beam 120*pu*, Stokes beam 120S, Raman signal 160, and probe beam 120*pr* each have frequencies in the optical domain (e.g., in the range of 60-1,000 THz). In contrast, the x-axis of each of the frequency-domain plots in FIGS. 9-10 includes frequencies in the electronic domain (e.g., in the range of DC to 50 GHz). Coherent mixing of a Raman signal 160 and probe beam 120*pr* (which are signals in the optical domain) produces an electronic signal that can be detected and analyzed using electronic techniques. The y-axis of each of the plots in FIGS. 8-10 is labeled "electronic signal amplitude" and may have units of voltage, current, or electrical power (e.g., watts).

In FIG. 9, the frequency-domain voltage signal 234 has non-zero frequency components that extend from DC (i.e., zero hertz) to the detector-bandwidth frequency Δf. In FIG. 10, the frequency-domain voltage signal drops off before reaching zero hertz, indicating that the corresponding voltage signal 234 may have been AC-coupled or high-pass filtered to remove the DC or low-frequency components. The signal characteristic 162 in FIG. 9 includes a single data point 163*f* which represents a peak amplitude $A_p$ of the frequency-domain voltage signal 234. The data point 163*f* may include the peak amplitude $A_p$ or the frequency f, at which the peak amplitude is located. The signal characteristic 162 in FIG. 10 includes five data points: data point 163*a* at frequency $f_a$, data point 163*b* at frequency $f_b$, data point 163*c* at frequency $f_c$, data point 163*d* at frequency $f_d$, and data point 163*e* at frequency $f_e$. Each data point 163 in FIG. 10 may include an amplitude value (e.g., amplitude Aa may be associated with data point 163*a*) or a frequency (e.g., frequency $f_a$ may be associated with data point 163*a*). The frequencies associated with the data points 163 in FIG. 10 may have particular values. For example, the detector bandwidth Δf may be 5 GHz, and the frequencies $f_a$, $f_b$, $f_c$, $f_d$, and $f_e$ may have respective values of approximately 1 GHz, 2 GHz, 3 GHz, 4 GHz, and 5 GHz. Other frequency-domain-type data points 163 associated with the signal characteristic 162 in FIG. 9 or 10 may include (i) an amplitude of the frequency-domain voltage signal 234 at a particular frequency or at a center frequency or (ii) an area or an average amplitude associated with the frequency-domain voltage signal 234. Additionally, the signal characteristic 162 in FIG. 9 or 10 may include the optical frequency $v_3$ that the probe beam 120*pr* was set to when the voltage signal 234 was obtained.

A processor of a coherent Raman spectroscopy system 100 may associate a determined signal characteristic 162 with a Raman frequency shift. For example, the signal characteristic 162 in FIG. 7 may be associated with a Raman frequency shift having a frequency $v_1-v_3$, which is the difference between the pump-beam frequency $v_1$ and the probe-beam frequency $v_3$. A sample 150 under investigation may include a material with a Raman spectrum having a peak at a frequency Ω, which is approximately equal to $v_1-v_{RP}$, the difference between the pump-beam frequency $v_1$ and the Raman-signal peak frequency $v_{RP}$. The peak frequency Ω may be approximately equal to a vibrational frequency of the material and may correspond to a Raman frequency shift of Ω (e.g., when excited with light at a frequency v, the material may produce Raman-shifted light at the frequencies v+Ω and v−Ω). In FIG. 7, the probe beam 120*pr* is being used to measure the Raman signal 160 at the probe-frequency $v_3$, and the resulting signal characteristic 162 that is determined may be associated with a Raman spectrum of the material at the frequency $v_1-v_3$, which may be referred to as a Raman frequency shift of $v_1-v_3$.

Figure 11:
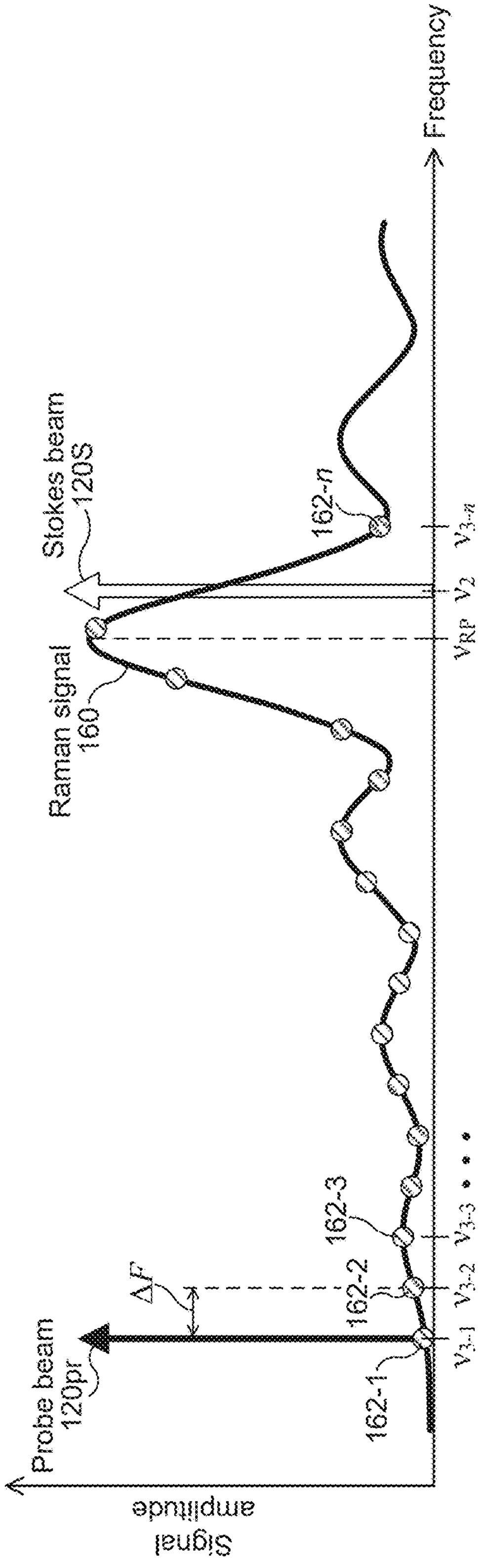
FIG. 11 illustrates an example Raman signal that is measured at multiple probe frequencies.

FIG. 11 illustrates an example Raman signal 160 that is measured at multiple probe frequencies $v_3$. The probe beam 120*pr* is tuned to multiple different probe frequencies ($v_{3-1}$, $v_{3-2}$, $v_{3-3}$, . . . $v_{3-n}$) to measure multiple respective signal characteristics (162-1, 162-2, 162-3, . . . 162-*n*) of the Raman signal 160. The Raman signal 160 is produced by coherent Raman scattering of pump and Stokes beams within a sample 150. Throughout the measurements of the multiple signal characteristics 162 in FIG. 11, the pump-beam frequency $v_1$ and the Stokes-beam frequency $v_2$ may remain substantially constant so that the resulting Raman signal 160 also remains substantially constant (e.g., the Raman signal may exhibit substantially the same shape and amplitude throughout the measurements). The number n of signal characteristics 162 that are measured may be 1, 5, 10, 50, 100, 500, 1,000, or any other suitable number of signal characteristics. At each of the n probe frequencies, the probe beam 120*pr* may be coherently mixed with a spectral portion of the Raman signal 160 that is within a particular frequency range of the probe frequency $v_3$ (e.g., within $\Delta f$ of the probe frequency, as illustrated in FIG. 7) to measure one signal characteristic 162. Each signal characteristic 162 may provide information about the Raman signal 160 in the frequency region from $v_3-\Delta f$ to $v_3+\Delta f$. Based on one or more measured signal characteristics 162, a processor may determine (i) whether a particular material is present in a sample or (ii) an amount or a concentration of the particular material in the sample.

At each of the n probe frequencies, a single measurement may be performed, or multiple measurements may be performed. For example, with the probe beam 120*pr* in FIG. 11 set to the probe-beam frequency $v_{3-1}$, an optical receiver 200 may measure a single photocurrent signal i and produce a corresponding single digital output signal 240. From that one output signal 240, a processor may determine a signal characteristic 162-1. Alternatively, with the probe beam 120*pr* in FIG. 11 set to the probe-beam frequency $v_{3-1}$, an optical receiver 200 may measure a series of multiple photocurrent signals i (e.g., 2, 4, 10, 20, 50, 100, or any other suitable number of signals) and produce multiple corresponding digital output signals 240. A processor may determine one signal characteristic 162-1 from the multiple digital output signals. For example, the processor may average or otherwise combine the multiple digital output signals 240 to produce one signal characteristic 162-1. Measurement of a series of multiple photocurrent signals i may improve the measurement accuracy by averaging out noise or removing outliers from the measurements.

By tuning the probe-beam frequency $v_3$ to multiple frequencies across at least a portion of a Raman signal 160, a coherent Raman spectroscopy system 100 may measure the Raman signal at multiple points 162. For example, the probe-beam frequency $v_3$ in FIG. 6 may be tuned across at least a portion of the frequency range between $v_2-F_2$ and $v_2-F_1$ or between $v_2+F_1$ and $v_2+F_2$. Each of the different probe-beam frequencies to which the probe beam 120*pr* is changed may be offset from an adjacent probe-beam frequency by a frequency increment $\Delta F$ between approximately 10 MHz and approximately 10 GHz. For example, the probe-beam frequency in FIG. 11 may be changed in frequency increments $\Delta F$ of approximately 5 GHz as it is tuned across at least a portion of the Raman signal 160. Each signal characteristic 162 in FIG. 11 is plotted along the x-axis at the probe frequency $v_3$ at which the signal characteristic was obtained. The y-axis in FIG. 11 may represent an amplitude or area associated with the signal characteristics 162. For example, each signal characteristic 162 in FIG. 11 may be plotted along the y-axis at a value corresponding to an amplitude or an area of an electronic signal from which the signal characteristic was obtained.

A probe light source 110*pr* of a coherent Raman spectroscopy system 100 may include a wavelength-tunable laser, where the frequency $v_3$ of the probe beam 120*pr* is adjustable by changing the wavelength of light produced by the wavelength-tunable laser. For example, a wavelength-tunable laser may be adjustable over a wavelength range having a width between approximately 10 nm and approximately 100 nm. As another example, the wavelength-tuning range of a wavelength-tunable laser may be between approximately 1000 nm and approximately 1100 nm, between approximately 1490 nm and approximately 1570 nm, or between approximately 1600 nm and approximately 1690 nm. A wavelength-tunable laser may be continuously tunable over a wavelength-tuning range or may be tunable to multiple discrete wavelengths within a wavelength-tuning range. For example, a wavelength-tunable laser may be continuously tunable to any wavelength between 1530 nm and 1570 nm. Alternatively, a wavelength-tunable laser may be tunable to a set of approximately 10, 100, or 1,000 discrete wavelengths between 1530 nm and 1570 nm (e.g., the wavelengths may be separated from one another by approximately 4 nm, 0.4 nm, or 0.04 nm, respectively). A probe light source 110*pr* may include a wavelength-tunable laser that sequentially changes the probe-beam frequency $v_3$ to multiple different frequencies. For example, the probe-beam frequency in FIG. 6 may be tuned to approximately 100 different frequencies between the frequencies $v_2-F_2$ and $v_2-F_1$. At each of the different probe-beam frequencies, the probe beam 120*pr* and a spectral portion of the Raman signal 160 may be coherently mixed at a detector 220 to produce a corresponding electronic signal, and a processor may determine a signal characteristic 162 based on the electronic signal.

In FIG. 11, the probe beam 120*pr* may initially be set to the probe-beam frequency $v_{3-1}$ and coherently mixed at a detector 220 with a spectral portion of the Raman signal 160 around the probe frequency $v_{3-1}$. For example, the spectral portion of the Raman signal 160 may include optical frequency components of the Raman signal from $v_{3-1}-\Delta f$ to $v_{3-1}+\Delta f$, where $\Delta f$ is the electronic bandwidth of the optical detector 220. A processor may determine a signal characteristic 162-1 based on the electronic signal resulting from the coherent mixing of the probe beam 120*pr* at frequency $v_{3-1}$ and the associated spectral portion of the Raman signal 160. After measuring the Raman signal 160 around the probe frequency $v_{3-1}$, the probe light source 110*pr* may change the probe-beam frequency by a frequency change $\Delta F$ to the frequency $v_{3-2}$. The probe frequency $v_{3-2}$ is equal to $v_{3-1}+\Delta F$, and the frequency change $\Delta F$ between adjacent frequencies may be between approximately 10 MHz and approximately 10 GHz. The frequency change $\Delta F$ may be a fixed value or may be dynamically adjusted during a measurement of a Raman signal 160. After the probe-beam frequency is changed to $v_{3-2}$, the probe beam 120*pr* may be coherently mixed with the spectral portion of the Raman signal 160 around the probe frequency $v_{3-2}$ (e.g., the spectral portion may include optical frequency components of the Raman signal from $v_{3-2}-\Delta f$ to $v_{3-2}+\Delta f$). A processor may determine a signal characteristic 162-2 based on the electronic signal resulting from the coherent mixing of the probe beam 120*pr* at frequency $v_{3-2}$ and the associated spectral portion of the Raman signal 160. After measuring the Raman signal 160 around the probe frequency $v_{3-2}$, the probe light source 110*pr* may change the probe-beam frequency by the frequency change $\Delta F$ to the frequency $v_{3-3}$, and a measurement of the Raman signal 160 around the frequency $v_{3-3}$ may be performed. The Raman spectroscopy system 100 may sequentially change the frequency $v_3$ of the probe light source and measure a spectral portion of the Raman signal 160 at each frequency until reaching the final probe frequency $v_{3-n}$. During the measurements, the probe-beam frequency $v_3$ may be tuned so that it avoids overlapping with the frequency $v_2$ of the Stokes beam to prevent mixing between the probe and Stokes beams.

Figure 12:
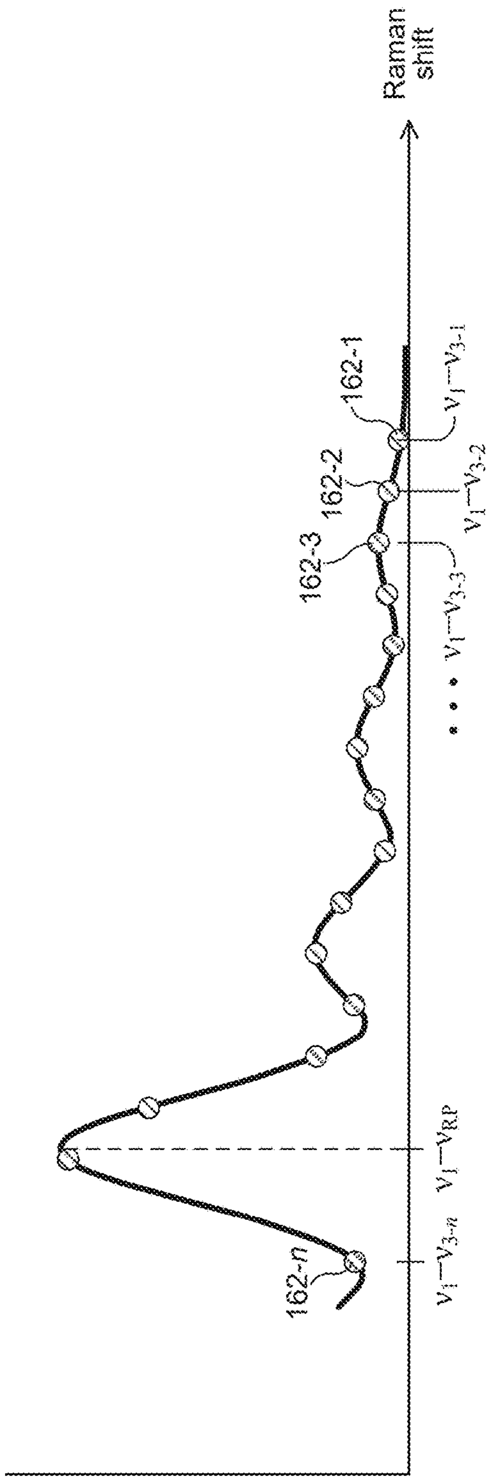
FIG. 12 illustrates an example Raman spectrum corresponding to the Raman signal of FIG. 11.

FIG. 12 illustrates an example Raman spectrum corresponding to the Raman signal of FIG. 11. A Raman spectroscopy system 100 may measure a sample 150 and determine the signal characteristics 162 of the Raman signal 160 in FIG. 11, and the corresponding Raman spectrum in FIG. 12 may represent the Raman spectrum of one or more materials that are part of the sample 150. For example, the sample 150 may include glucose and the peak frequency $v_1-v_{RP}$ of the Raman spectrum may be approximately equal to a frequency $\Omega$ of a molecular vibration of glucose. A processor of the Raman spectroscopy system 100 may determine the Raman spectrum in FIG. 12 based on the signal characteristics 162 (and the associated probe-beam frequencies $v_3$) of the Raman signal 160 in FIG. 11. Each signal characteristic 162 of a Raman signal 160 measured at a probe frequency $v_3$ may be associated with a Raman frequency shift having a frequency $v_1-v_3$, where $v_1$ is the pump-beam frequency. To determine the Raman spectrum, each signal characteristic 162 may be transformed from its Raman-signal frequency $v_3$ to a corresponding Raman-shift frequency $v_1-v_3$. For example, the processor may associate the signal characteristic 162-1 at frequency $v_{3-1}$ in FIG. 11 with a Raman shift having the frequency $v_1-v_{3-1}$ in FIG. 12. Similarly, the signal characteristic 162-2 at frequency $v_{3-2}$ in FIG. 11 may be associated with a Raman shift having the frequency $v_1-v_{3-2}$ in FIG. 12, and the signal characteristic 162-3 at frequency $v_{3-3}$ in FIG. 11 may be associated with a Raman shift having the frequency $v_1-v_{3-3}$ in FIG. 12. Additionally, the peak frequency $v_{RP}$ of the Raman signal 160 in FIG. 11 may correspond to the Raman-signal peak in FIG. 12 with a frequency of $v_1-v_{RP}$, which in turn may correspond to the vibrational frequency $\Omega$ of a particular material.

Based on the Raman spectrum in FIG. 12, a processor may determine (i) whether a particular material is present in a sample 150 or (ii) an amount or a concentration of the particular material in the sample 150. For example, the processor may compare one or more peaks, signal characteristics 162, or other features of the Raman spectrum in FIG. 12 to a previously determined Raman spectrum for glucose. If one or more peaks or characteristics 162 of the Raman spectrum in FIG. 12 match or line up with peaks or characteristics of the Raman spectrum for glucose, then the processor may determine that glucose is present in the sample 150. Alternatively, if the Raman spectrum in FIG. 12 is missing one or more peaks or characteristics of the Raman spectrum for glucose, then the processor may determine that little or no glucose is present in the sample 150. As another example, the processor may determine the amount or concentration of glucose in the sample 150 based on the Raman spectrum in FIG. 12. The concentration of glucose in the sample 150 may be related to the amplitude or height of one or more peaks of the Raman spectrum in FIG. 12 (e.g., the glucose concentration may be approximately proportional to the height of one or more Raman peaks). The concentration of glucose may then be determined based at least in part on the height of the Raman peak located at the Raman-shift frequency $v_1-v_{RP}$.

Figure 13:
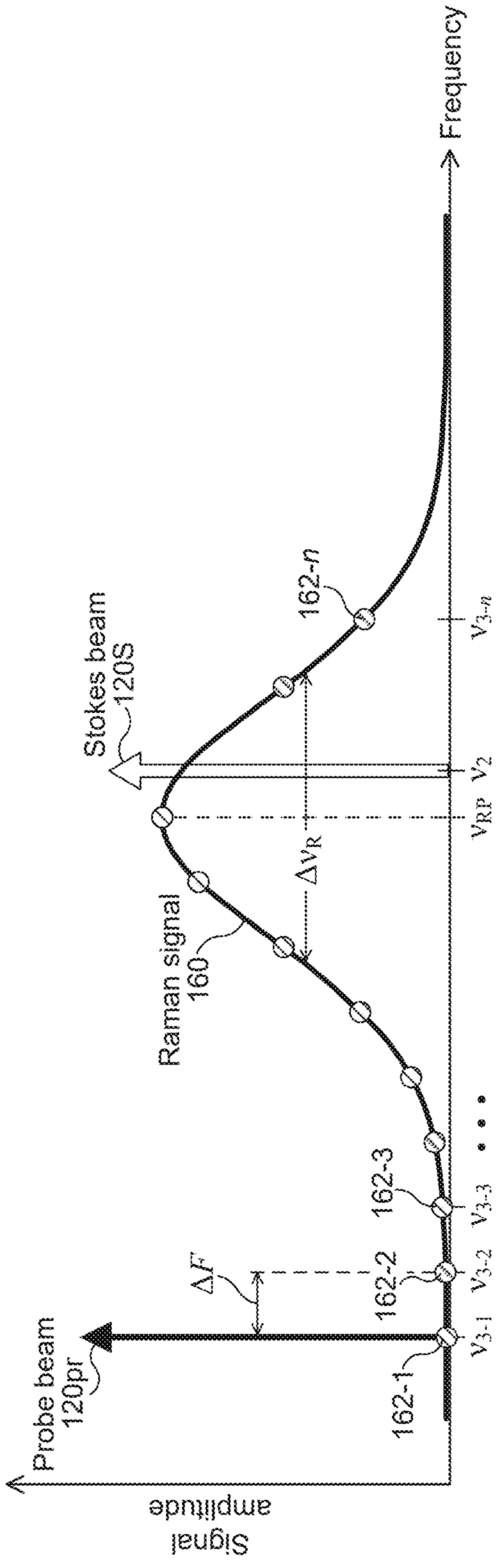
FIG. 13 illustrates another example Raman signal that is measured at multiple probe frequencies.

FIG. 13 illustrates another example Raman signal 160 that is measured at multiple probe frequencies. The probe beam 120*pr* is tuned to multiple different probe frequencies ($v_{3-1}$, $v_{3-2}$, $v_{3-3}$, . . . $v_{3-n}$) to measure multiple respective signal characteristics (162-1, 162-2, 162-3, . . . 162-*n*) of the Raman signal 160. The Raman signal 160 in FIG. 13 has a single peak centered at frequency $v_{RP}$ with a spectral linewidth of $\Delta v_R$. The Raman signal 160 in FIG. 11 has one main peak located at frequency $v_{RP}$ along with multiple smaller peaks located on either side of the main peak. A Raman signal 160 may include a single peak (e.g., as illustrated in FIG. 13) or may include multiple peaks (e.g., as illustrated in FIG. 11).

Figure 14:
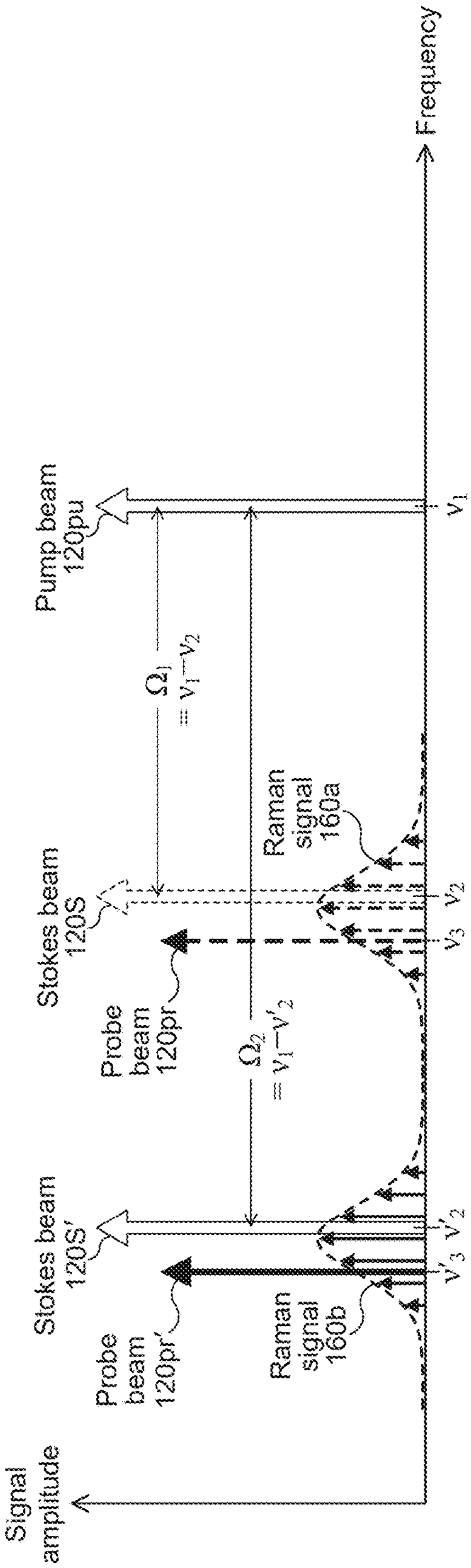
FIGS. 14-15 each illustrates a second example Raman signal obtained by changing the frequency offset between a pump beam and a Stokes beam.
Figure 15:
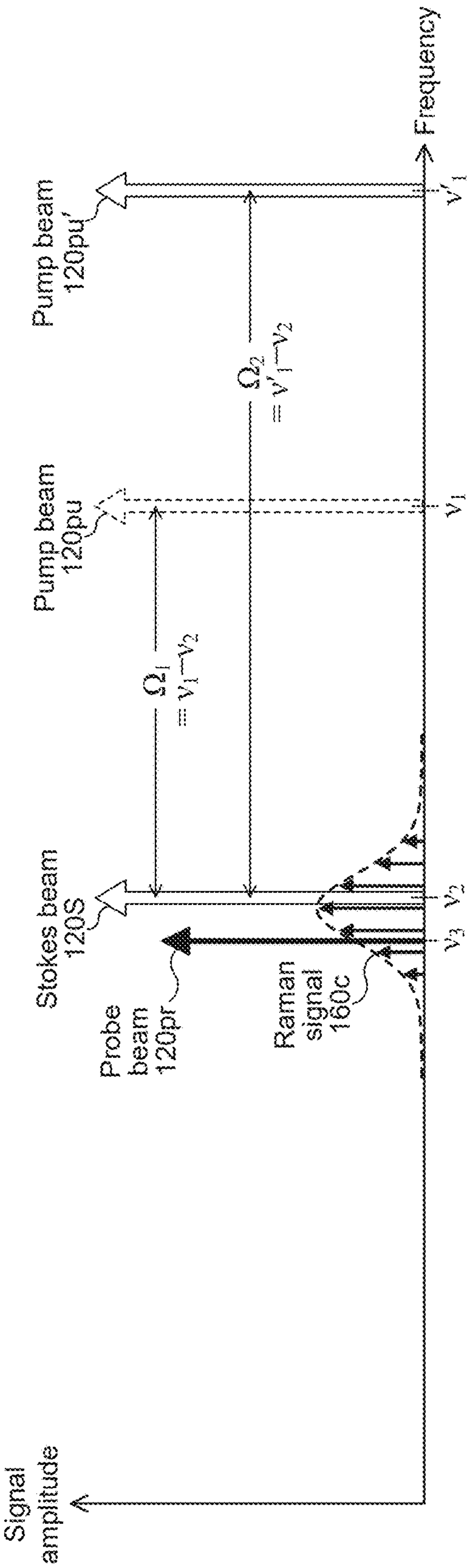

FIGS. 14-15 each illustrates a second example Raman signal obtained by changing the frequency offset $\Omega$ between a pump beam 120*pu* and a Stokes beam 120S. A coherent Raman spectroscopy system 100 may include a pump light source 110*pu* or a Stokes light source 110S with a wavelength-tunable laser, and the frequency offset $\Omega$ may be adjustable by changing the wavelength of the wavelength-tunable laser. A wavelength-tunable pump or Stokes laser may be continuously tunable over a wavelength-tuning range or may be tunable to multiple discrete wavelengths within a wavelength-tuning range. For example, Stokes beam 120 in FIG. 14 may be produced by a continuously tunable laser diode that can produce light at the frequencies $v_2$ and $v'_2$. As another example, a Stokes laser 110S may include two fixed-wavelength laser diodes that operate at the respective frequencies $v_2$ and $v'_2$. Similarly, pump beam 120*pu* in FIG. 15 may be produced by a continuously tunable laser diode that can produce light at the frequencies $v_1$ and $v'_1$, or a pump laser 110*pu* may include two fixed-wavelength laser diodes that operate at the respective frequencies $v_1$ and $v'_1$.

In FIG. 14, the pump frequency $v_1$ is fixed, and the Stokes frequency is changed from $v_2$ to $v'_2$ to change the frequency offset from $\Omega_1$ to $\Omega_2$. Frequency offset 21 equals $v_1-v_2$, and frequency offset $\Omega_2$ equals $v_1-v_2$. In FIG. 15, the Stokes frequency $v_2$ is fixed, and the pump frequency is changed from $v_1$ to $v_1$ to change the frequency offset from $\Omega_1$ to $\Omega_2$. Frequency offset $\Omega_1$ equals $v_1-v_2$, and frequency offset $\Omega_2$ equals $v'_1-v_2$. In other embodiments, both the pump and Stokes frequencies may be changed to change the frequency offset $\Omega$ from one value to another.

FIG. 14 includes two Raman signals 160*a* and 160*b*. Initially, a Stokes light source 110S may produce a Stokes beam 120S at the frequency $v_2$ to produce the frequency offset $\Omega_1$ between the Stokes beam and the pump beam 120*pu*, where $\Omega_1=v_1-v_2$. For example, the Stokes beam 120S may have a frequency $v_2$ of 193 THz, and the pump beam 120*pu* may have a frequency $v_1$ of 207 THz, which corresponds to a frequency offset $\Omega_1$ of 14 THz (or, 467 $cm^{-1}$). The Raman signal 160*a* is produced by coherent Raman scattering of the Stokes beam 120S and pump beam 120*pu* within a sample 150. The Raman signal 160*a* is centered at or near the frequency $v_2$ of the Stokes beam 120S, and the frequency $v_3$ of the probe beam 120*pr* overlaps the Raman signal 160*a* and is relatively close to the frequency $v_2$ of the Stokes beam 120S (e.g., the probe-beam frequency $v_3$ may be within 200 GHz of the Stokes-beam frequency $v_2$). The probe beam 120*pr* and a spectral portion of the Raman signal 160*a* may be coherently mixed at a detector 220 to produce an electronic signal, from which a signal characteristic 162 may be determined. Additionally, the frequency $v_3$ of the probe beam 120*pr* may be tuned across at least a portion of the Raman signal 160*a* to measure multiple signal characteristics 162 associated with the Raman signal.

After measuring the first Raman signal 160*a*, the Stokes light source 110S may change the frequency of the Stokes beam to produce a Stokes beam 120S' at the frequency $v_2$, resulting in a frequency offset of $\Omega_2$ between the Stokes beam 120S' and the pump beam 120*pu*, where $\Omega_2 = v_1 - v'_2$. For example, the Stokes beam 120S may be changed to a frequency $v_2$ of 182 THz, and the pump-beam frequency $v_1$ may remain at 207 THz, which corresponds to a frequency offset $\Omega_1$ of 25 THz (or, 834 $cm^{-1}$). The second Raman signal 160*b* is produced by coherent Raman scattering of the Stokes beam 120S' and pump beam 120*pu* within the sample 150. The Raman signal 160*b* is centered at or near the frequency $v_2$ of the Stokes beam 120S'. Additionally, a probe light source 110*pr* may change the frequency of the probe beam to produce a probe beam 120*pr*' at a frequency v' that overlaps the Raman signal 160*b* and is relatively close to the frequency $v'_2$ of the Stokes beam 120S' (e.g., the probe-beam frequency $v'_3$ may be within 200 GHz of the Stokes-beam frequency $v'_2$).

The probe beam 120*pr*' and a spectral portion of the Raman signal 160*b* may be coherently mixed at a detector 220 to produce an electronic signal, from which a signal characteristic 162 may be determined. Additionally, the frequency $v'_3$ of the probe beam 120*pr*' may be tuned across at least a portion of the second Raman signal 160*b* to measure multiple signal characteristics 162 associated with the Raman signal.

The two Raman signals 160*a* and 160*b* in FIG. 14 may correspond to two respective peaks of a Raman spectrum of a material that is in the sample 150. One Raman peak, associated with Raman signal 160*a*, is located at a frequency of approximately $\Omega_1$, and the frequency $\Omega_1$ may correspond to a vibrational frequency of the material. The other Raman peak, associated with Raman signal 160*b*, is located at a frequency of approximately $\Omega_2$, and the frequency $\Omega_2$ may correspond to another vibrational frequency of the material. A Raman spectroscopy system 100 may perform measurements of signal characteristics 162 at 1, 2, 4, 10, 20, or 50 different values of the frequency offset Ω. The frequency offset Ω between the Stokes beam 120S and the pump beam 120*pu* may be set to each of the different frequency-offset values to produce an associated Raman signal 160. At each value of Ω, the frequency $v_3$ of the probe beam 120*pr* may be tuned across at least a portion of the Raman signal 160 to measure multiple signal characteristics 162 associated with the Raman signal. Then, the frequency of the Stokes beam or pump beam may be adjusted to the next value of Ω, where another measurement of an associated Raman signal 160 is performed. Based on the signal characteristics 162 associated with each of the values of the frequency offset Ω, a processor may determine (i) whether a particular material is present in a sample or (ii) an amount or a concentration of the particular material in the sample.

FIG. 15 includes the Raman signal 160*c*. A first Raman signal (similar to Raman signal 160*a* in FIG. 14) may be approximately overlapped with the second Raman signal 160*c* in FIG. 15, and for clarity, the first Raman signal is not included in FIG. 15. Initially, a Stokes light source 110S may produce a Stokes beam 120S at the frequency $v_2$, and a pump light source 110*pu* may produce a pump beam 120*pu* at the frequency $v_1$, which results in the frequency offset (21 between the Stokes and pump beams in FIG. 15. For example, the Stokes beam 120S may have a frequency $v_2$ of 193 THz, and the pump beam 120*pu* may have a frequency $v_1$ of 207 THz, which corresponds to a frequency offset $\Omega_1$ of 14 THz (or, 467 $cm^{-1}$). A first Raman signal (similar to Raman signal 160*a* in FIG. 14) is produced by coherent Raman scattering of the Stokes beam 120S and pump beam 120*pu* within a sample 150. The first Raman signal may be centered at or near the frequency $v_2$ of the Stokes beam 120S, and the frequency $v_3$ of the probe beam 120*pr* may overlap the first Raman signal and may be relatively close to the frequency $v_2$ of the Stokes beam of light 120S. The probe beam 120*pr* and a spectral portion of the first Raman signal may be coherently mixed at a detector 220 to produce an electronic signal, from which a signal characteristic 162 may be determined. Additionally, the frequency $v_3$ of the probe beam 120*pr* may be tuned across at least a portion of the first Raman signal to measure multiple signal characteristics 162 associated with the first Raman signal.

In FIG. 15, after measuring the first Raman signal, the pump light source 110*pu* may change the frequency of the pump beam 120*pu* from $v_1$ to $v'_1$. This results in a frequency offset of $\Omega_2$ between the Stokes beam 120S and the pump beam 120*pu*', where $\Omega_2 = v'_1 - v_2$. For example, the pump beam may be changed to a frequency $v'_1$ of 218 THz, and the Stokes-beam frequency $v_2$ may remain at 193 THz, which corresponds to a frequency offset $\Omega_1$ of 25 THz (or, 834 $cm^{-1}$). The second Raman signal 160*c* is produced by coherent Raman scattering of the Stokes beam 120S and pump beam 120*pu*' within the sample 150. As with the first Raman signal, the Raman signal 160*c* is centered at or near the frequency $v_2$ of the Stokes beam 120S, and the frequency $v_3$ of the probe beam 120*pr* overlaps the Raman signal 160*c* and is relatively close to the frequency $v_2$ of the Stokes beam of light 120S (e.g., the probe-beam frequency $v_3$ may be within 200 GHz of the Stokes-beam frequency $v_2$). The probe beam 120*pr* and a spectral portion of the Raman signal 160*c* may be coherently mixed at a detector 220 to produce an electronic signal, from which a signal characteristic 162 may be determined. Additionally, the frequency $v_3$ of the probe beam 120*pr* may be tuned across at least a portion of the Raman signal 160*c* to measure multiple signal characteristics 162 associated with the Raman signal.

In FIG. 15, the first Raman signal (which may be similar to Raman signal 160*a* in FIG. 14) and the second Raman signal 160*c* may correspond to two different peaks of a Raman spectrum of a material that is in the sample 150. One Raman peak, associated with the first Raman signal, is located at a frequency of approximately $\Omega_1$, and the frequency $\Omega_1$ may correspond to a vibrational frequency of the material. The other Raman peak, associated with Raman signal 160*c*, is located at a frequency of approximately $\Omega_2$, and the frequency $\Omega_2$ may correspond to another vibrational frequency of the material. Based at least in part on the signal characteristics 162 associated with the two frequency offsets $\Omega_1$ and $\Omega_2$, a processor may determine (i) whether a particular material is present in a sample or (ii) an amount or a concentration of the particular material in the sample.

Figure 16:
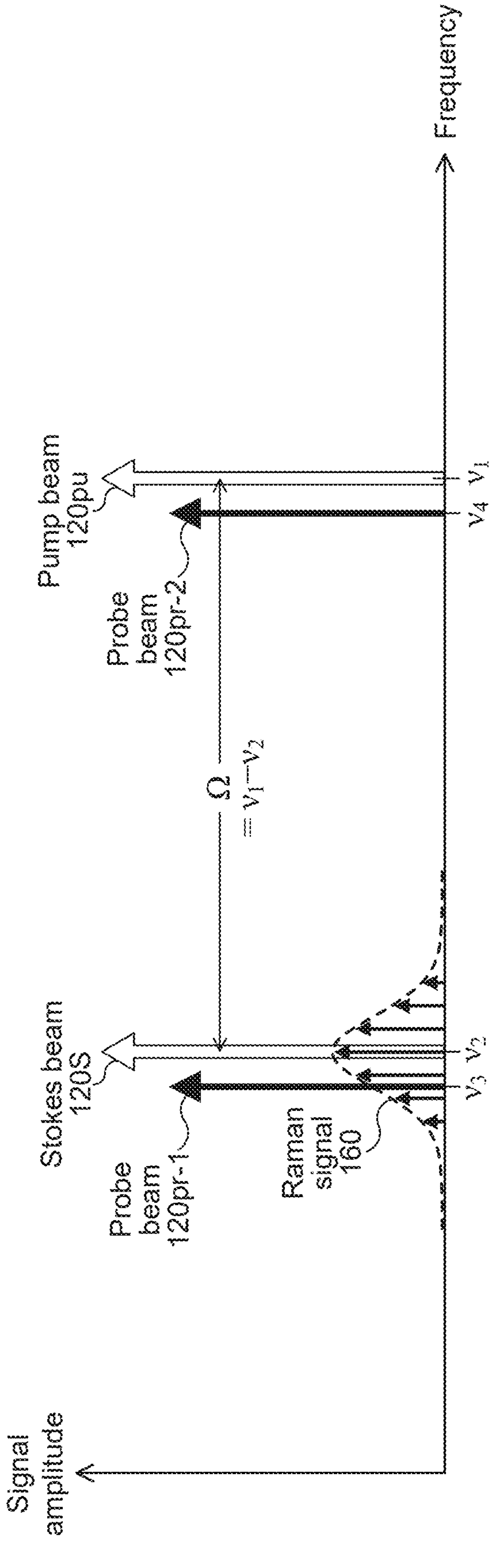
FIG. 16 illustrates an example Raman signal along with two probe beams of light.

FIG. 16 illustrates an example Raman signal 160 along with two probe beams of light 120*pr*-1 and 120*pr*-2. The Raman signal 160 may be produced by coherent Raman scattering of the pump beam 120*pu* and Stokes beam 120S within a sample 150. The frequency of the pump beam 120*pu* is $v_1$, and the frequency of the Stokes beam 120S is $v_2$, which corresponds to a frequency offset Ω equal to $v_1 - v_2$. The Raman signal 160 is centered at or near the frequency $v_2$ of the Stokes beam 120S (e.g., the center frequency of the Raman signal 160 may be within 200 GHz of $v_2$). The first probe beam 120*pr*-1 may be used to measure the Raman signal 160, and the second probe beam 120*pr*-2 may be used to measure the pump beam 120*pu*.

The frequency $v_3$ of first probe beam 120*pr*-1 overlaps the Raman signal 160 and is relatively close to the frequency $v_2$ of the Stokes beam 120S (e.g., $v_3$ may be within 200 GHz of $v_2$). The probe beam 120*pr*-1 and a spectral portion of the Raman signal 160 may be coherently mixed at a detector 220 to produce an electronic signal, from which a signal characteristic 162 may be determined. Additionally, the frequency $v_3$ of the probe beam 120*pr*-1 may be tuned across at least a portion of the Raman signal 160 to measure multiple signal characteristics 162 associated with the Raman signal.

The frequency $v_4$ of the second probe beam 120*pr*-2 is relatively close to the frequency $v_1$ of the pump beam 120*pu* (e.g., $v_4$ may be within 50 GHz of $v_1$). For example, the frequency $v_4$ of the second probe beam 120*pr*-2 may be offset from the frequency $v_1$ of the pump beam 120*pu* by approximately 10 GHz, 5 GHz, or 1 GHz. Alternatively, the frequency $v_4$ of the second probe beam 120*pr*-2 may be approximately equal to the frequency $v_1$ of the pump beam 120*pu*. After the pump beam 120*pu* has interacted with the sample, the probe beam 120*pr*-2 may be coherently mixed with the pump beam. For example, after the pump and Stokes beams have produced the Raman signal 160 and after the pump beam has exited the sample, the pump and probe beams may be coherently mixed together at a detector 220 to produce an electronic signal, from which a signal characteristic may be determined.

Figure 17:
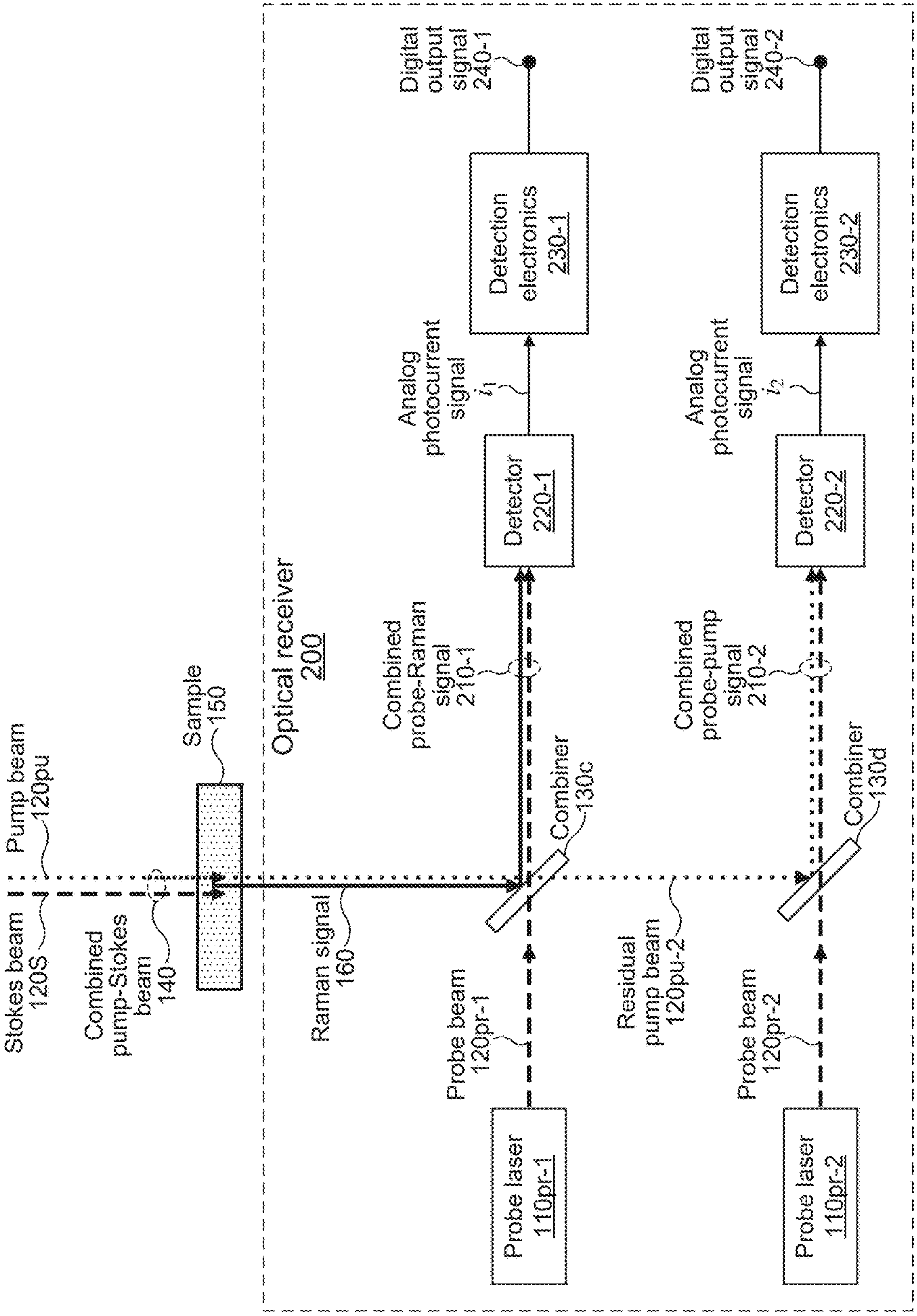
FIG. 17 illustrates an example optical receiver for measuring the Raman signal and pump beam of light from FIG. 16.

FIG. 17 illustrates an example optical receiver 200 for measuring the Raman signal 160 and pump beam of light 120*pu* from FIG. 16. The combined pump-Stokes beam 140 (which includes pump beam 120*pu* and Stokes beam 120S) is directed to a sample 150, which produces a Raman signal 160 in response to the pump and Stokes beams. The Raman signal 160 may be collected by one or more optical elements and directed to the optical receiver 200. Additionally, residual light from the pump beam 120*pu* may be collected and directed to the optical receiver 200 as a residual pump beam 120*pu*-2. The residual pump beam 120*pu*-2 may include light from the pump beam 120*pu* after the pump beam has interacted with and exited the sample 150. The optical receiver 200 in FIG. 17 may be referred to as a two-channel optical receiver that includes two parallel measurement channels for separately detecting and measuring the Raman signal 160 and the residual pump beam 120*pu*-2. The first measurement channel detects the Raman signal 160 and includes probe laser 110*pr*-1, detector 220-1, and detection electronics 230-1. The second measurement channel detects the residual pump beam 120*pu*-2 and includes probe laser 110*pr*-2, detector 220-2, and detection electronics 230-2.

The Raman signal 160 and the residual pump beam 120*pu*-2 are directed to the combiner 130*c*, which may be a dichroic beamsplitter, and the combiner 130*c* reflects the Raman signal 160 and transmits the residual pump beam 120*pu*-2. The combiner 130*c* also transmits at least a portion of the probe beam 120*pr*-1 produced by the probe laser 110*pr*-1 and combines the probe beam 120*pr*-1 with the Raman signal 160 to produce a combined probe-Raman signal 210-1. The probe-Raman signal 210-1 is sent to the detector 220-1, where the probe beam 120*pr*-1 and a spectral portion of the Raman signal 160 are coherently mixed to produce a photocurrent signal $i_1$. The detection electronics 230-1 receives the photocurrent signal $i_1$ and produces a digital output signal 240-1 that corresponds to the photocurrent signal $i_1$.

The combiner 130*d* (which may be a dichroic or a non-dichroic beamsplitter) reflects at least a portion of the residual pump beam 120*pu*-2 and transmits at least a portion of the probe beam 120*pr*-2 produced by the probe laser 110*pr*-2. The combiner 130*d* combines the probe beam 120*pr*-2 with the residual pump beam 120*pu*-2 to produce a combined probe-pump signal 210-2, which is sent to the detector 220-2. The probe beam 120*pr*-2 and the residual pump beam 120*pu*-2 are coherently mixed at the detector 220-2 to produce a photocurrent signal $i_2$, and the detection electronics 230-2 produces a digital output signal 240-2 that corresponds to the photocurrent signal $i_2$.

The two digital output signals 240-1 and 240-2 may be sent to a processor which determines a signal characteristic 162 of each of the photocurrent signals $i_1$ and $i_2$ based on the digital output signals. Additionally, the frequency of the first probe beam 120*pr*-1 may be tuned across at least a portion of the Raman signal 160 to measure multiple signal characteristics 162 associated with the Raman signal. If the frequency $v_1$ of the pump beam 120*pu* remains fixed, the frequency $v_4$ of the second probe beam 120*pr*-2 may also remain fixed. Alternatively, if the frequency $v_1$ of the pump beam 120*pu* is changed (e.g., to switch to a different frequency offset Ω), the frequency of the probe beam 120*pr*-2 may also be switched to maintain a particular frequency offset between the pump and probe frequencies.

Measurement of the residual pump beam 120*pu*-2 may be performed two or more times to determine how the power of the pump beam changes when the Raman signal 160 is produced. For example, the residual pump beam 120*pu*-2 may be measured once when the Stokes beam 120S is turned off (and no Raman signal 160 is produced) and another time when the Stokes beam is turned on (and the Raman signal 160 is produced). A processor may determine the change in the power of the residual pump beam 120*pu*-2 associated with the Stokes beam 120S being turned off and on. Since at least part of the Raman signal 160 may be produced by Stokes-shifted photons from the pump beam 120*pu*, a decrease in the power of the residual pump beam 120*pu*-2 may correspond to the power of the Raman signal.

In another embodiment of a two-channel optical receiver, the optical receiver may not include a second probe laser 110*pr*-2. Instead, the residual pump beam 120*pu*-2 may be sent to a detector 220 for direct detection without mixing the residual pump beam with another signal.

Figure 18:
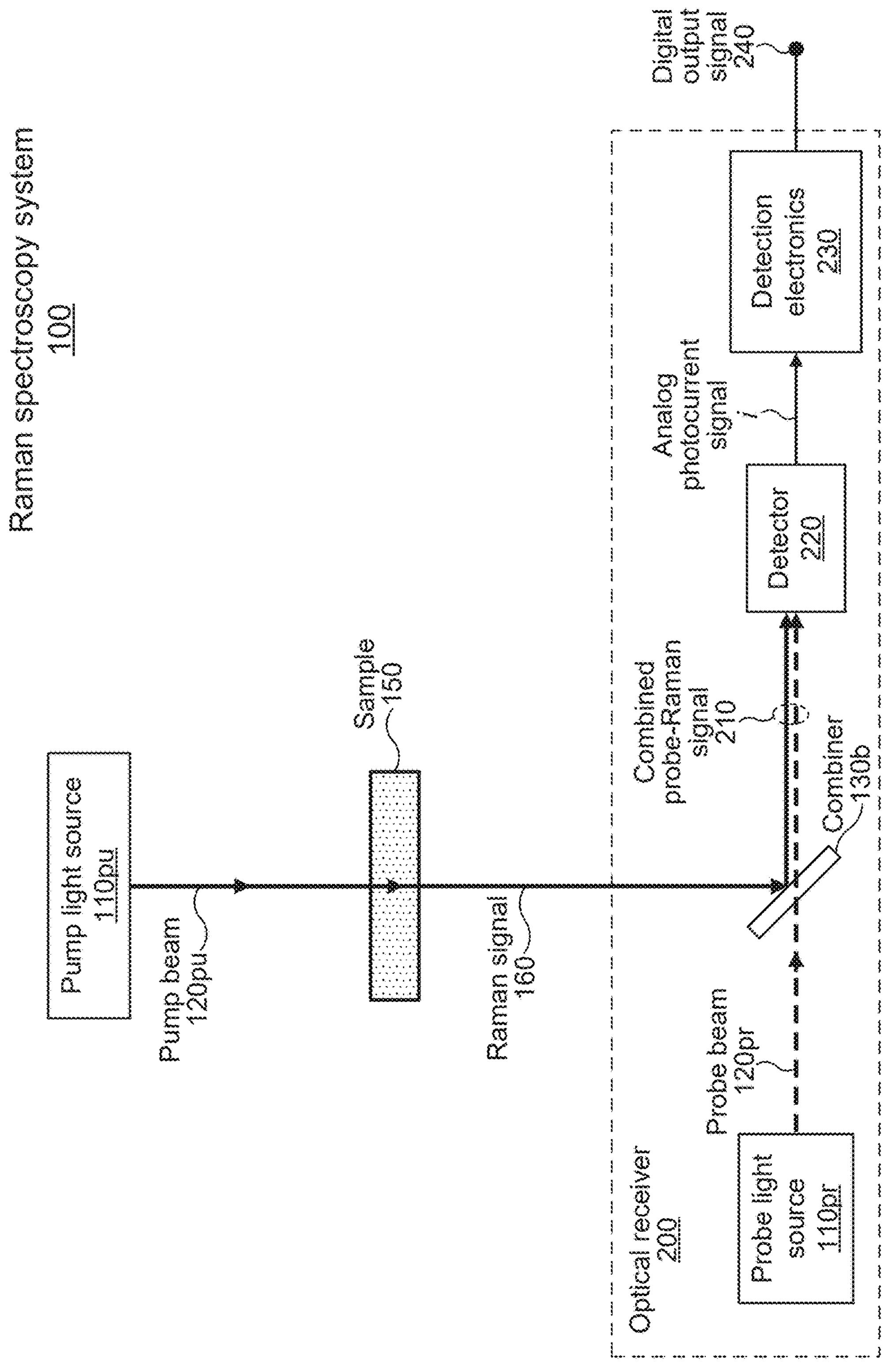
FIG. 18 illustrates an example Raman spectroscopy system for measuring a Raman signal produced by spontaneous Raman scattering.

FIG. 18 illustrates an example Raman spectroscopy system 100 for measuring a Raman signal 160 produced by spontaneous Raman scattering. Instead of producing a Raman signal by coherent Raman scattering of pump and Stokes beams within a sample (e.g., as illustrated in FIGS. 1-2), the Raman signal 160 in FIG. 18 is produced by spontaneous Raman scattering of the pump beam of light 120*pu* within the sample 150. While the production of the Raman signal 160 in FIG. 18 is different from that of the Raman spectroscopy systems of FIGS. 1-2, the optical receiver 200 and the Raman-signal detection technique in FIG. 18 is similar to that of FIGS. 1-2. In FIG. 18, the Raman signal 160 is detected by coherently mixing the Raman signal with a probe beam of light 120*pr*.

The Raman spectroscopy system 100 in FIG. 18 includes a pump light source 110*pu* that produces a pump beam of light 120*pu* at a pump frequency $v_1$. The pump beam 120*pu* is directed to a sample 150 (e.g., by one or more optical elements), and the sample 150 produces a Raman signal 160 by spontaneous Raman scattering of light from the pump beam. The spontaneous Raman signal 160 is collected (e.g., by one or more optical elements) and directed to the optical receiver 200. The optical receiver 200 includes a probe light source 110*pr* that produces a probe beam of light 120*pr* at a probe frequency $v_3$, where the probe frequency overlaps the Raman signal. The optical combiner 130*b*, which may be a dichroic or a non-dichroic beamsplitter, combines the Raman signal 160 and the probe beam 120*pr* to produce a combined probe-Raman signal 210 that is directed to a detector 220. The detector 220 coherently mixes a spectral portion of the Raman signal 160 with the probe beam 120*pr* to produce a photocurrent signal i. The detection electronics 230 may produce (i) an analog voltage signal that corresponds to the photocurrent signal i and (ii) a digital output signal 240 that corresponds to the photocurrent signal or the voltage signal. The digital output signal 240 may be sent to a processor, and the processor may determine a signal characteristic 162 of the photocurrent signal or voltage signal based on the digital output signal 240.

Figure 19:
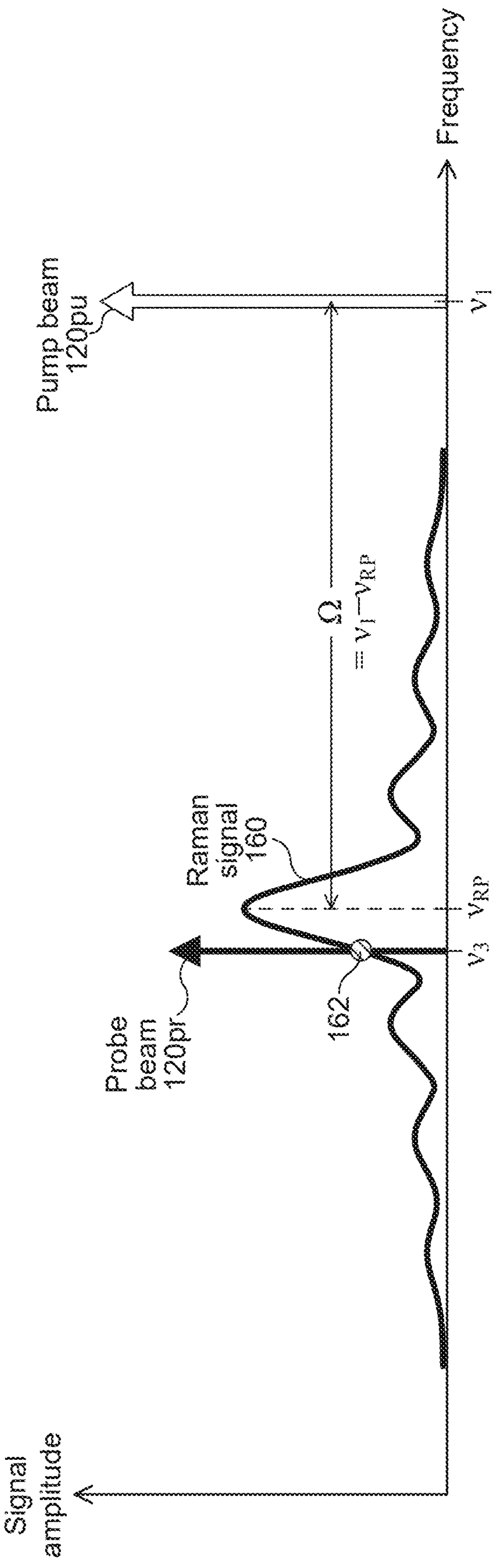
FIG. 19 illustrates an example Raman signal produced by the Raman spectroscopy system of FIG. 18.

FIG. 19 illustrates an example Raman signal produced by the Raman spectroscopy system of FIG. 18. The Raman signal 160 produced by spontaneous Raman scattering of the pump beam 120*pu* has a peak frequency of $v_{RP}$. The frequency offset Ω between the pump beam and the peak frequency of the Raman signal equals $v_1-v_{RP}$, and the frequency offset Ω may correspond to a vibrational frequency of a material that is part of the sample 150. In FIG. 19, the probe beam 120*pr* may be coherently mixed with a spectral portion of the Raman signal 160 that is within a particular frequency range of the probe frequency $v_3$ to measure one signal characteristic 162. Additionally, the probe light source 110*pr* in FIG. 18 may include a wavelength-tunable laser that tunes the probe beam 120*pr* to multiple frequencies across at least a portion of the Raman signal 160, and the optical receiver 200 may measure multiple respective signal characteristics 162 associated with the Raman signal.

Figure 20:
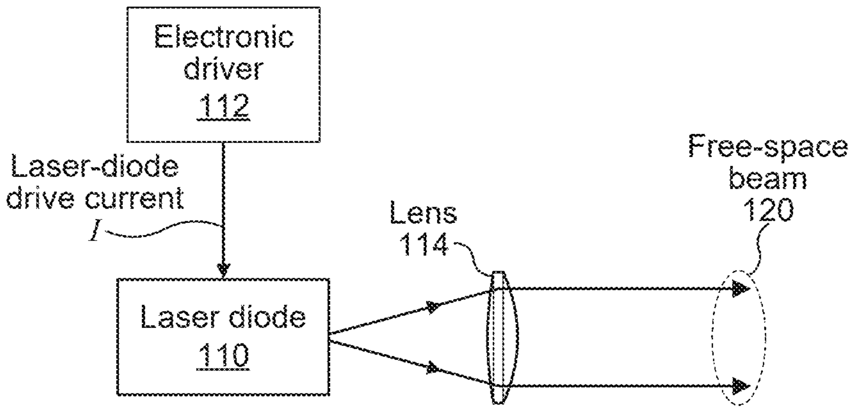
FIG. 20 illustrates an example laser diode that produces a free-space beam of light.

FIG. 20 illustrates an example laser diode 110 that produces a free-space beam of light 120. The laser diode 110 in FIG. 20 may be part of a pump light source 110*pu*, a Stokes light source 110S, or a probe light source 110*pr*, and the free-space beam 120 may be a pump beam 120*pu*, a Stokes beam 120S, or a probe beam 120*pr*. For example, the probe laser 110*pr* in FIG. 2 may be similar to the laser diode 110 in FIG. 20, and the probe laser 110*pr* may produce a free-space probe beam 120*pr* that is combined with the Raman signal 160 by a free-space beam combiner 130*b*. In FIG. 20, the electronic driver 112 supplies laser-diode drive current I to the laser diode 110, and the laser diode produces output light that is collimated by a lens 114 to produce a collimated free-space beam 120. In other embodiments, a lens 114 may produce a focused free-space beam 120 (e.g., the lens may focus the free-space beam onto a sample 150). The laser current I supplied to the laser diode 110 may be a substantially constant DC current resulting in an output beam of light 120 having a substantially constant optical power. Additionally or alternatively, the laser current I may include pulses of current resulting in an output beam 120 that includes corresponding pulses of light.

The output beam of light 120 produced by the laser diode 110 may have a spectral linewidth of less than approximately 200 MHz, 100 MHz, 50 MHz, 10 MHz, 1 MHz, or 100 KHz. The laser diode 110 in FIG. 20 may be a wavelength-tunable laser diode where the wavelength of the output beam 120 is adjustable over a wavelength range having a width between approximately 10 nm and approximately 100 nm. For example, the operating wavelength of the laser diode 110 may be tunable over at least a portion of one of the following wavelength ranges: 1000 nm to 1100 nm; 1220 nm to 1450 nm; 1490 nm to 1570 nm; 1600 nm to 1690 nm. Alternatively, the laser diode 110 in FIG. 20 may be a fixed-wavelength laser diode. For example, the laser diode 110 in FIG. 20 may be a distributed feedback (DFB) laser diode with a spectral linewidth of less than 1 MHz, and the output beam 120 may have any suitable substantially fixed wavelength between approximately 600 nm and approximately 2000 nm.

Figure 21:
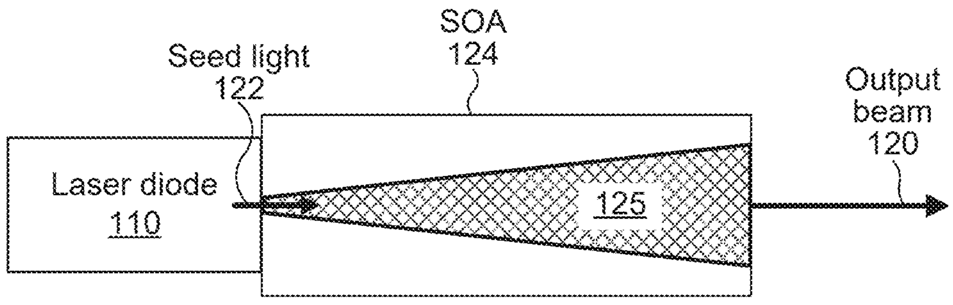
FIG. 21 illustrates an example laser diode that produces seed light that is amplified by a semiconductor optical amplifier (SOA).

FIG. 21 illustrates an example laser diode 110 that produces seed light 122 that is amplified by a semiconductor optical amplifier (SOA) 124. Instead of directly emitting an output beam 120 (e.g., as illustrated in FIG. 20), the light from a laser diode 110 may first be amplified by an optical amplifier. The laser diode 110 in FIG. 21 acts as a seed laser that produces seed light 122 that is coupled into the input end of the waveguide 125 of the SOA 124. The SOA waveguide 125 in FIG. 21 is indicated by the cross-hatched region within the SOA 124. The SOA 124 amplifies the seed light as it propagates within the waveguide from the input end to the output end, and the output beam of light 120 is emitted from the output end of the SOA. The optical gain provided by the SOA may come from electrical current that is supplied to the SOA by an electronic driver (not illustrated in FIG. 21). For example, an electronic driver 112 may supply substantially constant DC electrical current to the laser diode 110 and to the SOA 124, and the resulting output beam 120 may have substantially constant optical power. The output beam 120 may be a free-space beam, or the output beam 120 may be coupled into an optical fiber or into a waveguide of a photonic integrated circuit (PIC).

The laser diode 110 and the SOA 124 in FIG. 21 may be fabricated or integrated together on the same chip so that seed light 122 from the laser diode is directly coupled into the waveguide 125 of the SOA. The waveguide 125 of the SOA 124 may be a tapered optical waveguide (as illustrated in FIG. 21) with a width that increases along a lateral direction from the input end that receives the seed light 122 to the output end that emits the output beam 120. A light source that includes a seed laser diode 110 that supplies seed light 122 that is amplified by a SOA 124 (as illustrated in FIG. 21) may be referred to as a master-oscillator power-amplifier laser (MOPA laser). The seed laser diode 110 may be referred to as a master oscillator, and the SOA 124 may be referred to as a power amplifier. The MOPA laser in FIG. 21 may be part of a pump light source 110*pu*, a Stokes light source 110S, or a probe light source 110*pr*, and the output beam of light 120 may be a pump beam 120*pu*, a Stokes beam 120S, or a probe beam 120*pr*.

Figure 22:
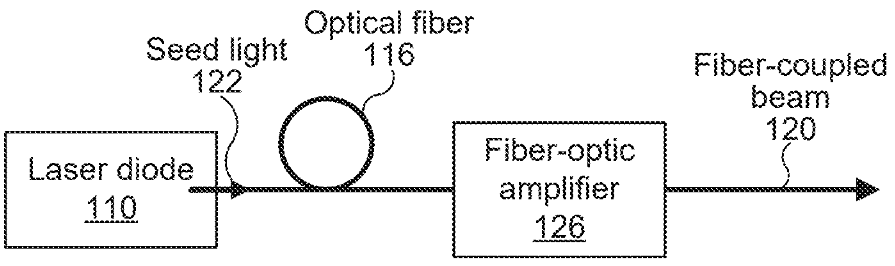
FIG. 22 illustrates an example laser diode that produces seed light that is amplified by a fiber-optic amplifier.

FIG. 22 illustrates an example laser diode 110 that produces seed light 122 that is amplified by a fiber-optic amplifier 126. The laser diode 110 in FIG. 22 acts as a seed laser that produces seed light 122 that is coupled into an optical fiber 116. The optical fiber 116 directs the seed light 122 to the fiber-optic amplifier 126, and the fiber-optic amplifier amplifies the seed light as it propagates through an optical gain fiber of the fiber-optic amplifier. The optical gain fiber may be doped with rare-earth ions (e.g., neodymium, erbium, or ytterbium) that provide the optical gain to the seed light. One or more pump lasers may optically pump the rare-earth ions, which in turn provide optical amplification to the seed light 122 propagating through the gain fiber. The amplified seed light produced by the fiber-optic amplifier 126 propagates in an optical fiber as a fiber-coupled output beam 120. The laser diode 110 and fiber-optic amplifier 126 in FIG. 22 may be part of a pump light source 110*pu*, a Stokes light source 110S, or a probe light source 110*pr*, and the fiber-coupled output beam 120 may be directed to an optical combiner 130, a sample 150, or a detector 220.

A pump light source 110*pu*, a Stokes light source 110S, or a probe light source 110*pr* may include a seed laser diode 110 followed by an optical amplifier. The seed laser diode 110 may produce seed light 122 that is amplified by the optical amplifier to produce an output beam of light 120. An optical amplifier may include a SOA 124 (e.g., as illustrated in FIG. 21) or a fiber-optic amplifier 126 (e.g., as illustrated in FIG. 22). In some embodiments, an optical amplifier may include a SOA 124 followed by a fiber-optic amplifier 126. For example, a seed laser diode 110 may produce seed light 122 that is first amplified by a SOA 124 and then further amplified by a fiber-optic amplifier 126.

In some embodiments, a pump light source 110*pu*, a Stokes light source 110S, or a probe light source 110*pr* may include a laser diode 110 and an optical fiber 116 and may not include a fiber-optic amplifier. For example, light produced by a laser diode 110 may be coupled into an optical fiber 116 to produce a fiber-coupled beam 120, and the optical fiber may direct the laser-diode light to an optical combiner 130, a sample 150, or a detector 220. A laser diode 110 that produces a fiber-coupled beam 120 may be referred to as a fiber-coupled laser diode.

Figure 23:
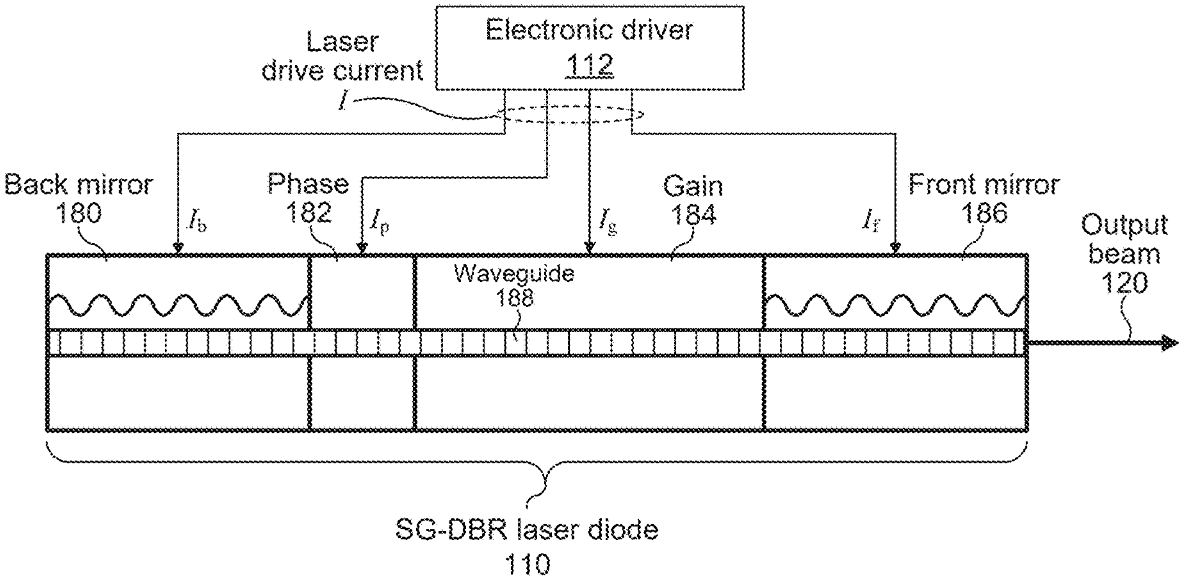
FIG. 23 illustrates an example sampled-grating distributed Bragg reflector (SG-DBR) laser.

FIG. 23 illustrates an example sampled-grating distributed Bragg reflector (SG-DBR) laser 110. An SG-DBR laser 110 is a wavelength-tunable laser diode that produces an output beam 120 that can be tuned over a wavelength range having a width of between 20 nm and 50 nm. For example, an SG-DBR laser 110 may have a 40-nm wavelength-tuning range from approximately 1530 nm to approximately 1570 nm or from approximately 1630 nm to approximately 1670 nm. The SG-DBR laser 110 in FIG. 23 may be part of a pump light source 110*pu*, a Stokes light source 110S, or a probe light source 110*pr*, and the output beam 120 may be a pump beam 120*pu*, a Stokes beam 120S, or a probe beam 120*pr*. For example, an SG-DBR laser 110 may be part of a probe light source 110*pr* that produces the probe beam 120*pr* in FIG. 6, and the SG-DBR laser may tune the frequency $v_3$ of the probe beam across at least a portion of the Raman signal 160. An SG-DBR laser 110 may produce a free-space beam 120, a fiber-coupled beam 120, or a beam that is coupled into a waveguide of a PIC. Alternatively, an SG-DBR laser 110 may be integrated with a SOA 124 that amplifies the light produced by the SG-DBR laser (e.g., as illustrated in FIG. 21).

The SG-DBR laser 110 in FIG. 23 includes a back mirror 180, a phase section 182, a gain section 184, and a front mirror 186, where the phase and gain sections are located between the front and back mirrors. The laser diode current I supplied to the SG-DBR laser 110 includes the following: current $I_b$ supplied to the back mirror 180, current $I_p$ supplied to the phase section 182, current $I_g$ supplied to the gain section 184, and current $I_t$ supplied to the front mirror 186. The gain current $I_g$ provides optical gain to the optical waveguide 188 of the SG-DBR laser 110, and the other currents may be used to set the wavelength of the output beam 120 produced by the SG-DBR laser. The electronic driver 112 may supply particular combinations of electrical currents to the back mirror 180, phase section 182, gain section 184, and front mirror 186, where each particular combination of electrical currents causes the SG-DBR laser 110 to produce an output beam 120 at a particular wavelength. For example, an SG-DBR laser 110 may be part of a wavelength-tunable probe light source 110*pr* that produces the probe beam 120*pr* in FIG. 11, and the electronic driver 112 may supply particular different combinations of the electrical currents $I_b$, $I_b$, $I_g$, and $I_t$ to produce the different probe frequencies $v_{3\text{-}1}$, $v_{3\text{-}2}$, $v_{3\text{-}3}$, . . . and $v_{3\text{-}n}$ to tune the probe beam across at least a portion of the Raman signal 160 in FIG. 11.

Figure 24:
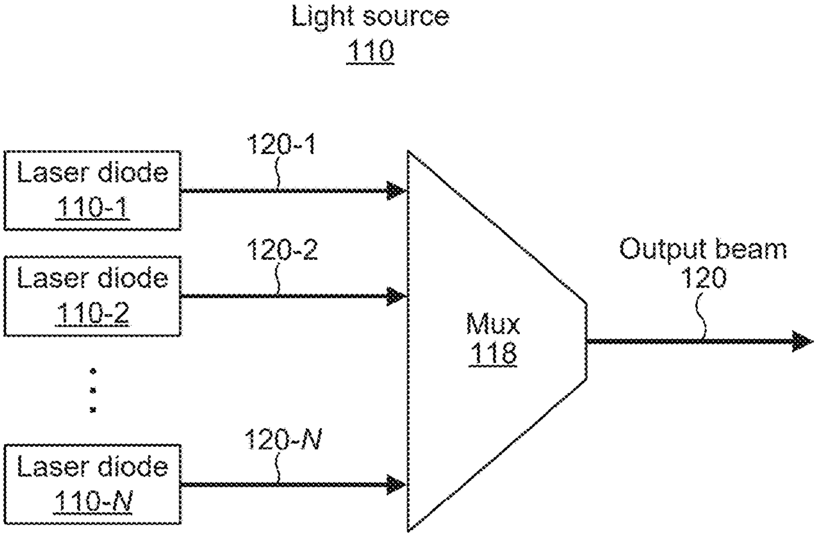
FIG. 24 illustrates an example light source with multiple laser diodes and an optical multiplexer that combines light produced by the laser diodes into a single output beam of light.

FIG. 24 illustrates an example light source 110 with multiple laser diodes 110 and an optical multiplexer 118 that combines light produced by the laser diodes into a single output beam of light 120. Each of the laser diodes 110-1, 110-2, . . . 110-N produces a respective output beam 120-1, 120-2, . . . 120-N, and the optical multiplexer 118 combines the output beams into the output beam of light 120. The light source 110 may be configured to switch between operating the N laser diodes one at a time so that, at any given time, only one laser diode produces light, and the output beam 120 includes just the light produced by that one laser diode.

The optical multiplexer 118 may be a free-space device, a fiber-optic device, a waveguide-based device, or a metamaterial-based device, and the multiplexer may combine N different wavelengths of light from the N laser diodes into a single output beam 120. The optical multiplexer 118 may include one or more of the following: a free-space diffraction grating; an arrayed waveguide grating (AWG); a metamaterial that acts as a diffractive optical element; one or more optical filters; one or more optical combiners; one or more optical switches (e.g., thermo-optic switches, liquid crystal switches, or microelectromechanical systems (MEMS) switches); a series of two or more fiber Bragg gratings with optical circulators.

The light source 110 in FIG. 24 may be a pump light source 110*pu*, a Stokes light source 110S, or a probe light source 110*pr*, and the output beam 120 may be a pump beam 120*pu*, a Stokes beam 120S, or a probe beam 120*pr*. The output beam 120 may be a free-space beam, or the output beam 120 may be coupled into an optical fiber or into a waveguide of a photonic integrated circuit (PIC). For example, each of the laser diodes 110-1, 110-2, . . . 110-N may produce a fiber-coupled beam 120-1, 120-2, . . . 120-N, and the optical multiplexer 118 may be a fiber-optic device that produces a fiber-coupled output beam 120. The output beam 120 may be sent to an optical combiner 130, a sample 150, or a detector 220. Alternatively, the light source 110 may include an optical amplifier (e.g., an SOA or a fiber-optic amplifier) located after the optical multiplexer 118, and the output beam 120 may be coupled from the multiplexer to an optical amplifier that provides optical amplification to the output beam.

The light source 110 in FIG. 24 includes N laser diodes 110-1, 110-2, . . . 110-N, where N is an integer greater than or equal to 2. Each of the N laser diodes 110 in FIG. 24 may be a wavelength-tunable laser diode or a fixed-wavelength laser diode. For example, the light source in FIG. 24 may include (i) N wavelength-tunable laser diodes, (ii) N fixed-wavelength laser diodes, or (iii) one or more wavelength-tunable laser diodes and one or more fixed-wavelength laser diodes. The light source 110 in FIG. 24 may be referred to as a wavelength-tunable light source, a frequency-tunable light source, or a tunable light source. A wavelength-tunable light source may include one or more continuously tunable laser diodes (e.g., SG-DBR laser diodes); multiple fixed-wavelength laser diodes (e.g., multiple DFB laser diodes), each laser diode operating at a different wavelength; or any combination thereof.

The light source 110 in FIG. 24 may be a pump light source 110*pu* or a Stokes light source 110S that includes N fixed-wavelength laser diodes, each laser diode having a different operating wavelength. The wavelength of the output beam 120 produced by the wavelength-tunable light source 110 in FIG. 24 may be adjustable to any wavelength of N different wavelengths by selecting one of the N fixed-wavelength laser diodes for operation. The frequency offset Ω between the pump beam 120*pu* and Stokes beam 120S may be adjustable by selecting one of the fixed-wavelength laser diodes for operation. For example, the Stokes beams 120S and 120S' in FIG. 14 may be produced by the light source 110 in FIG. 24. Laser diode 110-1 may be a fixed-wavelength laser diode operating at the frequency $v_2$, and laser diode 110-2 may be a fixed-wavelength laser diode operating at the frequency $v_2$. Selecting laser diode 110-1 for operation produces the frequency offset $\Omega_1$ in FIG. 14, and selecting laser diode 110-2 for operation produces the frequency offset $\Omega_2$.

The light source 110 in FIG. 24 may operate only one of the N laser diodes 110 at any given time. Each of the laser diodes 110 may operate at a particular wavelength or over a particular range of wavelengths, and one of the laser diodes may be selected for operation based on the wavelength that is needed to perform a particular measurement. For example, the pump beams 120*pu* and 120*pu*' in FIG. 15 may be produced by the light source 110 in FIG. 24. Laser diode 110-1 may be a fixed-wavelength laser diode operating at the frequency $v_1$, and laser diode 110-2 may be a fixed-wavelength laser diode operating at the frequency $v'_1$. During a first measurement period, laser diode 110-1 may be operated to produce output beam 120-1 at the frequency $v_1$, and the other laser diodes 110-2 to 110-N may be turned off or otherwise configured to not produce light. The multiplexer 118 receives the output beam 120-1 from the laser diode 110-1 and directs it to the output of the multiplexer to produce the output beam 120 having a frequency $v_1$. During a second measurement period, the Raman signal 160*c* in FIG. 15 may be measured, and laser diode 110-2 may be operated to produce output beam 120-2 at the frequency $v'_1$. The other laser diodes (i.e., laser diodes 110-1 to 110-N, excluding laser diode 110-2) may be turned off or otherwise configured to not produce light. The multiplexer 118 receives the output beam 120-2 from the laser diode 110-2 and directs it to the output of the multiplexer to produce the output beam 120 having a frequency $v'_1$.

The light source 110 in FIG. 24 may be a probe light source that includes N wavelength-tunable laser diodes. The probe light source may be configured to tune over one or more wavelength ranges having a total width between $p \cdot N \cdot \Delta\lambda_{av}$ and $N \cdot \Delta\lambda_{av}$, where $\Delta\lambda_{av}$ is an average wavelength-tuning range of the N laser diodes 110, and p is a wavelength-overlap parameter between 0.5 and 1. For example, if the overlap parameter p has a value of 0.7, then the combined wavelength-tuning range of the N wavelength-tunable laser diodes may be between (0.7) $N \cdot \Delta\lambda_{av}$ and $N \cdot \Delta\lambda_{av}$. The wavelength-overlap parameter p represents the amount of wavelength overlap between adjacent wavelength-tuning ranges (e.g., an overlap value p of 1 indicates that there is no wavelength overlap between the wavelength-tuning ranges). For example, the light source 110 in FIG. 24 may be a probe light source that includes three SG-DBR laser diodes having respective wavelength-tuning ranges of 1490-1530 nm, 1520-1560 nm, and 1550-1590 nm. Each of the SG-DBR laser diodes has a 40-nm tuning range with a 10-nm overlap between adjacent tuning ranges, which results in the light source 110 in FIG. 24 having a 100-nm wavelength-tuning range from 1490 nm to 1590 nm. In this case, the average wavelength-tuning range $\Delta\lambda_{av}$ of the three laser diodes is 40 nm, and the total wavelength-tuning range has a width of 100 nm, which corresponds to the wavelength-overlap parameter p having a value of approximately 0.83. The probe light source 110 may produce an output beam 120 having any wavelength from 1490 nm to 1590 nm by selecting one of the three SG-DBR laser diodes for operation and tuning the laser diode to the desired wavelength. As another example, the light source 110 in FIG. 24 may be a probe light source 110 that includes three SG-DBR laser diodes having respective wavelength-tuning ranges of 1490-1530 nm, 1530-1560, and 1640-1680 nm. Each of the SG-DBR laser diodes has a 40-nm tuning range with no wavelength overlap between adjacent tuning ranges. The average wavelength-tuning range $\Delta\lambda_{av}$ of the three laser diodes is 40 nm, and the total wavelength-tuning range has a width of 120 nm. This corresponds to the wavelength-overlap parameter p having a value of 1, indicating that there is no wavelength overlap between the tuning ranges of the three laser diodes.

Figure 25:
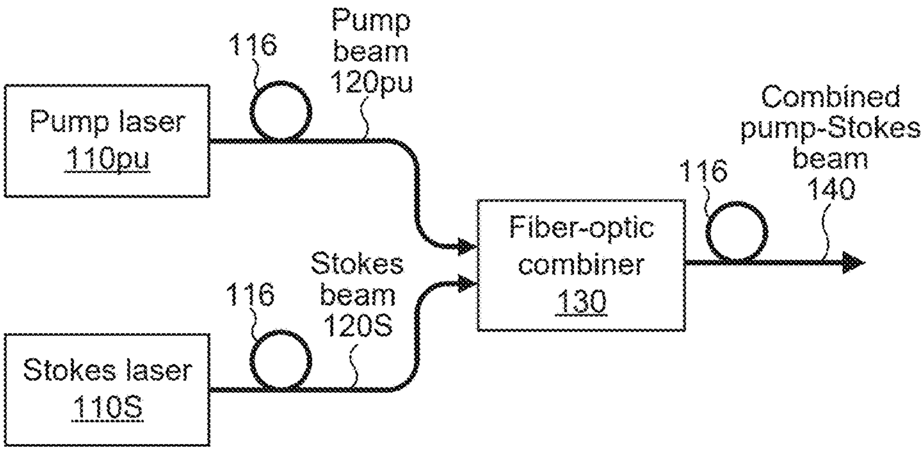
FIG. 25 illustrates an example pump laser and Stokes laser with a fiber-optic combiner that produces a combined pump-Stokes beam coupled into an optical fiber.

FIG. 25 illustrates an example pump laser 110*pu* and Stokes laser 110S with a fiber-optic combiner 130 that produces a combined pump-Stokes beam 140 coupled into an optical fiber 116. A Raman spectroscopy system 100 may include one or more optical elements that direct the pump and Stokes beams to a sample 150. The optical elements may include a combiner 130 that combines the pump beam 120*pu* and the Stokes beam 120S to produce a combined pump-Stokes beam 140 that is directed to a sample 150. In FIG. 1, the combiner 130*a* may be a free-space optical combiner, and the pump beam 120*pu*, Stokes beam 120S, and combined beam 140 may each be free-space beams. The combiner 130 in FIG. 25 is a fiber-optic combiner that receives the pump and Stokes beams via two input optical fibers 116 and combines the two beams into a combined pump-Stokes beam 140 that propagates in an output optical fiber 116. The pump laser 110*pu* may be a fiber-coupled laser diode that produces a pump beam 120*pu* that is directed to the fiber-optic combiner 130 via an input optical fiber 116. Similarly, the Stokes laser 110S may be a fiber-coupled laser diode that produces a Stokes beam 120S that is directed to the fiber-optic combiner 130 via another input optical fiber 116. The pump laser 110*pu* or the Stokes laser 110S may be followed by an optical amplifier (not illustrated in FIG. 25) that amplifies the pump beam 120*pu* or Stokes beam 120S prior to directing the light to the combiner 130. After the fiber-optic combiner 130 combines the pump and Stokes beams, the output optical fiber 116 may direct the combined pump-Stokes beam 140 to a sample 150.

The fiber-optic combiner 130 in FIG. 25 may include a fiber-optic wavelength division multiplexer (WDM) with two input optical fibers (for the pump and Stokes beam) and one output optical fiber for the output beam 120. The WDM may include a dichroic beamsplitter or a fused fiber coupler. Each of the input or output optical fiber 116 may be a single-mode optical fiber or a multi-mode optical fiber.

In some embodiments, instead of using a single pump laser or a single Stokes laser (as illustrated in FIG. 25), a Raman spectroscopy system may use a pump or Stokes light source 110 with multiple laser diodes and an optical multiplexer 118 (e.g., as illustrated in FIG. 24). For example, the light source 110 in FIG. 24 may be a pump light source that produces a fiber-coupled output beam 120 that is coupled to an input fiber of the fiber-optic combiner 130 in FIG. 25. One of the laser diodes of the pump light source may be selected for operation, and the light from the selected laser diode may be directed by the multiplexer 118 to an optical fiber that is coupled to the combiner 130. Additionally or alternatively, the light source 110 in FIG. 24 may be a Stokes light source that produces a fiber-coupled output beam 120 that is coupled to an input fiber of the fiber-optic combiner 130 in FIG. 25.

Figure 26:
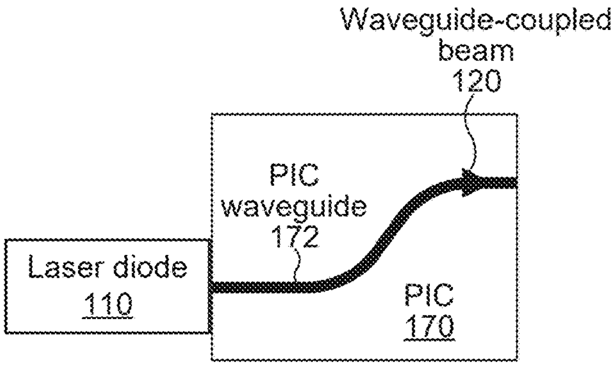
FIG. 26 illustrates an example laser diode coupled to a waveguide of a photonic integrated circuit (PIC).

FIG. 26 illustrates an example laser diode 110 coupled to a waveguide 172 of a photonic integrated circuit (PIC) 170. A PIC 170 (which may be referred to as a planar lightwave circuit (PLC), a waveguide-based device, an integrated-optic device, an integrated optoelectronic device, or a silicon optical bench) may be fabricated from a substrate that includes silicon, indium phosphide, glass (e.g., silica), a polymer, or an electro-optic material (e.g., lithium niobate ($LiNbO_3$) or lithium tantalate ($LiTaO_3$)). A PIC 170 may include one or more optical waveguides 172 that confine and guide a beam of light. An optical waveguide 172 that is part of a PIC 170 may be a passive optical waveguide formed in the PIC, and the waveguide may convey light from one optical element to another with relatively low optical loss.

In FIG. 26, light from the laser diode 110 is coupled into the PIC waveguide 172 to produce a waveguide-coupled beam 120. The waveguide 172 may convey the beam of light 120 from the laser diode 110 to another optical element (e.g., an optical combiner 130, a sample 150, or a detector 220). Light from the laser diode 110 in FIG. 26 may be coupled into the waveguide 172 using one or more lenses, or the laser diode 110 may be butt-coupled to an input of the waveguide so that the light from the laser diode is directly coupled into the waveguide. The laser diode 110 may be mechanically attached or connected to the PIC 170 or to a substrate to which the PIC is also attached. For example, the laser diode 110 may be attached using epoxy, adhesive, or solder. Alternatively, the laser diode 110 in FIG. 26 may be located apart from the PIC 170, and the laser diode may send a beam of light 120 to the PIC 170 via optical fiber. An output end of the optical fiber may be attached or connected to the PIC 170 so that the light is coupled into the PIC waveguide 172. Light from the laser diode 110 may be amplified by an optical amplifier (not illustrated in FIG. 26) prior to being coupled into the PIC waveguide 172. For example, the laser diode 110 in FIG. 26 may be a MOPA laser similar to that illustrated in FIG. 21, and the output beam 120 produced by the MOPA laser may be directly coupled into the waveguide 172.

Figure 27:
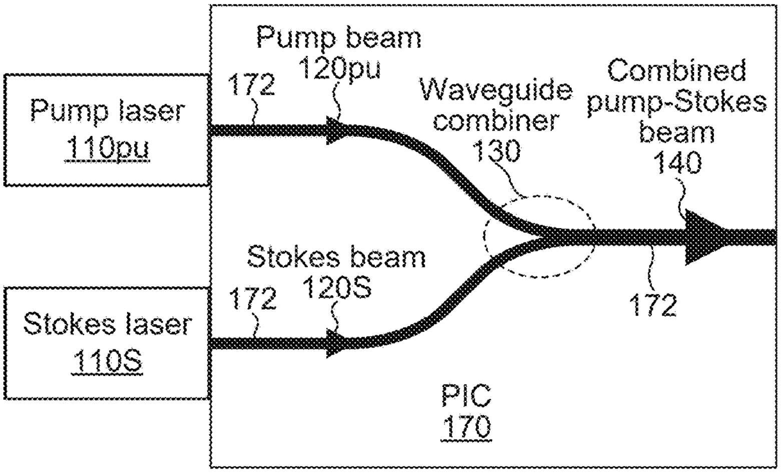
FIG. 27 illustrates an example pump laser and Stokes laser with a photonic integrated circuit (PIC) that produces a combined pump-Stokes beam coupled into an optical waveguide of the PIC.

FIG. 27 illustrates an example pump laser 110*pu* and Stokes laser 110S with a photonic integrated circuit (PIC) 170 that produces a combined pump-Stokes beam 140 coupled into an optical waveguide 172 of the PIC. The PIC 170 includes a waveguide combiner 130 and three optical waveguides 172 (two input waveguides for the pump and Stokes beams and one output waveguide for the combined pump-Stokes beam 140). The waveguide combiner 130 is a waveguide-based optical combiner that combines the pump beam 120*pu* and the Stokes beam 120S to produce a combined pump-Stokes beam 140. The combined pump-Stokes beam 140 is coupled to an output optical waveguide 172 of the PIC 170, and the output waveguide may direct the beam to a sample 150. The pump laser 110*pu* or the Stokes laser 110S may be a laser diode that is mechanically attached or connected to the PIC 170 or to a substrate to which the PIC is also attached. Alternatively, the pump laser 110*pu* or the Stokes laser 110S may be a fiber-coupled laser diode that sends a beam of light to the PIC via optical fiber (e.g., an output end of the optical fiber may be attached to the PIC so that the light is coupled into an input optical waveguide 172).

In some embodiments, instead of using a single pump laser or a single Stokes laser (as illustrated in FIG. 27), a Raman spectroscopy system may use a pump or Stokes light source 110 with multiple laser diodes and an optical multiplexer 118 (e.g., as illustrated in FIG. 24). For example, the light source 110 in FIG. 24 may be a pump or Stokes light source that produces a fiber-coupled output beam 120 that is coupled to an input optical waveguide 172 of the PIC 170 in FIG. 27. Alternatively, the multiplexer 118 in FIG. 24 may be a waveguide-based device and the output beam 120 may propagate in a PIC waveguide that directs the light to an input optical waveguide 172 of the PIC 170 in FIG. 27.

Figure 28:
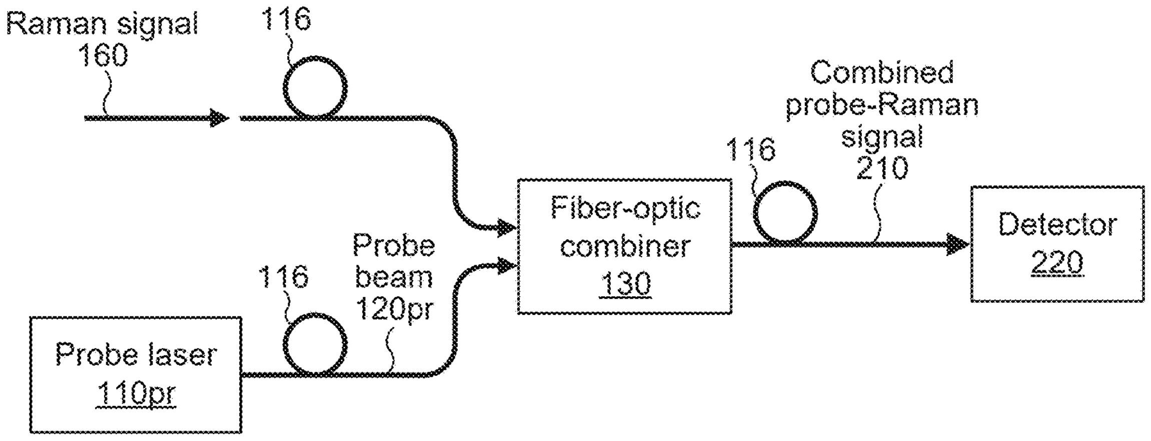
FIG. 28 illustrates an example fiber-optic combiner that combines a Raman signal with a probe beam.

FIG. 28 illustrates an example fiber-optic combiner 130 that combines a Raman signal 160 with a probe beam 120*pr*. An optical receiver 200 may include an optical combiner 130 that combines a Raman signal 160 and a probe beam of light 120*pr* to produce one or more combined probe-Raman signals 210 that are each directed to a detector 220. In FIG. 1, the combiner 130*b* may be a free-space optical combiner, and the Raman signal 160, probe beam 120*pr*, and the combined probe-Raman signal 210 may each be free-space beams. The combiner 130 in FIG. 28 is a fiber-optic combiner that receives the Raman signal 160 and the probe beam 120*pr* via two input optical fibers 116 and combines the two beams into a combined probe-Raman signal 210 that is directed to a detector 220 via an output optical fiber 116. Each of the input or output optical fiber 116 in FIG. 28 may be a single-mode optical fiber or a multi-mode optical fiber.

The Raman signal 160 in FIG. 28 may be a free-space beam that is coupled into an input optical fiber 116 using one or more lenses. The probe laser 110*pr* may be a fiber-coupled laser diode that directs the probe beam 120*pr* to the fiber-optic combiner 130 via optical fiber 116. The probe beam 120*pr* may be amplified by an optical amplifier (not illustrated in FIG. 28) prior to being directed to the combiner 130. In some embodiments, instead of using a single probe laser 110*pr* (as illustrated in FIG. 28), an optical receiver 200 may use a light source 110 with multiple laser diodes and an optical multiplexer 118 (e.g., as illustrated in FIG. 24). For example, the light source 110 in FIG. 24 may be a probe light source that produces a fiber-coupled output beam 120 that is coupled to an input optical fiber 116 of the fiber-optic combiner 130 in FIG. 28.

Figure 29:
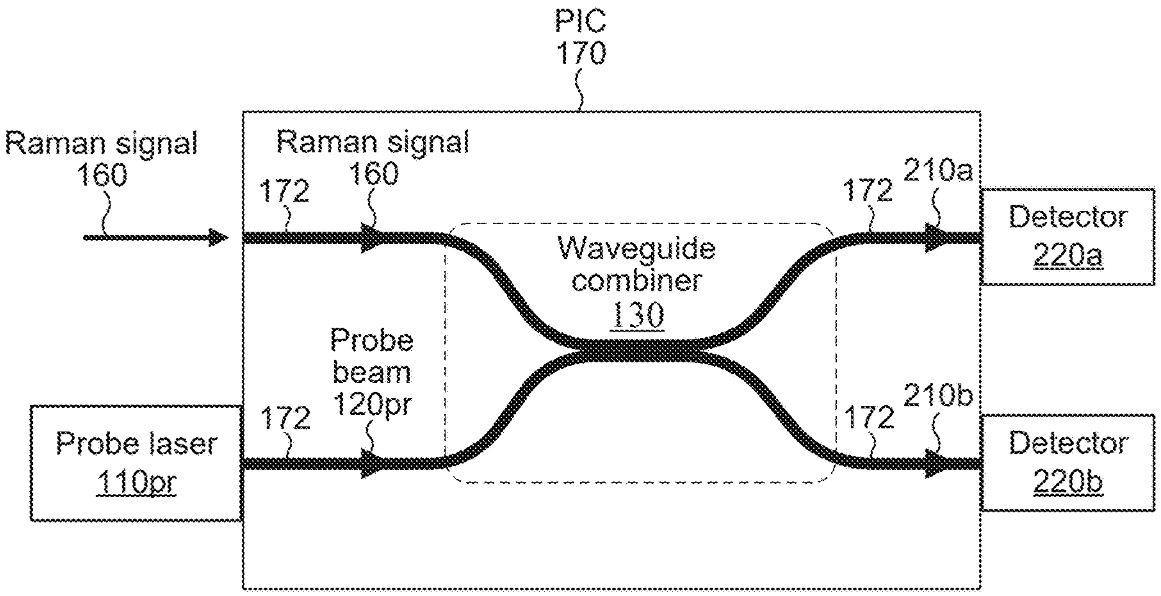
FIG. 29 illustrates an example photonic integrated circuit (PIC) with a waveguide combiner that combines a Raman signal with a probe beam.

FIG. 29 illustrates an example photonic integrated circuit (PIC) 170 with a waveguide combiner 130 that combines a Raman signal 160 with a probe beam 120*pr*. An optical combiner 130 may be a waveguide combiner 130 that is part of a PIC 170 and may combine a Raman signal 160 and a probe beam of light 120*pr* to produce one or more combined probe-Raman signals 210 that are each directed to a detector 220. The waveguide combiner 130 in FIG. 29 receives the Raman signal 160 and the probe beam 120*pr* via two input waveguides 172. A waveguide combiner 130 may produce 1, 2, or 4 combined output beams 210. The waveguide combiner 130 in FIG. 29 combines the Raman signal 160 and the probe beam 120*pr* to produce two combined probe-Raman signals 210*a* and 210*b* which are each directed to a respective detector 220*a* and 220*b* via two output waveguides 172. The PIC 170 in FIG. 29 may be part of an optical receiver 200.

The Raman signal 160 in FIG. 29 may be a free-space beam that is coupled into an input waveguide 172 using one or more lenses. The probe laser 110*pr* may be a laser diode that is mechanically attached or connected to the PIC 170 or to a substrate to which the PIC is also attached. Alternatively, the probe laser 110*pr* may be a fiber-coupled laser diode that sends the probe beam 120*pr* to the PIC 170 via optical fiber (e.g., an output end of the optical fiber may be attached to the PIC so that the light is coupled into an input optical waveguide 172). The probe beam 120*pr* may be amplified by an optical amplifier (not illustrated in FIG. 29) prior to being coupled into an input optical waveguide 172. In some embodiments, instead of using a single probe laser 110*pr* (as illustrated in FIG. 29), an optical receiver 200 may use a light source 110 with multiple laser diodes and an optical multiplexer 118 (e.g., as illustrated in FIG. 24), and the probe beam 120*pr* may be delivered from the multiplexer to the PIC 170 via optical fiber or via a waveguide 172 of the PIC.

A Raman spectroscopy system 100 may include one or more optical elements that (i) direct a pump beam 120*pu* and a Stokes beam 120S to a sample 150 and (ii) direct a Raman signal 160 and a probe beam 120*pr* to one or more detectors 220. The optical elements may include one or more PICs 170 that each include one or more optical waveguides 172. One or more of the optical waveguides 172 may direct the pump beam 120 and the Stokes beam 120*s* to the sample 150. For example, a PIC 170 may include an optical combiner 130 that produces a combined pump-Stokes beam 140 that is directed to the sample by an optical waveguide 172 of the PIC 170. One or more other optical waveguides 172 may direct the Raman signal 160 and the probe beam 120*pr* to one or more detectors 220. For example, a PIC 170 may include an optical combiner 130 that combines the Raman signal 160 and the probe beam 120*pr* to produce one or more combined probe-Raman signals 210 that are each directed to a detector 220 by an optical waveguide 172 of the PIC 170.

FIGS. 30-35 each illustrates example frequency ranges of a pump beam 120*pu* and a Stokes beam 120S. The pump beam 120*pu* may be produced by a pump light source 110*pu*, and the Stokes beam 120S may be produced by a Stokes light source 110S. The pump and Stokes light sources may each include one or more fixed wavelength laser diodes or one or more wavelength-tunable laser diodes. In each of FIGS. 30-35, the pump beam 120*pu* and the Stokes beam 120S each have one or more fixed frequencies or one or more frequencies that are adjustable over a particular frequency range. The corresponding frequency offset Ω between the pump and Stokes beams is indicated as a range of frequencies or a set of discrete frequencies that the frequency offset can be set to, based on the frequencies that are available to the pump and Stokes beams. The frequency offset Ω is determined from $v_1-v_2$, where $v_1$ is the range or set of fixed frequencies for the pump beam 120*pu*, and $v_2$ is the range or set of fixed frequencies for the Stokes beam 120S. The frequency offsets $\Omega_1$, $\Omega_2$, $\Omega_3$, and $\Omega_4$ in FIGS. 30-35 may have any suitable value between approximately 5 THz and approximately 100 THz. The frequency range ΔΩ over which a frequency offset may be varied may have any suitable value between approximately 5 THz and approximately 80 THz.

Figure 30:
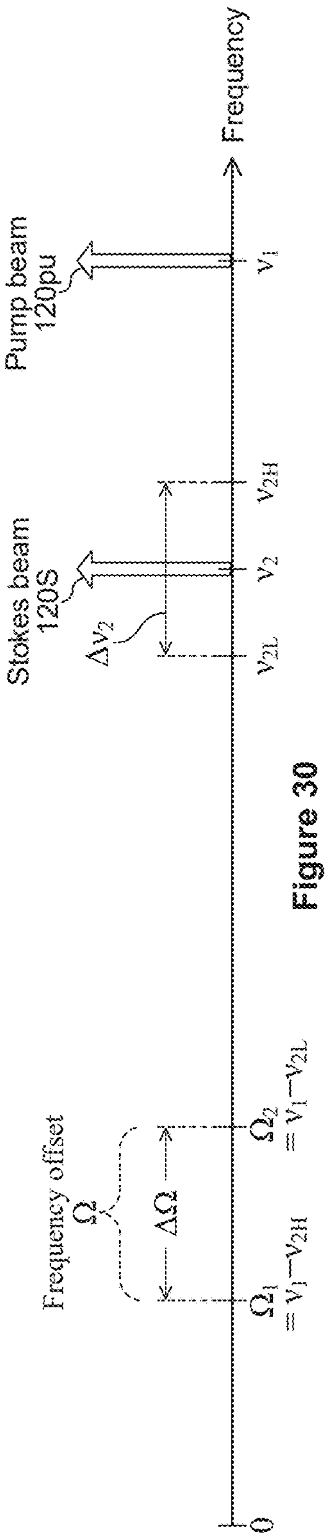
FIGS. 30-35 each illustrates example frequency ranges of a pump beam and a Stokes beam.

In FIG. 30, the pump beam 120*pu* has a single fixed frequency $v_1$, and the Stokes beam 120S has a frequency $v_2$ that is adjustable over a frequency range of width $\Delta v_2$. The adjustable frequency range $\Delta v_2$ of the Stokes beam 120S extends from a low frequency $v_{2L}$ to a high frequency $v_{2H}$, where $\Delta v_2=v_{2H}-v_{2L}$. The pump laser 110*pu* that produces the pump beam 120*pu* in FIG. 30 may be a fixed-wavelength laser diode, and the Stokes laser 110S that produces the Stokes beam 120S may be a wavelength-tunable laser diode. The frequency offset Ω between the pump and Stokes beams may be set to any value between $\Omega_1$ and $\Omega_2$, and the frequency range ΔΩ of the frequency offset is $\Omega_2$-$\Omega_1$. In FIG. 30, the frequency range ΔΩ is also equal to the frequency range $\Delta v_2$ of the Stokes beam 120S. When the Stokes beam 120S is set to the lower frequency $v_{2L}$, the frequency offset between the pump and Stokes beams is $v_1-v_{2L}$, which is equal to $\Omega_2$. Similarly, when the Stokes beam 120S is set to the upper frequency $v_{2H}$, the frequency offset between the pump and Stokes beams is $v_1-v_{2H}$, which is equal to $\Omega_1$.

For example, the pump beam 120*pu* in FIG. 30 may have a frequency $v_1$ of 250 THz (corresponding to a wavelength of approximately 1200 nm), and the Stokes beam 120S may be adjustable from a low frequency $v_{2L}$ of 195 THz to a high frequency $v_{2H}$ of 200 THz. This corresponds to a frequency-tuning range $\Delta v_2$ of the Stokes beam 120S of 5 THz (167 $cm^{-1}$ in wavenumbers) and a 38-nm wavelength-tuning range from approximately 1499 nm to approximately 1537 nm. The resulting frequency offset Ω between the pump and Stokes beams may be set to a value between the lower value $\Omega_1$ of 50 THz (1668 $cm^{-1}$ in wavenumbers) and the upper value $\Omega_2$ of 55 THz (1835 $cm^{-1}$ in wavenumbers), corresponding to a frequency range ΔΩ of 5 THz (167 $cm^{-1}$ in wavenumbers).

Figure 31:
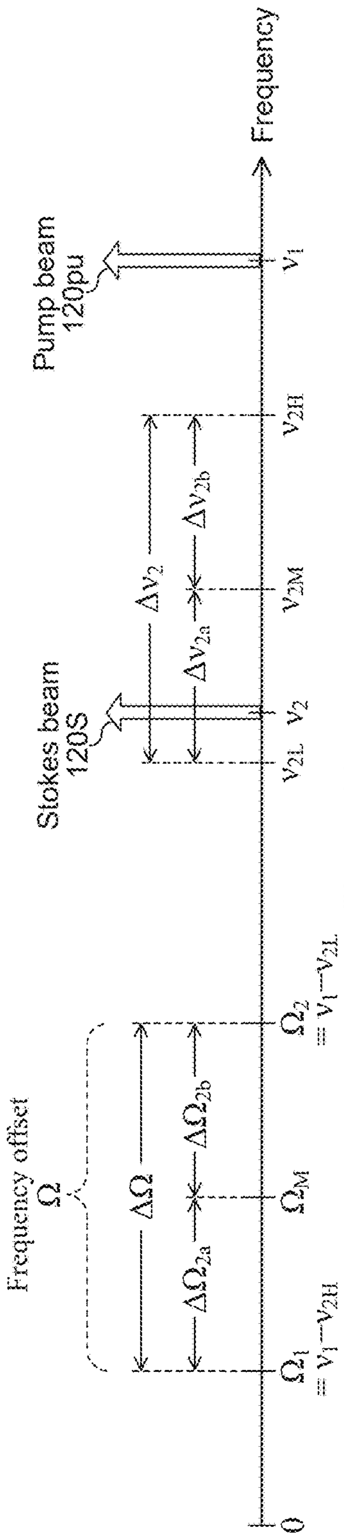

In FIG. 31, the pump beam 120*pu* has a single fixed frequency $v_1$, and the Stokes beam 120S has a frequency $v_2$ that is adjustable over a frequency range of width $\Delta v_2$. The adjustable frequency range $\Delta v_2$ of the Stokes beam 120S extends from a low frequency $v_{2L}$ to a high frequency $v_{2H}$, where $\Delta v_2=v_{2H}-v_{2L}$. The pump laser 110*pu* that produces the pump beam 120*pu* in FIG. 31 may be a fixed-wavelength laser diode. The Stokes light source 110S that produces the Stokes beam 120S may include two wavelength-tunable laser diodes. For example, the Stokes light source 110S may be similar to the light source in FIG. 24 where two wavelength-tunable laser diodes are combined by a multiplexer 118. A first wavelength-tunable laser diode may operate from frequency $v_{2L}$ to frequency $v_{2M}$, and a second wavelength-tunable laser diode may operate from frequency $v_{2M}$ to frequency $v_{2H}$. The total tuning range $\Delta v_2$ of the Stokes laser 110S equals the sum of the tuning ranges $\Delta v_2$a and $\Delta v_{2b}$ of the two wavelength-tunable laser diodes. In other embodiments, if the tuning ranges of the two wavelength-tunable laser diodes overlap, the total tuning range $\Delta v_2$ of the Stokes light source 110S will be reduced by the amount of frequency overlap between the two lasers.

In FIG. 31, the frequency offset Ω between the pump and Stokes beams may be set to any value between $\Omega_1$ and $\Omega_2$, and the frequency range ΔΩ of the frequency offset is $\Omega_2$-$\Omega_1$. When the first wavelength-tunable laser diode (with a frequency range from $v_{2L}$ to $v_{2M}$) is selected to operate, the frequency offset Ω may be set to any value between $\Omega_M$ and $\Omega_2$. For example, when the Stokes beam 120S is set to the lower frequency $v_{2L}$, the frequency offset between the pump and Stokes beams is $v_1-v_{2L}$, which is equal to $\Omega_2$. When the second wavelength-tunable laser diode (with a frequency range from $v_{2M}$ to $v_{2H}$) is selected to operate, the frequency offset $\Omega_2$ may be set to any value between $\Omega_1$ and $\Omega_M$. For example, when the Stokes beam 120S is set to the upper frequency $v_{2H}$, the frequency offset between the pump and Stokes beams is $v_1-v_{2H}$, which is equal to $\Omega_1$. The total frequency range ΔΩ of the frequency offset Ω is equal to the sum of the two frequency ranges $\Delta\Omega_{2a}$ and $\Delta\Omega_{2b}$. The frequency range ΔΩ is also equal to the overall frequency range $\Delta v_2$ of the Stokes beam 120S.

Figure 32:
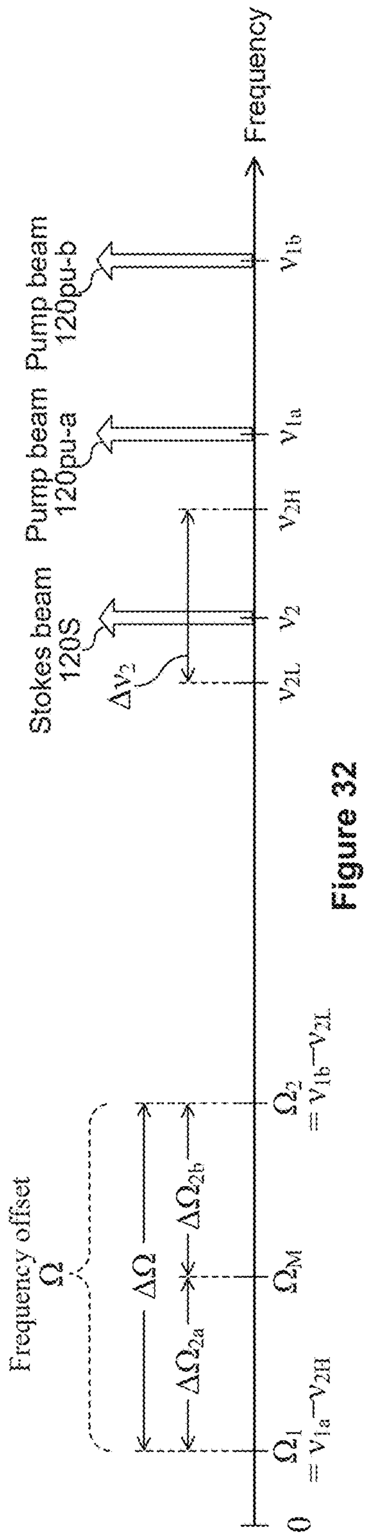

In FIG. 32, the pump beam 120*pu* can be set to two fixed frequencies $v_{1a}$ and $v_{1b}$, and the Stokes beam 120S has a frequency $v_2$ that is adjustable over a frequency range of width $\Delta v_2$. The adjustable frequency range $\Delta v_2$ of the Stokes beam 120S extends from a low frequency $v_{2L}$ to a high frequency $v_{2H}$, where $\Delta v_2=v_{2H}-v_{2L}$. The pump light source 110*pu* that produces the two pump beams 120*pu-a* and 120*pu-b* may include two fixed-wavelength laser diodes. For example, the pump light source 110*pu* may be similar to the light source in FIG. 24 where two fixed-wavelength laser diodes are combined by a multiplexer 118. The Stokes laser 110S that produces the Stokes beam 120S may be a wavelength-tunable laser diode. The frequency offset Ω between the pump and Stokes beams may be set to any value between $\Omega_1$ and $\Omega_2$, and the frequency range ΔΩ of the frequency offset is $\Omega_2$-$\Omega_1$. When the pump laser 110*pu* produces the pump beam 120*pu-a* at frequency $v_{1a}$, the Stokes beam 120S may be tuned to a frequency between $v_{2L}$ and $v_{2H}$ to produce a frequency offset $\Omega$ between $\Omega_1$ and $\Omega_M$. For example, with the Stokes beam 120S set to the upper frequency $v_{2H}$, the frequency offset between the pump and Stokes beams is $v_{1a}-v_{2H}$, which is equal to $\Omega_1$. When the pump laser 110*pu* produces the pump beam 120*pu-b* at frequency $v_{1b}$, the Stokes beam 120S may be tuned to a frequency between $v_{2L}$ and $v_{2H}$ to produce a frequency offset $\Omega$ between $\Omega_M$ and $\Omega_2$. For example, with the Stokes beam 120S set to the lower frequency $v_{2L}$, the frequency offset between the pump and Stokes beams is $v_{1b}-v_{2L}$, which is equal to $\Omega_2$.

Figure 33:
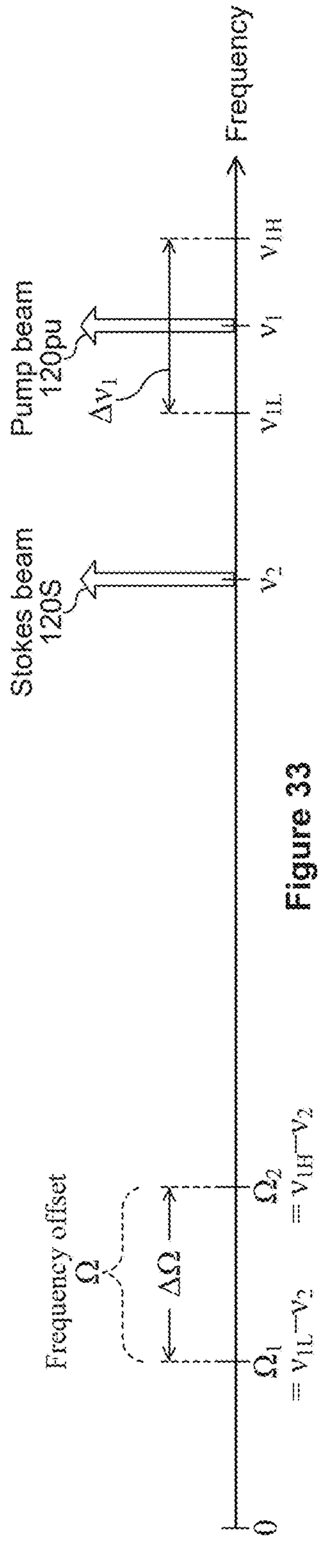

FIG. 33 is similar to FIG. 30, except in FIG. 33, the Stokes beam 120S has a fixed frequency $v_2$ and the frequency of the pump beam 120*pu* is adjustable. The adjustable frequency range $\Delta v_1$ of the pump beam 120*pu* extends from a low frequency $v_{1L}$ to a high frequency $v_{1H}$, where $\Delta v_1=v_{1H}-v_{1L}$. The Stokes laser 110S that produces the Stokes beam 120*pu* in FIG. 33 may be a fixed-wavelength laser diode, and the pump laser 110*pu* that produces the pump beam 120*pu* may be a wavelength-tunable laser diode. The frequency offset $\Omega$ between the pump and Stokes beams may be set to any value between $\Omega_1$ and $\Omega_2$, and the frequency range $\Delta\Omega$ of the frequency offset is $\Omega_2$-$\Omega_1$. In FIG. 33, the frequency range $\Delta\Omega$ is also equal to the frequency range $\Delta v_1$ of the pump beam 120*pu*. When the pump beam 120*pu* is set to the lower frequency $v_{1L}$, the frequency offset between the pump and Stokes beams is $v_{1L}-v_2$, which is equal to $\Omega_1$. Similarly, when the pump beam 120*pu* is set to the upper frequency $v_{1H}$, the frequency offset between the pump and Stokes beams is $v_{1H}-v_2$, which is equal to $\Omega_2$.

Figure 34:
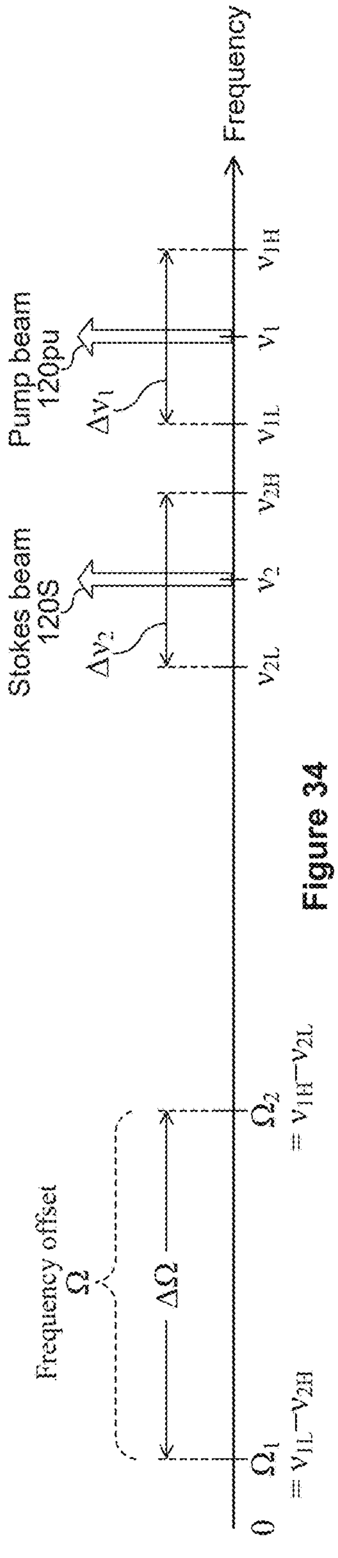

In FIG. 34, both the pump beam 120*pu* and the Stokes beam 120S have adjustable frequencies. The pump laser 110*pu* that produces the pump beam 120*pu* and the Stokes laser 110S that produces the Stokes beam 120S may each include a wavelength-tunable laser diode. The adjustable frequency range $\Delta v_1$ of the pump beam 120*pu* extends from a low frequency $v_{1L}$ to a high frequency $v_{1H}$, where $\Delta v_1=v_{1H}-v_{1L}$. The adjustable frequency range $\Delta v_2$ of the Stokes beam 120S extends from a low frequency $v_{2L}$ to a high frequency $v_{2H}$, where $\Delta v_2=v_{2H}-v_{2L}$. The frequency offset $\Omega$ between the pump and Stokes beams may be set to any value between $\Omega_1$ and $\Omega_2$, and the frequency range $\Delta\Omega$ of the frequency offset is $\Omega_2$-$\Omega_1$. When the Stokes beam 120S is set to the lower Stokes frequency $v_{2L}$ and the pump beam 120*pu* is set to the upper pump frequency $v_{1H}$, the frequency offset between the pump and Stokes beams is $v_{1H}-v_{2L}$, which is equal to $\Omega_2$. When the Stokes beam 120S is set to the upper Stokes frequency $v_{2H}$ and the pump beam 120*pu* is set to the lower pump frequency $v_{1L}$, the frequency offset between the pump and Stokes beams is $v_{1L}-v_{2H}$, which is equal to $\Omega_1$.

Figure 35:
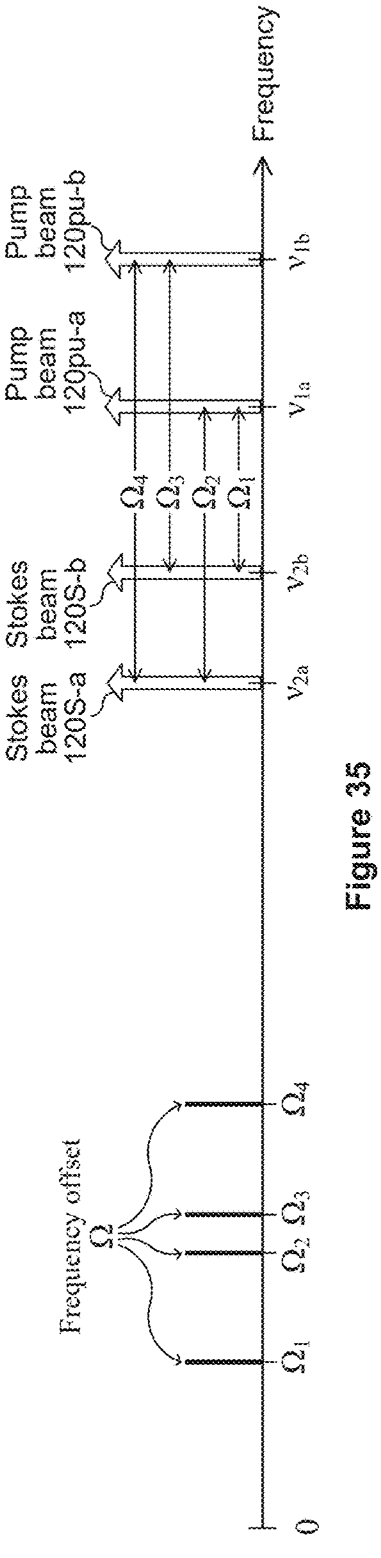

In FIG. 35, both the pump beam 120*pu* and the Stokes beam 120S can be set to two different fixed frequencies. A pump light source 110*pu* and a Stokes light source 110S may each include two or more fixed wavelength laser diodes, and each light source may be similar to the light source in FIG. 24 where multiple fixed-wavelength laser diodes are combined by a multiplexer 118. In FIG. 35, the pump light source 110*pu* that produces the two pump beams 120*pu-a* and 120*pu-b* may include two fixed-wavelength laser diodes, and the Stokes light source 110S that produces the two Stokes beams 120S-a and 120S-b may include two fixed-wavelength laser diodes. The frequencies of the pump and Stokes beams may be selected to produce four different frequency offsets $\Omega_1$, $\Omega_2$, $\Omega_3$, and $\Omega_4$. For example, selecting Stokes beam 120S-b at frequency $v_{2b}$ and pump beam 120*pu-a* at frequency $v_{1a}$ produces a frequency offset $\Omega_1$, which is equal to $v_{1a}-v_{2b}$. As another example, selecting Stokes beam 120S-a at frequency $v_2$a and pump beam 120*pu-b* at frequency $v_{1b}$ produces a frequency offset $\Omega_4$, which is equal to $v_{1b}-v_2$a. The frequency offset $\Omega_2$ may be produced by selecting Stokes beam 120S-a at frequency $v_2$a and pump beam 120*pu-a* at frequency via, and the frequency offset $\Omega_3$ may be produced by selecting Stokes beam 120S-b at frequency $v_{2b}$ and pump beam 120*pu-b* at frequency $v_{1b}$.

Figure 36:
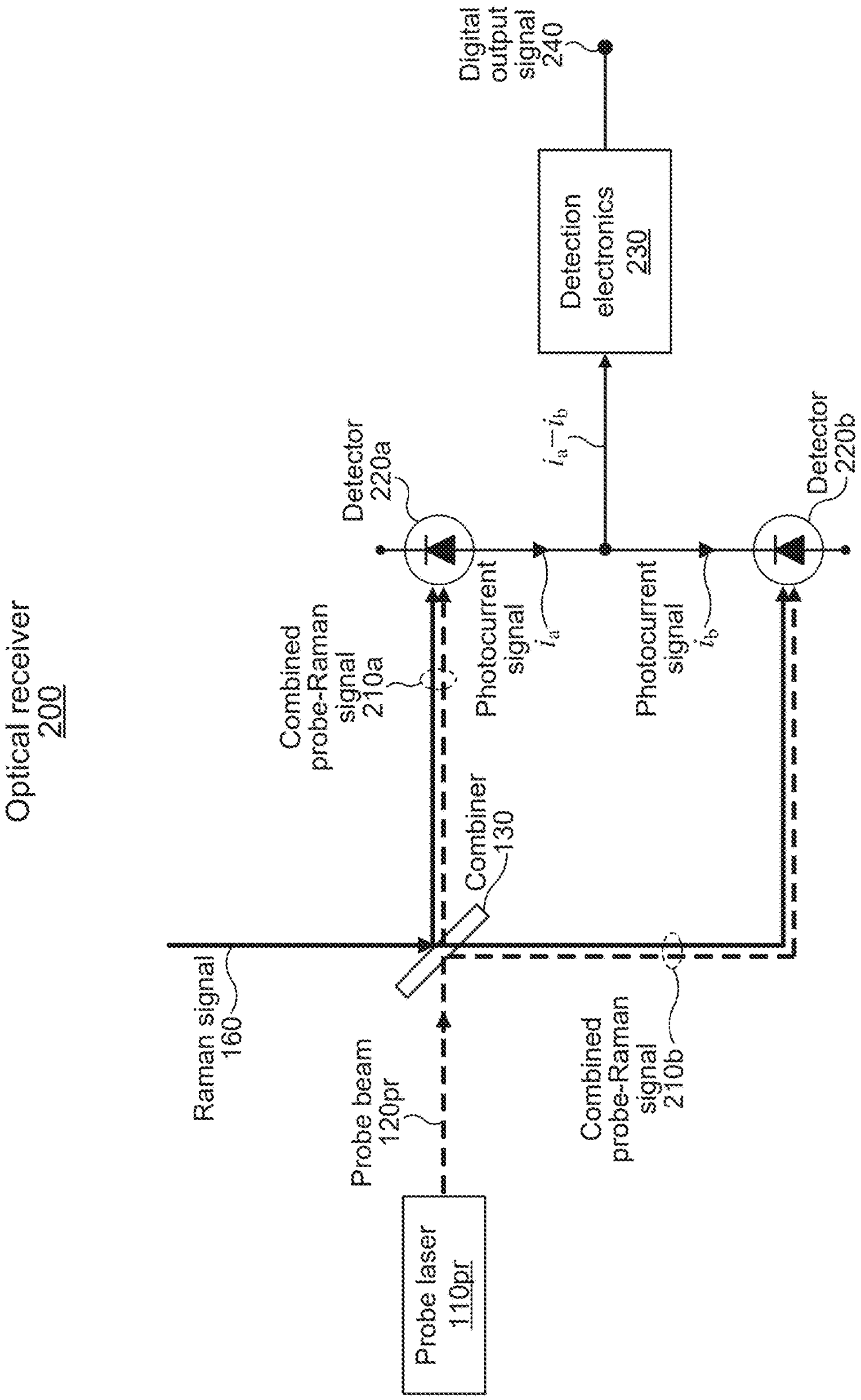
FIG. 36 illustrates an example optical receiver with two detectors.

FIG. 36 illustrates an example optical receiver 200 with two detectors 220*a* and 220*b*. The optical receivers 200 in FIGS. 29 and 36 are similar, except one difference is that the optical receiver in FIG. 29 is a waveguide-based optical receiver, while the optical receiver in FIG. 36 is a free-space optical receiver 200. The optical combiner 130 in FIG. 36 may be a 50/50 free-space beamsplitter that reflects approximately 50% of an incident beam of light and transmits approximately 50% of the beam. The optical combiner 130 splits the Raman signal 160 and the probe beam 120*pr* into two beams to produce two combined probe-Raman signals 210*a* and 210*b*. The combined probe-Raman signal 210*a* is directed to detector 220*a* and includes a transmitted portion of the probe beam 120*pr* and a reflected portion of the Raman signal 160 (e.g., approximately 50% of the probe beam and approximately 50% of the Raman signal). Similarly, the combined probe-Raman signal 210*b* is directed to detector 220*b* and includes a reflected portion of the probe beam 120*pr* and a transmitted portion of the Raman signal 160. The portions of the probe beam 120*pr* and the Raman signal 160 that make up the combined probe-Raman signal 210*a* may be coherently mixed at detector 220*a* to produce the photocurrent signal $i_a$. Similarly, the portions of the probe beam 120*pr* and the Raman signal 160 that make up the combined probe-Raman signal 210*b* may be coherently mixed at detector 220*b* to produce the photocurrent signal $i_b$.

The two detectors 220*a* and 220*b* are arranged so that their respective photocurrents $i_a$ and $i_b$ are subtracted. The anode of detector 220*a* is electrically connected to the cathode of detector 220*b*, and the subtracted photocurrent signal $i_a-i_b$ from the anode-cathode connection is sent to the detection electronics 230, which produces a digital output signal 240 that corresponds to the subtracted photocurrent signal. The subtracted photocurrent signal may be expressed as $i_a-i_b=2E_RE_{pr}\cos[2\pi(v_R-v_3)t+\Delta\phi]$, which corresponds to the coherent-mixing term discussed herein. The subtracted photocurrent signal does not include the terms $$E_R^2$$

and $$E_{pr}^2$$

corresponding to the respective optical powers of the Raman signal 160 and the probe beam 120*pr*. By subtracting the two photocurrents $i_a$ and $i_b$ the common-mode terms $$E_R^2$$

and $$E_{pr}^2$$

(as well as common-mode noise) that appear in each of the photocurrent signals $i_a$ and $i_b$ are substantially removed, leaving the coherent-mixing term, which is the quantity of interest. Since subtraction may remove common-mode noise, the subtracted photocurrent signal $i_a - i_b$ may have a reduced noise compared to each of the photocurrent signals $i_a$ and $i_b$ alone. The dual-detector arrangement in FIG. 36 in which the photocurrents are subtracted may be referred to as a balanced optical detector. A balanced detector may be implemented as a free-space device, a fiber-optic-based device, or a waveguide-based device.

Figure 37:
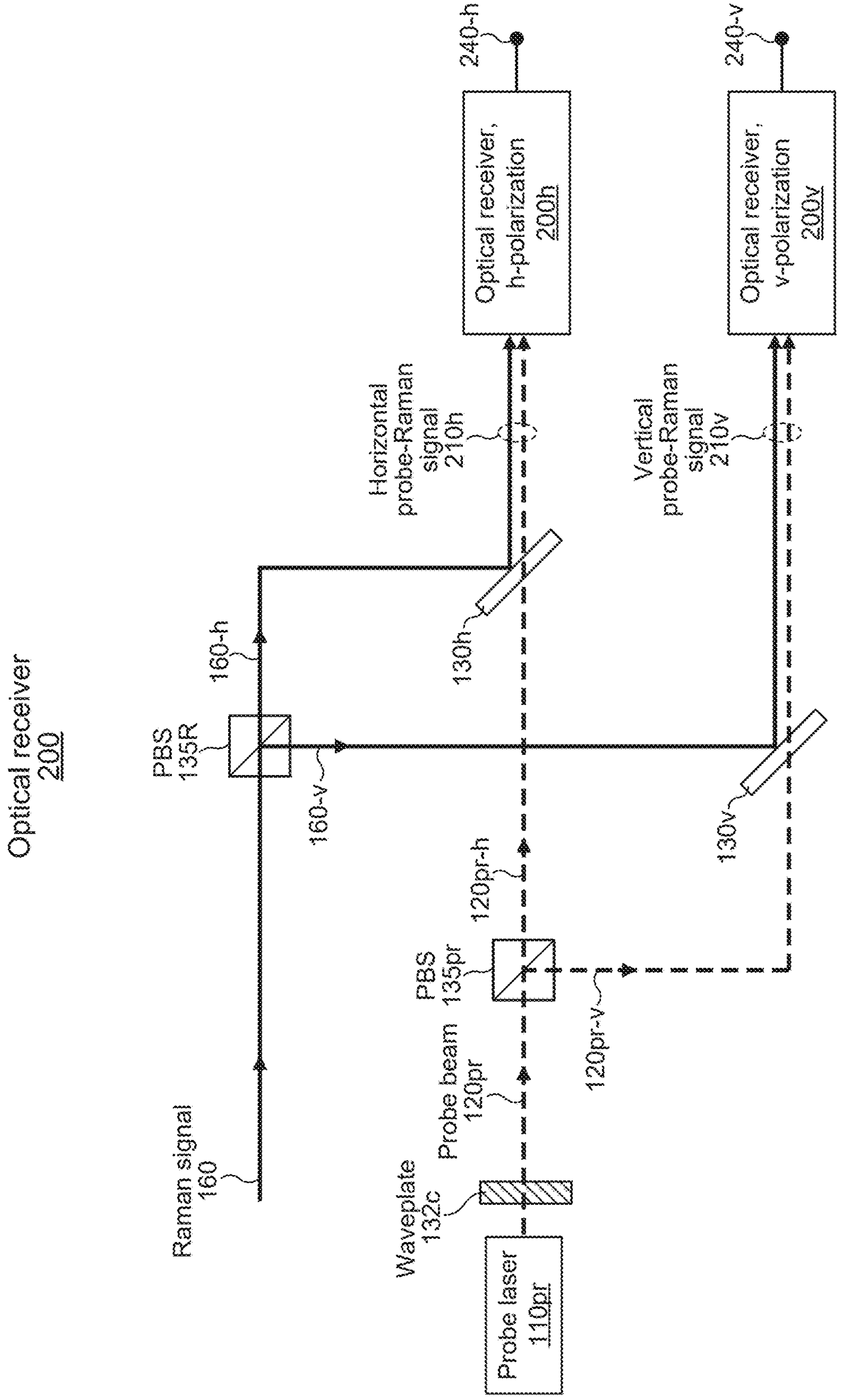
FIG. 37 illustrates an example optical receiver configured for polarization-sensitive detection of a Raman signal.

FIG. 37 illustrates an example optical receiver 200 configured for polarization-sensitive detection of a Raman signal 160. A polarization-sensitive optical receiver 200 may be used to determine the polarization of a Raman signal 160. The polarization of a Raman signal 160 may be determined by a processor based on one or more digital output signals 240 produced by the polarization-sensitive optical receiver 200. Determining the polarization of a Raman signal 160 may include determining a relative size or ratio of two orthogonal polarization components of the Raman signal (e.g., horizontal and vertical polarization components of the Raman signal). For example, if the ratio of the horizontal and vertical polarization components of a Raman signal 160 is 100:1, then the Raman signal may be determined to be substantially horizontally polarized. As another example, if the ratio of the horizontal and vertical polarization components of a Raman signal 160 is 1:1, then the horizontal and vertical polarization components of the Raman signal may be determined to be approximately equal (e.g., the Raman signal may be circularly polarized or linearly polarized at a 45-degree angle to the horizontal and vertical directions).

A polarization-sensitive optical receiver 200 may include a polarization beamsplitter (PBS) 135 that splits an input beam into two output beams, where one output beam is horizontally polarized, and the other output beam is vertically polarized. The horizontally polarized output beam includes the horizontal polarization component of the input beam, and the vertically polarized output beam includes the vertical polarization component of the input beam. The Raman signal 160 in FIG. 37 is directed to a Raman-signal PBS 135R that splits the Raman signal into a horizontal-polarization Raman signal 160-*h* and a vertical-polarization Raman signal 160-*v*. Similarly, the probe beam 120*pr* is directed to a probe-beam PBS 135*pr* that splits the probe beam into a horizontal-polarization probe beam 120*pr-h* and a vertical-polarization probe beam 120*pr-v*.

A polarization-sensitive optical receiver 200 may include a waveplate 132 that changes the polarization of the probe beam 120*pr* so that the probe beam is split into two polarization components. The two polarization components may each have approximately one-half the power of the probe beam 120*pr*. The waveplate 132*c* in FIG. 37 may be (i) a half-wave plate that rotates the polarization of the probe beam 120*pr* or (ii) a quarter-wave plate that converts the probe beam 120*pr* to a circular or elliptical polarization. For example, the probe laser 110*pr* may produce a probe beam 120*pr* that is vertically polarized, and the waveplate 132*c* may be a half-wave plate that rotates the probe-beam polarization by 45 degrees so that the horizontal-polarization and vertical-polarization probe beams 120*pr-h* and 120*pr-v* each have approximately equal optical powers.

The optical combiner 130*h* in FIG. 37 combines the horizontal-polarization Raman signal 160-*h* and the horizontal-polarization probe beam 120*pr-h* to produce a horizontal probe-Raman signal 210*h* that is directed to a horizontal-polarization optical receiver 200*h*. Similarly, the optical combiner 130*v* combines the vertical-polarization Raman signal 160-*v* and the vertical-polarization probe beam 120*pr-v* to produce a vertical probe-Raman signal 210*v* that is directed to a vertical-polarization optical receiver 200*v*. The horizontal-polarization optical receiver 200*h* may include one or more optical detectors 200, where each detector is configured to coherently mix at least a portion of the horizontal-polarization Raman signal 160-*h* and at least a portion of the horizontal-polarization probe beam 120*pr-h* to produce a horizontal-polarization electronic signal. Similarly, the vertical-polarization optical receiver 200*v* may include one or more optical detectors 200, where each detector is configured to coherently mix at least a portion of the vertical-polarization Raman signal 160-*v* and at least a portion of the vertical-polarization probe beam 120*pr-v* to produce a vertical-polarization electronic signal. The horizontal-polarization optical receiver 200*h* and the vertical-polarization optical receiver 200*v* may each include: (i) a single detector 220 (e.g., similar to the optical receiver 200 in FIG. 2), (ii) two detectors 220 (e.g., similar to the balanced optical detector arrangement in FIG. 36), or (iii) four detectors 220 (e.g., similar to the arrangement in FIG. 39). The electronic signals may include a photocurrent signal i, and each optical receiver may include an electronic amplifier 232 that produces a corresponding voltage signal 234. The h-polarization optical receiver 200*h* may produce a digital output signal 240-*h* corresponding to the horizontal-polarization electronic signal, and the v-polarization optical receiver 200*v* may produce a digital output signal 240-*v* corresponding to the vertical-polarization electronic signal.

A processor may determine one or more characteristics of the horizontal-polarization and vertical-polarization electronic signals based on the digital output signals 240-*h* and 240-*v*. Additionally, a processor may determine a polarization of the Raman signal 160 based on the characteristics of the horizontal-polarization and vertical-polarization electronic signals. For example, the characteristics of the electronic signals may include an amplitude or an area associated with the electronic signals, and the polarization of the Raman signal 160 may be expressed as a relative size or ratio of the amplitudes or areas associated with the horizontal and vertical polarization components of the Raman signal. If the horizontal digital output signal 240-*h* includes an amplitude characteristic with value 100 and the vertical digital output signal 240-*v* includes a corresponding amplitude characteristic with value 1, then the Raman signal 160 may be determined to be substantially horizontally polarized. If the horizontal and vertical digital output signals each include amplitude characteristics having approximately equal values, then the Raman signal 160 may be determined to have approximately equal horizontal and vertical polarization components.

A polarization-sensitive optical receiver 200 as illustrated in FIG. 37 may be implemented with free-space optical elements, fiber-optic components, waveguide-based optical elements, a metamaterial-based device, or any suitable combination thereof. For example, the two PBSs 135 in FIG. 37 may be free-space polarization beamsplitter cubes, and the Raman signal 160 and the probe beam 120*pr* may be free-space optical beams. Alternatively, the two PBSs 135 may be fiber-optic components, and the Raman signal 160 and the probe beam 120*pr* may be conveyed to the PBSs 135 via optical fiber (e.g., single-mode optical fiber or polarization-maintaining optical fiber). Additionally, the horizontally and vertically polarized probe-Raman signals 210*h* and 210*v* may be conveyed to the respective h-polarization and v-polarization optical receivers via polarization-maintaining optical fiber. The h-polarization and v-polarization optical receivers may each preserve the polarization of the respective horizontally and vertically polarized probe-Raman signals. For example, the h-polarization and v-polarization optical receivers may each include polarization-maintaining optical fiber that maintains the polarization of the beams. Alternatively, the h-polarization and v-polarization receivers may each include a PIC with optical waveguides configured to maintain the polarization of the beams.

Figure 38:
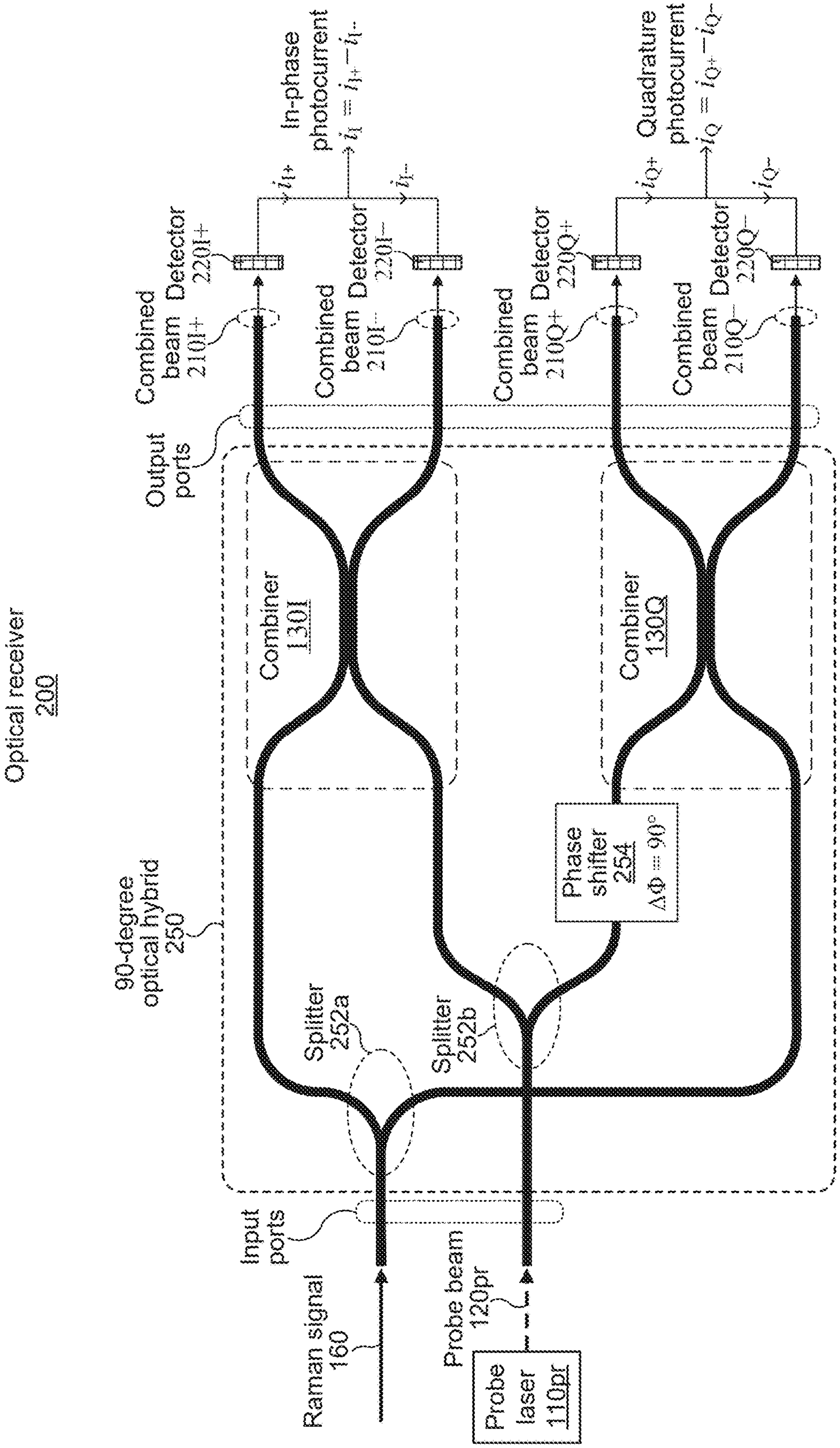
FIG. 38 illustrates an example optical receiver configured to detect in-phase and quadrature components of a Raman signal.

FIG. 38 illustrates an example optical receiver 200 configured to detect in-phase and quadrature components of a Raman signal 160. The optical receiver 200 includes a 90-degree optical hybrid 250 and four detectors 220I+, 220I−, 220Q+, and 220Q−. A 90-degree optical hybrid 250 is an optical-combiner component with two input ports and four output ports. Input light received at each of the two input ports is split, combined, and directed to each of the four output ports, and a 90-degree phase shift is imparted to one of the split beams before the Raman signal 160 and probe beam 120*pr* are combined. The 90-degree optical hybrid 250 in FIG. 38 combines a Raman signal 160 and a probe beam 120*pr* to produce four combined output beams: two in-phase combined beams 210I+ and 210I−, and two quadrature combined beams 210Q+ and 210Q−. Each of the four combined beams 210 may include a portion of the Raman signal 160 and a portion of the probe beam 120*pr*, and each of the combined beams is directed to one of the four detectors of the optical receiver 200. In FIG. 38, each of the four detectors produces a photocurrent signal that corresponds to the coherent mixing of a portion of the Raman signal 160 and a portion of the probe beam 120*pr*.

A 90-degree optical hybrid 250 may be configured so that the combined beams directed to each of the output ports have approximately the same optical power or energy. For example, the 90-degree optical hybrid 250 in FIG. 38 may split the Raman signal 160 into four approximately equal portions and direct each of the Raman-signal portions to one of the detectors. Similarly, the probe beam 120*pr* may be split into four approximately equal portions directed to each of the four detectors. In the example of FIG. 38, the combined beam 210I+, which is directed to detector 220I+, may include approximately one-quarter of the power of the Raman signal 160 and approximately one-quarter of the power of the probe beam 120*pr*. Similarly, each of the three other combined beams (210I−, 210Q+, 210Q−) in FIG. 38 may also include approximately one-quarter of the Raman signal 160 and approximately one-quarter of the probe beam 120*pr*.

A 90-degree optical hybrid 250 may be implemented as a waveguide-based device in a PIC. The 90-degree optical hybrid 250 in FIG. 38 is a waveguide-based optical device that includes two waveguide-based optical splitters (252*a*, 252*b*) and two waveguide-based optical combiners (130I, 130Q). Splitter 252*a* may split the Raman signal 160 into two portions having substantially equal optical power, a first portion directed to combiner 130I and a second portion directed to combiner 130Q. Similarly, splitter 252*b* may split the probe beam 120*pr* into two portions having substantially equal power, a first portion directed to combiner 130I and a second portion directed to combiner 130Q. Each optical combiner 130 combines a portion of the Raman signal 160 with a portion of the probe beam 120*pr*, and the combined portions are split into a first combined beam (e.g., combined beam 210I+) and a second combined beam (e.g., combined beam 210I−). The combined beam 210I+ is directed to detector 220I+ and includes portions of the Raman signal 160 and the probe beam 120*pr* (e.g., approximately 25% of the Raman signal 160 and approximately 25% of the probe beam 120*pr*). The combined beam 210I− is directed to detector 220I− and may include approximately 25% of the Raman signal 160 and approximately 25% of the probe beam 120*pr*.

In other embodiments, all or part of a 90-degree optical hybrid 250 may be implemented as a free-space optical device. For example, a free-space 90-degree optical hybrid 250 may include one or more free-space beamsplitters or combiners that receive the Raman signal 160 and probe beam 120*pr* as free-space beams and produce four free-space combined beams (210I+, 210I−, 210Q+, 210Q−). Alternatively, all or part of a 90-degree optical hybrid 250 may be implemented as a fiber-optic device. For example, a 90-degree optical hybrid 250 may be contained in a package with two input optical fibers that direct the Raman signal 160 and probe beam 120*pr* into the package and four output optical fibers that direct the four combined beams to four respective detectors.

A 90-degree optical hybrid 250 may include an optical phase shifter 254 that imparts a 90-degree phase change ($\Delta\phi$) to a portion of the probe beam 120*pr* or to a portion of the Raman signal 160. The phase shifter 254 may apply the 90-degree phase change after a beam of light is split by an optical splitter 252 and prior to combining the Raman signal with the probe beam at an optical combiner 130. For example, a splitter 252*a* may split the Raman signal 160 into two portions, and a phase shifter 254 may impart a 90-degree phase change to one portion of the Raman signal with respect to the other portion, after which the two portions are sent to two different optical combiners. As another example, a splitter 252*b* may split the probe beam 120*pr* into two portions, and a phase shifter 254 may impart a 90-degree phase change to one portion of the probe beam with respect to the other portion. In FIG. 38, the phase shifter is located after the splitter 252*b* and before the combiner 130Q. The splitter 252*b* splits the probe beam 120*pr* into two portions, and the phase shifter 254 imparts a 90-degree phase change to the probe-beam portion directed to combiner 130Q. The other portion of the probe beam 120*pr* directed to combiner 130I does not pass through the phase shifter 254 and does not receive a phase shift from the phase shifter 254.

An optical phase shifter 254 may be implemented as a part of a waveguide-based 90-degree optical hybrid 250. For example, a phase shifter 254 may be implemented as part of an optical waveguide that only one portion of the probe beam 120*pr* propagates through. That part of the optical waveguide may be temperature controlled to adjust the refractive index of the waveguide and produce a relative phase delay of approximately 90 degrees between two portions of the probe beam 120*pr*. Additionally or alternatively, the 90-degree optical hybrid 250 as a whole may be temperature controlled to set and maintain a 90-degree phase delay. As another example, a phase shifter 254 may be implemented by applying an external electric field to part of an optical waveguide to change the refractive index of the waveguide and produce a 90-degree phase delay. In other embodiments, a phase shifter 254 may be implemented as a part of a free-space or fiber-coupled 90-degree optical hybrid 250. For example, the input and output beams in a free-space 90-degree optical hybrid 250 may be reflected by or transmitted through the optical surfaces of a free-space optical hybrid 250 so that a relative phase shift of 90 degrees is imparted to one portion of the probe beam 120*pr* with respect to another portion of the probe beam.

In FIG. 38, each of the four detectors produces a photocurrent signal that corresponds to the coherent mixing of a portion of the Raman signal 160 and a portion of the probe beam 120*pr*. The photocurrents are subtracted in a manner similar to that illustrated in FIG. 36. The photocurrents $i_{I+}$ and $i_{I-}$ from detectors 220I+ and 220I− are subtracted to produce the subtracted in-phase photocurrent signal i which is equal to $i_{I+}-i_{I-}$. Similarly, the photocurrents $i_{Q+}$ and $i_{Q-}$ from detectors 220Q+ and 220Q− are subtracted to produce the subtracted quadrature photocurrent signal $i_Q$ which is equal to $i_{Q+}-i_{Q-}$. Each of the subtracted photocurrent signals represents a coherent-mixing term corresponding to the coherent mixing of a portion of the Raman signal 160 and a portion of the probe beam 120*pr*. The two subtracted photocurrent signals $i_I$ and $i_Q$ are similar, except the in-phase photocurrent signal $i_I$ includes a cosine function, while the quadrature photocurrent signal $i_Q$ includes a sine function. This difference between the two subtracted photocurrent signals arises from the 90-degree phase shift provided by the phase shifter 254. Because a 90-degree phase shift is imparted to the probe beam 120*pr* directed to the combiner 130Q, the subtracted quadrature photocurrent signal $i_Q$ includes a sine function (which has a 90-degree phase offset with respect to a cosine function).

Each of the subtracted photocurrent signals $i_I$ and $i_Q$ may be sent to detection electronics 230 that produce voltage signals and digital output signals corresponding to the subtracted photocurrent signals. Based on the digital output signals (which result from the four photocurrent signals $i_{I+}$, $i_{I-}$, $i_{Q+}$, and $i_{Q-}$), a processor may determine an in-phase portion IP associated with the Raman signal 160 and a quadrature portion Q associated with the Raman signal. Additionally or alternatively, the processor may determine a phase associated with the Raman signal 160. For example, the processor may determine a phase difference Δϕ between the Raman signal 160 and the probe beam 120*pr*. A phase difference may be referred to as a phase offset or a relative phase between the Raman signal 160 and the probe beam 120*pr*.

The in-phase portion IP associated with the Raman signal 160 may be determined from a characteristic (e.g., an amplitude or an area) of an electronic signal associated with the in-phase photocurrent signal i, and the quadrature portion Q may be determined from a characteristic associated with the quadrature photocurrent signal $i_Q$. The in-phase portion IP may correspond to an amount of the Raman signal 160 that is in-phase with the probe beam 120*pr*, and the quadrature portion Q may represent an amount of the Raman signal that is out of phase (i.e., 90-degrees phase-shifted) with the probe beam. For example, the in-phase portion IP and the quadrature portion Q, may each have values from −1 to 1. If the Raman signal 160 is in-phase with the probe beam 120*pr*, then the in-phase portion IP may have a value of approximately 1, and the quadrature portion Q may have a value of approximately 0. Similarly, if the Raman signal 160 is out of phase by ±90 degrees with respect to the probe beam 120*pr*, then the in-phase portion IP may have a value of 0, and the quadrature portion Q may have a value of ±1. The phase difference Δϕ between the Raman signal 160 and the probe beam 120*pr* may be determined from the expression Δϕ=arctan (Q/IP). For example, if Q is 0 and IP is 1, then the Raman signal and the probe beam are substantially in phase, with a phase difference Δϕ of 0 degrees. As another example, if Q is 1 and IP is 0, then the Raman signal and the probe beam are substantially out of phase, with a phase difference Δϕ of 90 degrees.

Figure 39:
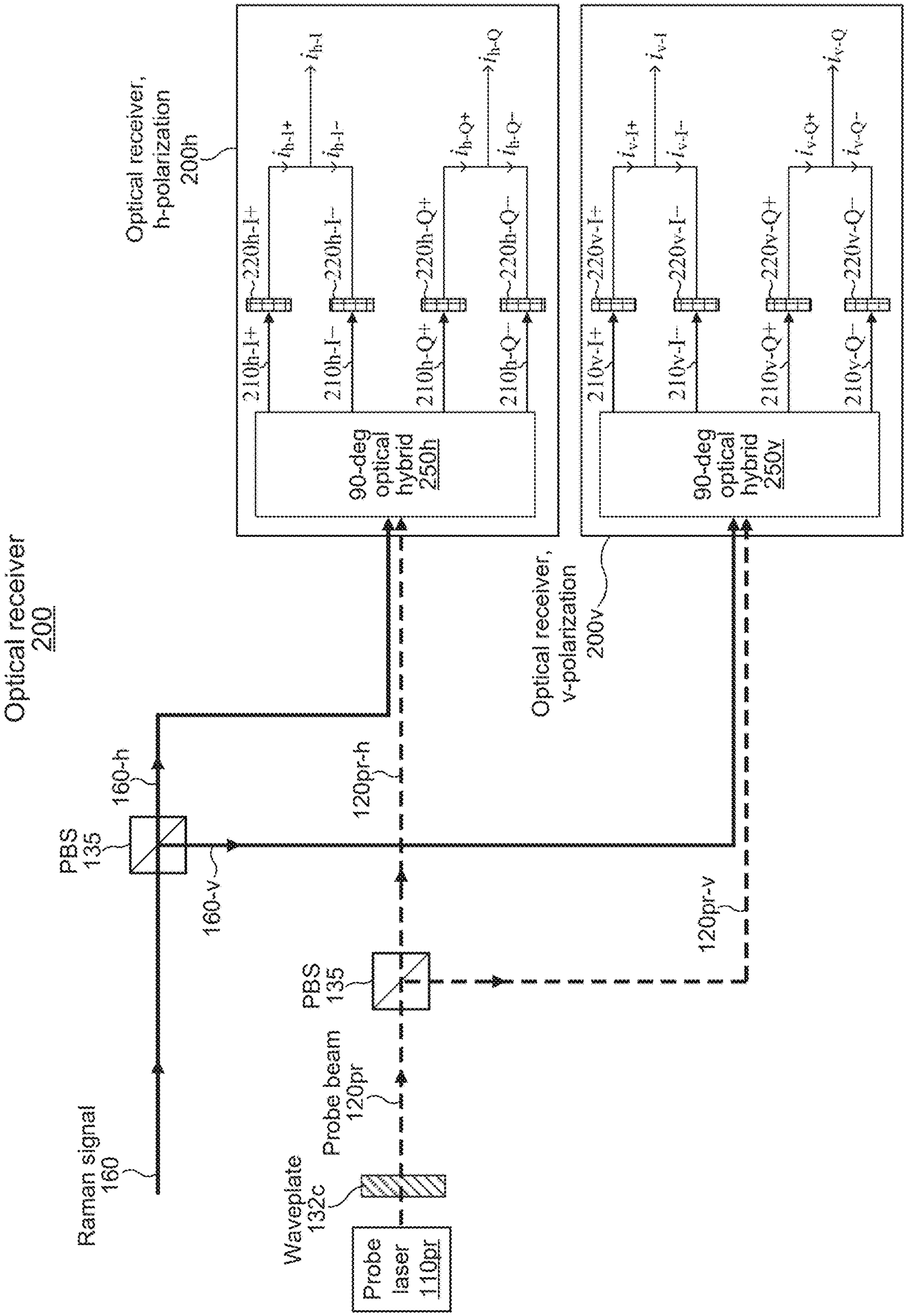
FIG. 39 illustrates an example optical receiver configured to detect polarization as well as in-phase and quadrature components of a Raman signal.

FIG. 39 illustrates an example optical receiver 200 configured to detect polarization as well as in-phase and quadrature components of a Raman signal 160. The optical receiver 200 in FIG. 39 is similar the optical receiver 200 in FIG. 37, where the horizontal-polarization optical receiver 200*h* and the vertical-polarization optical receiver 200*v* each includes a 90-degree optical hybrid 250. Each of the 90-degree optical hybrids in FIG. 39 may be similar to the 90-degree optical hybrid 250 in FIG. 38. In FIG. 39, the horizontal-polarization Raman signal 160-*h* and the horizontal-polarization probe beam 120*pr-h* are directed to a horizontal-polarization optical receiver 200*h* that includes a 90-degree optical hybrid 250*h* and four detectors 220*h*-I+, 220*h*-I−, 220*h*-Q+, and 220*h*-Q−. The vertical-polarization Raman signal 160-*v* and the vertical-polarization probe beam 120*pr-h* are directed to a vertical-polarization optical receiver 200*v* that includes a 90-degree optical hybrid 250*v* and four detectors 220*v*-I+, 220*v*-I−, 220*v*-Q+, and 220*v*-Q−. The h-polarization optical receiver 200*h* may be used to determine the relative size of the horizontal-polarization Raman signal 160-*h* as well as the in-phase and quadrature components of the horizontal-polarization Raman signal 160-*h*. Similarly, the v-polarization optical receiver 200*h* may be used to determine the relative size of the vertical-polarization Raman signal 160-*v* as well as the in-phase and quadrature components of the vertical-polarization Raman signal 160-*v*.

The 90-degree optical hybrid 250*h* in FIG. 39 combines the horizontal-polarization Raman signal 160-*h* and the horizontal-polarization probe beam 120*pr-h* to produce four horizontally polarized combined output beams: two in-phase combined beams 210*h*-I+ and 210*h*-I−, and two quadrature combined beams 210*h*-Q+ and 210*h*-Q−. Each of the four horizontally polarized combined beams includes a portion of the horizontal-polarization Raman signal 160-*h* and a portion of the horizontal-polarization probe beam 120*pr-h*. The four combined beams are directed to four respective detectors (220*h*-I+, 220*h*-I−, 220*h*-Q+, 220*h*-Q−), and each detector produces a respective photocurrent signal ($i_{h-I+}$, $i_{h-I-}$, $i_{h-Q+}$, $i_{h-Q-}$) that corresponds to the coherent mixing of a portion of the horizontal Raman signal 160-*h* and a portion of the horizontal probe beam 120*pr-h*. Each of the four photocurrents $i_{h-I+}$, $i_{h-I-}$, $i_{h-Q+}$, and $i_{h-Q-}$ may be referred to as a horizontal-polarization electronic signal. The photocurrents from the detectors are subtracted to produce a subtracted horizontal in-phase photocurrent signal in which is equal to $i_{h-+}-i_{h-I-}$ and a subtracted horizontal quadrature photocurrent signal $i_{h-Q}$ which is equal to $i_{h-Q+}-i_{h-Q-}$.

The 90-degree optical hybrid 250*v* in FIG. 39 combines the vertical-polarization Raman signal 160-*v* and the vertical-polarization probe beam 120*pr-v* to produce four vertically polarized combined output beams: two in-phase combined beams 210*v*-I+ and 210*v*-I−, and two quadrature combined beams 210*v*-Q+ and 210*v*-Q−. Each of the four vertically polarized combined beams includes a portion of the vertical-polarization Raman signal 160-*v* and a portion of the vertical-polarization probe beam 120*pr-v*. The four combined beams are directed to four respective detectors (220*v*-I+, 220*v*-I−, 220*v*-Q+, 220*v*-Q−), and each detector produces a respective photocurrent signal ($i_{v-I+}$, $i_{v-I-}$, $i_{v-Q+}$, $i_{v-Q-}$) that corresponds to the coherent mixing of a portion of the vertical Raman signal 160-*v* and a portion of the vertical probe beam 120*pr-v*. Each of the four photocurrents $i_{v-I+}$, $i_{v\text{-}I-}$, $i_{v\text{-}Q+}$, and $i_{v\text{-}Q-}$ may be referred to as a vertical-polarization electronic signal. The photocurrents from the detectors are subtracted to produce a subtracted vertical in-phase photocurrent signal $i_{v\text{-}I}$ which is equal to $i_{v\text{-}I+}-i_{v\text{-}I-}$ and a subtracted vertical quadrature photocurrent signal $i_{v\text{-}Q}$ which is equal to $i_{v\text{-}Q+}-i_{v\text{-}Q-}$.

Each of the subtracted photocurrent signals $i_{h\text{-}I}$, $i_{H\text{-}Q}$, $i_{v\text{-}I}$, and $i_{v\text{-}Q}$ may be sent to detection electronics 230 that produces voltage signals and digital output signals corresponding to the subtracted photocurrent signals. Based on the digital output signals (which are determined from the four horizontal-polarization electronic signals and the four vertical-polarization electronic signals), a processor may determine (i) the polarization of the Raman signal 160 and (ii) a phase associated with the Raman signal (e.g., a phase difference $\Delta\phi$ between the Raman signal 160 and the probe beam 120*pr*). Determining the polarization of a Raman signal 160 may include determining a relative size or ratio of the horizontal and vertical polarization components of the Raman signal. For example, the relative size of the horizontal polarization component of the Raman signal 160 may be determined by adding characteristics (e.g., areas or amplitudes) associated with the two horizontal photocurrent signals $i_{h\text{-}I}$ and $i_{h\text{-}Q}$. Similarly, the relative size of the vertical polarization component of the Raman signal 160 may be determined by adding characteristics associated with the two vertical photocurrent signals $i_{v\text{-}I}$ and $i_{v\text{-}Q}$. As an example, if the relative size of the horizontal polarization component of the Raman signal 160 is 1 and the relative size of the vertical polarization component of the Raman signal 160 is 100, then the Raman signal 160 may be determined to be substantially vertically polarized.

Based on the digital output signals, a processor may determine a phase associated with the Raman signal. For example, the processor may determine (i) a phase difference $\Delta\phi_h$ between the horizontal Raman signal 160-*h* and the horizontal probe beam 120*pr-h* and (ii) a phase difference $\Delta\phi_v$ between the vertical Raman signal 160-*v* and the vertical probe beam 120*pr-v*. Based on the digital output signals, a processor may determine in-phase and quadrature portions associated with each of the horizontal Raman signal 160-*h* and vertical Raman signal 160-*v*. The phase difference $\Delta\phi_h$ between the horizontal Raman signal 160-*h* and the horizontal probe beam 120*pr-h* may be determined from the expression $\Delta\phi_h$=arctan $(Q_h/IP_h)$, where $Q_h$ and $IP_h$ are the quadrature and in-phase portions associated with the horizontal Raman signal. The phase difference $\Delta\phi_v$ between the vertical Raman signal 160-*v* and the vertical probe beam 120*pr-v* may be determined from the expression $\Delta\phi_h$=arctan $(Q_v/IP_v)$, where $Q_v$ and $IP_v$ are the quadrature and in-phase portions associated with the vertical Raman signal.

An optical receiver 200 may include one or more detectors 220. An optical receiver 200 may include one detector 220 (e.g., as illustrated in FIGS. 1, 2, and 18), or an optical receiver 200 may include multiple detectors 220 (e.g., as illustrated in FIGS. 17, 36, 38, and 39). An optical receiver 200 with multiple detectors 220 may include 2, 3, 4, 8, 16, or any other suitable number of detectors. For example, an optical receiver 200 may include two detectors 220 arranged so that their respective photocurrents are subtracted (e.g., as illustrated in FIG. 36). As another example, an optical receiver 200 may include four detectors 220 (e.g., as illustrated in FIG. 38) or eight detectors 220 (e.g., as illustrated in FIG. 39). In an optical receiver 200 with multiple detectors 220, portions of a probe beam 120*pr* and a Raman signal 160 may be coherently mixed together at one or more of the multiple detectors 220, and each of these one or more detectors may produce a photocurrent signal i corresponding to the coherent mixing of the probe beam and the Raman signal. Any of the optical receivers 200 described herein as having a single detector 220 may also be configured to have two or more detectors. For example, the optical receiver in FIG. 1 (which includes one detector 220) may include a second detector (not illustrated in FIG. 1), and the detection electronics 230 may be configured to receive and process photocurrent signals from each of the two detectors.

Figure 40:
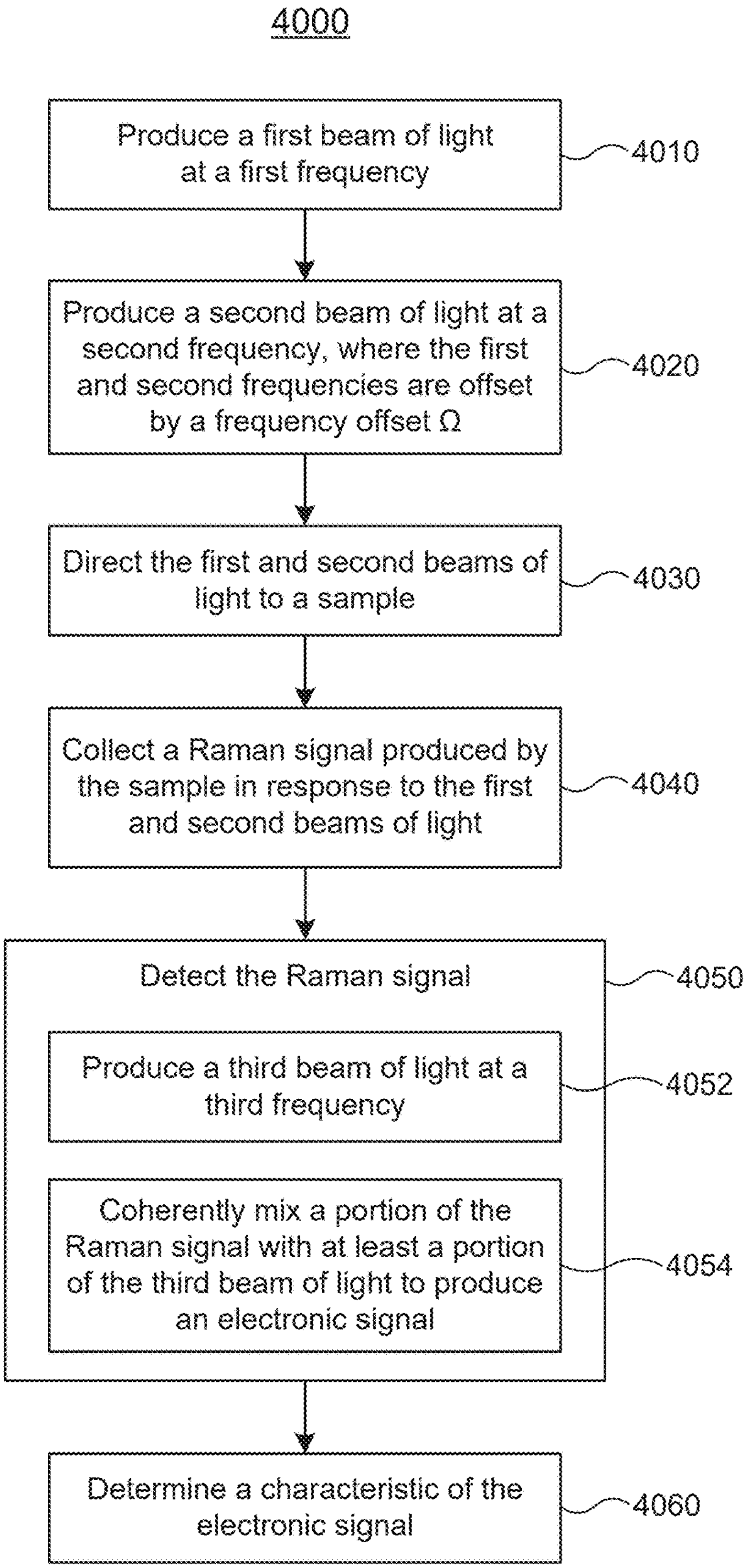
FIG. 40 illustrates an example method for measuring a Raman signal.

FIG. 40 illustrates an example method 4000 for measuring a Raman signal 160. The method may be performed by a Raman spectroscopy system as described herein. For example, the method may be performed by the Raman spectroscopy system 100 illustrated in FIG. 1 or 2 and may be used to measure a Raman signal 160. The method may begin at step 4010 by producing a first beam of light at a first frequency ($v_1$). At step 4020, a second beam of light at a second frequency ($v_2$) is produced. The first beam of light may be referred to as a pump beam of light 120*pu*, and the second beam of light may be referred to as a Stokes beam of light 120S. The first and second frequencies may be offset by a frequency offset $\Omega$, where $\Omega=v_1-v_2$. For example, the first and second frequencies may each correspond to a wavelength between approximately 300 nm and approximately 5,000 nm, and the frequency offset $\Omega$ may be between approximately 5 THz and approximately 100 THz. The first and second beams of light may each be produced by a light source that includes one or more laser diodes, where each laser diode is a fixed-wavelength laser diode or a wavelength-tunable laser diode.

At step 4030, the first and second beams of light are directed to a sample 150, and at step 4040, a Raman signal 160 is collected, where the Raman signal is produced by the sample in response to the first and second beams of light. For example, the Raman signal may be produced by coherent Raman scattering of the first and second beams of light within the sample. The first and second beams of light may be directed to the sample by one or more optical elements that include a free-space optical element, an optical fiber, or an optical waveguide. Similarly, one or more optical elements (which may include a free-space optic, an optical fiber, or an optical waveguide) may collect the Raman signal and direct the Raman signal to an optical receiver.

At step 4050, the Raman signal is detected. Detection of the Raman signal 160, which may be performed by an optical receiver 200, includes steps 4052 and 4054. At step 4052, a third beam of light at a third frequency $v_3$ is produced. The third beam of light (which may be referred to as a probe beam of light 120*pr*) may be produced by a wavelength-tunable laser, where the third frequency is adjustable by changing a wavelength of light produced by the wavelength-tunable laser. At step 4054, a portion of the Raman signal is coherently mixed with at least a portion of the third beam of light to produce an electronic signal (e.g., a photocurrent signal i). The Raman signal and the third beam of light may be coherently mixed at a detector of an optical receiver. The portion of the Raman signal that is coherently mixed with the third beam of light may include optical frequency components of the Raman signal that are within a particular frequency range of the third frequency, and the particular frequency range may depend on the electronic bandwidth of the detector. For example, the particular frequency range may extend from approximately $v_3-\Delta f$ to approximately $v_3+\Delta f$, where $v_3$ is the third frequency, and $\Delta f$ is the electronic bandwidth of the detector.

At step 4060, a characteristic of the electronic signal is determined, at which point the method may end. For example, a processor may receive a digital signal corresponding to the electronic signal, and the processor may determine the characteristic of the electronic signal based on the digital signal. The characteristic of the electronic signal may be associated with the Raman signal 160 and may include a peak amplitude, an average amplitude, an amplitude at a particular frequency, an amplitude at a particular time, an amplitude at a frequency center, an amplitude at a temporal center, an area, a frequency, a phase, or a polarization. Additionally, the characteristic of the electronic signal may be associated with a Raman shift at a frequency $v_1-v_3$, where $v_1$ is the first frequency, and $v_3$ is the third frequency. Based on one or more determined signal characteristics 162, a processor may determine (i) whether a particular material is present in a sample or (ii) an amount or a concentration of the particular material in the sample.

Various example aspects directed to a Raman spectroscopy system are described below.

Aspect 1. A system comprising: a first light source configured to produce a first beam of light at a first frequency; a second light source configured to produce a second beam of light at a second frequency, wherein the first and second frequencies are offset by a frequency offset Q; one or more optical elements configured to: direct the first and second beams of light to a sample; and collect a Raman signal produced by the sample in response to the first and second beams of light; an optical receiver configured to detect the Raman signal, the optical receiver comprising: a third light source configured to produce a third beam of light at a third frequency, wherein the third light source comprises a wavelength-tunable laser, wherein the third frequency is adjustable by changing a wavelength of light produced by the wavelength-tunable laser; and an optical detector configured to coherently mix a portion of the Raman signal with at least a portion of the third beam of light to produce an electronic signal; and a processor configured to determine a characteristic of the electronic signal.

Aspect 2. The system of aspect 1, wherein: the third frequency is $v_3$; the third light source is further configured to change the frequency of the third beam of light by a frequency change ΔF to a frequency $v_3+\Delta F$; the detector is further configured to coherently mix another portion of the Raman signal with at least a portion of the third beam of light at the frequency $v_3+\Delta F$ to produce another electronic signal; and the processor is further configured to determine a characteristic of the another electronic signal.

Aspect 3. The system of aspect 2, wherein: the characteristic of the electronic signal is associated with a Raman shift at a frequency $v_1-v_3$, wherein $v_1$ is the first frequency; and the characteristic of the another electronic signal is associated with another Raman shift at a frequency $v_1$-($v_3$+ΔF).

Aspect 4. The system of aspect 2, wherein the frequency change ΔF is between approximately 10 megahertz (MHz) and approximately 10 gigahertz (GHz).

Aspect 5. The system of aspect 1, wherein: the frequency offset Ω is approximately equal to a vibrational frequency of a particular material; and the processor is further configured to determine an amount or a concentration of the particular material in the sample based on the characteristic of the electronic signal.

Aspect 6. The system of aspect 1, wherein the frequency offset Ω is between approximately 5 terahertz (THz) and approximately 100 THz.

Aspect 7. The system of aspect 1, wherein the first light source or the second light source comprises a wavelength-tunable laser, wherein the frequency offset Ω is adjustable by changing a wavelength of the wavelength-tunable laser.

Aspect 8. The system of aspect 1, wherein the first light source or the second light source comprises two or more fixed-wavelength lasers, each of the fixed-wavelength lasers having a different operating wavelength, wherein the frequency offset Ω is adjustable by selecting one of the fixed-wavelength lasers for operation.

Aspect 9. The system of aspect 1, wherein: the frequency offset Ω is a first frequency offset $\Omega_1$, and the Raman signal is a first Raman signal; subsequent to the optical receiver detecting the first Raman signal: the first light source is further configured to change the first frequency to produce a second frequency offset $\Omega_2$ different from the first frequency offset $\Omega_1$; and the optical receiver is further configured to detect a second Raman signal produced by the sample in response to the first and second beams of light with the second frequency offset $\Omega_2$, wherein the detector is configured to coherently mix a portion of the second Raman signal with at least a portion of the third beam of light to produce a second electronic signal; and the processor is further configured to determine a characteristic of the second electronic signal.

Aspect 10. The system of aspect 1, wherein: the frequency offset Ω is a first frequency offset $\Omega_1$, and the Raman signal is a first Raman signal; subsequent to the optical receiver detecting the first Raman signal: the second light source is further configured to change the second frequency to a new second frequency to produce a second frequency offset $\Omega_2$ different from the first frequency offset $\Omega_1$; the third light source is further configured to change the third frequency to a new third frequency, wherein the new third frequency is within 200 GHz of the new second frequency; and the optical receiver is further configured to detect a second Raman signal produced by the sample in response to the first and second beams of light with the second frequency offset $\Omega_2$, wherein the detector is configured to coherently mix a portion of the second Raman signal with at least a portion of the third beam of light to produce a second electronic signal; and the processor is further configured to determine a characteristic of the second electronic signal.

Aspect 11. The system of aspect 1, wherein the wavelength of light produced by the wavelength-tunable laser is adjustable over a wavelength range having a width between approximately 10 nanometers (nm) and approximately 100 nm.

Aspect 12. The system of aspect 1, wherein the wavelength-tunable laser comprises a wavelength-tunable laser diode having a wavelength-tuning range with a width between approximately 10 nanometers (nm) and approximately 100 nm.

Aspect 13. The system of aspect 1, wherein the wavelength-tunable laser comprises a sampled-grating distributed Bragg reflector (SG-DBR) laser.

Aspect 14. The system of aspect 1, wherein the wavelength of light produced by the wavelength-tunable laser is between approximately 1490 nanometers (nm) and approximately 1570 nm.

Aspect 15. The system of aspect 1, wherein the wavelength of light produced by the wavelength-tunable laser is between approximately 1000 nanometers (nm) and approximately 1100 nm.

Aspect 16. The system of aspect 1, wherein the third light source comprises: two or more laser diodes, wherein each of the laser diodes is a fixed-wavelength laser diode or a wavelength-tunable laser diode; and an optical multiplexer configured to combine light produced by each of the laser diodes into a single output beam of light.

Aspect 17. The system of aspect 16, wherein the third light source is configured to operate only one laser diode at a time, wherein: the third light source comprises N laser diodes, wherein Nis an integer greater than or equal to 2; during a first measurement period, a first one of the N laser diodes is configured to produce light, and N−1 of the laser diodes, excluding the first one, are configured to not produce light; and during a second measurement period, a second one of the N laser diodes is configured to produce light, and N−1 of the laser diodes, excluding the second one, are configured to not produce light.

Aspect 18. The system of aspect 1, wherein the third light source comprises N wavelength-tunable laser diodes, wherein Nis an integer greater than or equal to 2, and the third light source is configured to tune over one or more wavelength ranges having a total width between (0.7) $N \cdot \Delta\lambda_{av}$ and N. $\Delta\lambda_{av}$, wherein $\Delta\lambda_{av}$ is an average wavelength-tuning range of the N laser diodes.

Aspect 19. The system of aspect 1, wherein the second frequency and the third frequency differ by greater than 100 megahertz (MHz) and less than 200 gigahertz (GHz).

Aspect 20. The system of aspect 1, wherein the first or second light source is a wavelength-tunable light source, wherein the respective first or second frequency is adjustable over a frequency range corresponding to a wavelength range having a width between approximately 10 nanometers (nm) and approximately 100 nm.

Aspect 21. The system of aspect 1, wherein the first frequency corresponds to a wavelength between approximately 1220 nanometers (nm) and approximately 1450 nm, and the second frequency corresponds to a wavelength between approximately 1490 nm and approximately 1570 nm.

Aspect 22. The system of aspect 1, wherein each of the first, second, and third beams of light has a spectral linewidth of less than 200 megahertz (MHz).

Aspect 23. The system of aspect 1, wherein one or more of the first, second, and third beams of light have a spectral linewidth of less than 1 megahertz (MHz).

Aspect 24. The system of aspect 1, wherein each of the first light source, the second light source, and the third light source comprises one or more laser diodes, wherein each laser diode is a fixed-wavelength laser diode or a wavelength-tunable laser diode.

Aspect 25. The system of aspect 1, wherein the first light source, the second light source, or the third light source comprises a seed laser configured to produce seed light and an optical amplifier configured to amplify the seed light to produce an output beam of light, wherein the optical amplifier comprises a semiconductor optical amplifier (SOA) or a fiber-optic amplifier.

Aspect 26. The system of aspect 1, wherein the portion of the Raman signal that is coherently mixed with the third beam of light comprises optical frequency components of the Raman signal within a particular frequency range of the third frequency, wherein the particular frequency range is based on an electronic bandwidth of the optical detector.

Aspect 27. The system of aspect 1, wherein the detector has an electronic bandwidth of approximately $\Delta f$, and the electronic signal produced by the detector comprises one or more electronic frequency components, each electronic frequency component having a frequency less than or equal to approximately $\Delta f$.

Aspect 28. The system of aspect 1, wherein the characteristic of the electronic signal comprises one or more of: a peak amplitude, an average amplitude, an amplitude at a particular frequency, an amplitude at a particular time, an amplitude at a frequency center, an amplitude at a temporal center, an area, a frequency, a phase, and a polarization.

Aspect 29. The system of aspect 1, wherein the frequency offset $\Omega$ equals $v_1 - v_2$, wherein $v_1$ is the first frequency, and $v_2$ is the second frequency.

Aspect 30. The system of aspect 1, wherein each of the first, second, and third frequencies corresponds to a wavelength between approximately 300 nanometers (nm) and approximately 5,000 nm.

Aspect 31. The system of aspect 1, wherein the first frequency corresponds to a wavelength between approximately 1300 nanometers (nm) and approximately 1400 nm.

Aspect 32. The system of aspect 1, wherein the first frequency corresponds to a wavelength between approximately 890 nanometers (nm) and approximately 920 nm.

Aspect 33. The system of aspect 1, wherein the first frequency corresponds to a wavelength between approximately 700 nanometers (nm) and approximately 850 nm.

Aspect 34. The system of aspect 1, wherein the third frequency corresponds to a wavelength between approximately 1500 nanometers (nm) and approximately 1600 nm.

Aspect 35. The system of aspect 1, wherein the detector has an electronic bandwidth between approximately 100 megahertz (MHz) and approximately 50 gigahertz (GHz).

Aspect 36. The system of aspect 1, wherein the first light source, the second light source, or the third light source comprises a distributed feedback (DFB) laser diode.

Aspect 37. The system of aspect 1, wherein the first light source, the second light source, or the third light source comprises a wavelength-tunable laser diode comprising an external-cavity laser diode, a thermally tuned laser diode, or a sampled-grating distributed Bragg reflector (SG-DBR) laser.

Aspect 38. The system of aspect 1, wherein the first light source, the second light source, or the third light source comprises a light-emitting diode (LED), super-luminescent light source, short-pulse laser, broadband light source, fiber laser, or solid-state laser.

Aspect 39. The system of aspect 1, wherein the Raman signal is produced by coherent Raman scattering of the first and second beams of light within the sample.

Aspect 40. The system of aspect 1, wherein the sample comprises a biological material.

Aspect 41. The system of aspect 1, wherein the sample comprises an inorganic material.

Aspect 42. The system of aspect 1, wherein the sample comprises a crystalline material.

Aspect 43. The system of aspect 1, further comprising a half-wave plate configured to rotate a polarization of the first or second beam of light prior to being directed to the sample.

Aspect 44. The system of aspect 1, further comprising a quarter-wave plate configured to convert a polarization of the first or second beam of light to a circular or elliptical polarization prior to being directed to the sample.

Aspect 45. The system of aspect 1, further comprising a half-wave plate configured to rotate a polarization of the third beam of light.

Aspect 46. The system of aspect 1, further comprising an optical filter located between the sample and the optical receiver, the optical filter configured to transmit one or more wavelengths associated with the Raman signal and block one or more wavelengths associated with the first or second beam of light.

Aspect 47. The system of aspect 1, further comprising an optical polarizer located between the sample and the optical receiver, wherein the optical polarizer is oriented to transmit light with a polarization associated with the Raman signal.

Aspect 48. A method for measuring a Raman signal, the method comprising: producing a first beam of light at a first frequency; producing a second beam of light at a second frequency, wherein the first and second frequencies are offset by a frequency offset Q; directing the first and second beams of light to a sample; collecting a Raman signal produced by the sample in response to the first and second beams of light; detecting the Raman signal, comprising: producing a third beam of light at a third frequency, wherein the third beam of light is produced by a wavelength-tunable laser, wherein the third frequency is adjustable by changing a wavelength of light produced by the wavelength-tunable laser; and coherently mixing a portion of the Raman signal with at least a portion of the third beam of light to produce an electronic signal; and determining a characteristic of the electronic signal.

Aspect 50. One or more computer-readable non-transitory storage media embodying software that is operable when executed to: produce a first beam of light at a first frequency; produce a second beam of light at a second frequency, wherein the first and second frequencies are offset by a frequency offset Ω; direct the first and second beams of light to a sample; collect a Raman signal produced by the sample in response to the first and second beams of light; detect the Raman signal, comprising: produce a third beam of light at a third frequency, wherein the third beam of light is produced by a wavelength-tunable laser, wherein the third frequency is adjustable by changing a wavelength of light produced by the wavelength-tunable laser; and coherently mix a portion of the Raman signal with at least a portion of the third beam of light to produce an electronic signal; and determine a characteristic of the electronic signal.

Various example aspects directed to another Raman spectroscopy system are described below.

Aspect 1. A system comprising: a first light source configured to produce a first beam of light at a first frequency; a second light source configured to produce a second beam of light at a second frequency, wherein the first and second frequencies are offset by a frequency offset Q; one or more optical elements configured to: direct the first and second beams of light to a sample; and collect a Raman signal produced by coherent Raman scattering of the first and second beams of light within the sample; an optical receiver configured to detect the Raman signal, the optical receiver comprising: a third light source configured to produce a third beam of light at a third frequency; and an optical detector configured to coherently mix a portion of the Raman signal with at least a portion of the third beam of light to produce an electronic signal, wherein the portion of the Raman signal that is coherently mixed with the third beam of light comprises optical frequency components of the Raman signal within a particular frequency range of the third frequency, wherein the particular frequency range is based on an electronic bandwidth of the detector; and a processor configured to determine a characteristic of the electronic signal.

Aspect 2. The system of aspect 1, wherein the particular frequency range extends from approximately $v_3-\Delta f$ to approximately $v_3+\Delta f$, wherein $v_3$ is the third frequency, and $\Delta f$ is the electronic bandwidth of the detector.

Aspect 3. The system of aspect 1, wherein the electronic signal produced by the detector comprises one or more electronic frequency components, each electronic frequency component having a frequency less than or equal to $\Delta f$, wherein $\Delta f$ is the electronic bandwidth of the detector.

Aspect 4. The system of aspect 1, wherein the detector has an electronic bandwidth between approximately 100 megahertz (MHz) and approximately 10 gigahertz (GHz).

Aspect 5. The system of aspect 1, wherein the electronic signal comprises one or more electronic frequency components less than or equal to approximately 10 gigahertz (GHz).

Aspect 6. The system of aspect 1, wherein the detector comprises a PN photodiode, PIN photodiode, avalanche photodiode (APD), single-photon avalanche diode (SPAD), silicon photomultiplier (SiPM), or photomultiplier tube (PMT).

Aspect 7. The system of aspect 1, wherein: the electronic signal comprises a photocurrent signal produced by the detector; and the optical receiver further comprises: an electronic amplifier configured to amplify the photocurrent signal to produce a voltage signal corresponding to the photocurrent signal; and a digitizer configured to produce a digital representation of the voltage signal.

Aspect 8. The system of aspect 7, wherein the processor is configured to determine the characteristic of the electronic signal based on the digital representation of the voltage signal, wherein the characteristic of the electronic signal comprises one or more of: a peak amplitude, an average amplitude, an amplitude at a particular frequency, an amplitude at a particular time, an amplitude at a frequency center, an amplitude at a temporal center, an area, a frequency, a phase, and a polarization.

Aspect 9. The system of aspect 7, wherein the voltage signal is a time-domain signal, and the processor is further configured to determine a Fourier transform of the digital representation of the voltage signal to determine a frequency-domain representation of the voltage signal.

Aspect 10. The system of aspect 1, wherein the processor is further configured to associate a Raman frequency shift with the determined characteristic of the electronic signal, wherein the Raman frequency shift equals $v_1-v_3$, wherein $v_1$ is the first frequency, and $v_3$ is the third frequency.

Aspect 11. The system of aspect 1, wherein the electronic signal comprises a photocurrent signal corresponding to the coherent mixing of the portion of the Raman signal and the third beam of light.

Aspect 12. The system of aspect 1, wherein the electronic signal comprises a coherent-mixing term that is proportional to a product of (i) an amplitude of an electric field of the Raman signal and (ii) an amplitude of an electric field of the third beam of light.

Aspect 13. The system of aspect 12, wherein the coherent-mixing term is proportional to $E_R \cdot E_3 \cdot \cos[2\pi(v_R-v_3)t+\Delta\phi]$, wherein: $E_R$ is the amplitude of the electric field of the Raman signal; $E_3$ is the amplitude of the electric field of the third beam of light; $v_R$ is a frequency of the electric field of the Raman signal; $v_3$ is a frequency of the electric field of the third beam of light; and $\Delta\phi$ is a phase difference between the electric field of the Raman signal and the electric field of the third beam of light.

Aspect 14. The system of aspect 1, wherein the first, second, or third light source is a wavelength-tunable light source, wherein the first, second, or third frequency is adjustable over a frequency range corresponding to a wavelength range having a width between approximately 10 nanometers (nm) and approximately 100 nm.

Aspect 15. The system of aspect 1, wherein the second frequency and the third frequency differ by greater than 100 megahertz (MHz) and less than 200 gigahertz (GHz).

Aspect 16. The system of aspect 1, wherein: the third frequency is $v_3$; the third light source is further configured to change the frequency of the third beam of light by a frequency change $\Delta F$ to a frequency $v_3+\Delta F$; the detector is further configured to coherently mix another portion of the Raman signal with at least a portion of the third beam of light at the frequency $v_3+\Delta F$ to produce another electronic signal; and the processor is further configured to determine a characteristic of the another electronic signal.

Aspect 17. The system of aspect 1, wherein: the third light source comprises a wavelength-tunable laser, wherein the third light source is further configured to sequentially change the frequency of the third beam of light to a plurality of different frequencies; the detector is further configured to coherently mix another portion of the Raman signal with at least a portion of one of the different frequencies of the third beam of light to produce a corresponding one of a plurality of electronic signals; and the processor is further configured to determine a characteristic of each of the plurality of electronic signals.

Aspect 18. The system of aspect 17, wherein the processor is further configured to determine, based on the determined characteristics of the electronic signals, (i) whether a particular material is present in the sample or (ii) an amount or a concentration of the particular material in the sample.

Aspect 19. The system of aspect 17, wherein each of the different frequencies to which the third light source is changed is offset from an adjacent one of the different frequencies by between approximately 10 megahertz (MHz) and approximately 10 gigahertz (GHz).

Aspect 20. The system of aspect 17, wherein the processor is further configured to determine a Raman spectrum based on the determined characteristics of the electronic signals.

Aspect 21. The system of aspect 20, wherein: the frequency offset $\Omega$ is approximately equal to a vibrational frequency of a particular material; and the processor is further configured to determine an amount or a concentration of the particular material in the sample based on the determined Raman spectrum.

Aspect 22. The system of aspect 1, wherein the first light source or the second light source comprises a wavelength-tunable laser, wherein the frequency offset $\Omega$ is adjustable by changing a wavelength of the wavelength-tunable laser.

Aspect 23. The system of aspect 1, wherein the frequency offset $\Omega$ is between approximately 5 terahertz (THz) and approximately 100 THz.

Aspect 24. The system of aspect 1, wherein the frequency offset $\Omega$ is approximately equal to a vibrational frequency of a particular material.

Aspect 25. The system of aspect 24, wherein the processor is further configured to determine whether the particular material is present in the sample based on the characteristic of the electronic signal.

Aspect 26. The system of aspect 24, wherein the processor is further configured to determine an amount or a concentration of the particular material in the sample based on the characteristic of the electronic signal.

Aspect 27. The system of aspect 1, wherein the Raman signal is an optical signal having a spectral linewidth between approximately 30 gigahertz (GHz) and approximately 300 GHz.

Aspect 28. The system of aspect 1, wherein the Raman signal is an optical signal having a center frequency approximately equal to $2v_1-v_2$, wherein $v_1$ is the first frequency, and $v_2$ is the second frequency.

Aspect 29. The system of aspect 1, wherein the Raman signal is an optical signal having a center frequency within 200 gigahertz (GHz) of the first frequency or the second frequency.

Aspect 30. The system of aspect 1, wherein: the optical receiver is further configured to detect residual light from the first beam of light after the first beam of light has interacted with the sample, wherein the optical receiver further comprises: a fourth light source configured to produce a fourth beam of light at a fourth frequency, wherein the fourth frequency is within 50 GHz of the first frequency; and an additional optical detector configured to coherently mix at least a portion of the residual light with at least a portion of the fourth beam of light to produce an additional electronic signal; and the processor is further configured to determine a characteristic of the additional electronic signal.

Aspect 31. A method for measuring a Raman signal, the method comprising: producing a first beam of light at a first frequency; producing a second beam of light at a second frequency, wherein the first and second frequencies are offset by a frequency offset Q; directing the first and second beams of light to a sample; collecting a Raman signal produced by coherent Raman scattering of the first and second beams of light within the sample; detecting the Raman signal, comprising: producing a third beam of light at a third frequency; and coherently mixing, by an optical detector, a portion of the Raman signal with at least a portion of the third beam of light to produce an electronic signal, wherein the portion of the Raman signal that is coherently mixed with the third beam of light comprises optical frequency components of the Raman signal within a particular frequency range of the third frequency, wherein the particular frequency range is based on an electronic bandwidth of the detector; and determining a characteristic of the electronic signal.

Aspect 32. One or more computer-readable non-transitory storage media embodying software that is operable when executed to: produce a first beam of light at a first frequency; produce a second beam of light at a second frequency, wherein the first and second frequencies are offset by a frequency offset $\Omega$; direct the first and second beams of light to a sample; collect a Raman signal produced by coherent Raman scattering of the first and second beams of light within the sample; detect the Raman signal, comprising: produce a third beam of light at a third frequency; and coherently mix, by an optical detector, a portion of the Raman signal with at least a portion of the third beam of light to produce an electronic signal, wherein the portion of the Raman signal that is coherently mixed with the third beam of light comprises optical frequency components of the Raman signal within a particular frequency range of the third frequency, wherein the particular frequency range is based on an electronic bandwidth of the detector; and determine a characteristic of the electronic signal.

Various example aspects directed to another Raman spectroscopy system are described below.

Aspect 1. A system comprising: a first light source configured to produce a first beam of light at a first frequency; a second light source configured to produce a second beam of light at a second frequency, wherein the first and second frequencies are offset by a frequency offset Q; one or more optical elements configured to: direct the first and second beams of light to a sample; and collect a Raman signal produced by the sample in response to the first and second beams of light; an optical receiver configured to detect the Raman signal, the optical receiver comprising: a third light source configured to produce a third beam of light at a third frequency; and one or more optical detectors, wherein each detector is configured to coherently mix a portion of the Raman signal with at least a portion of the third beam of light to produce an electronic signal; and a processor configured to determine a characteristic of the electronic signal.

Aspect 2. The system of aspect 1, wherein the processor is further configured to determine a phase difference between the Raman signal and the third beam of light.

Aspect 3. The system of aspect 1, wherein the processor is further configured to determine an in-phase portion and a quadrature portion associated with the Raman signal.

Aspect 4. The system of aspect 1, wherein the optical receiver further comprises a 90-degree optical hybrid configured to: combine the Raman signal with the third beam of light to produce four combined beams, the four combined beams comprising two in-phase combined beams and two quadrature combined beams, wherein each combined beam comprises a portion of the Raman signal and a portion of the third beam of light; and direct each of the combined beams to one of four detectors of the optical receiver.

Aspect 5. The system of aspect 4, wherein: prior to combining the Raman signal with the third beam of light, the 90-degree optical hybrid is configured to split the Raman signal or the third beam of light into a first part and a second part; and the 90-degree optical hybrid comprises a phase shifter configured to impart a 90-degree phase change to the first part with respect to the second part. Aspect 6. The system of aspect 4, wherein: the four detectors are each configured to coherently mix the portion of the Raman signal and the portion of the third beam of light to produce one of four electronic signals; and the processor is further configured to determine a phase difference between the Raman signal and the third beam of light.

Aspect 7. The system of aspect 1, wherein the processor is further configured to determine a polarization of the Raman signal.

Aspect 8. The system of aspect 1, wherein the optical receiver further comprises: a Raman-signal polarization beamsplitter configured to split the Raman signal into a horizontal-polarization Raman signal and a vertical-polarization Raman signal; a third-beam polarization beamsplitter configured to split the third beam into a horizontal-polarization third beam and a vertical-polarization third beam; a horizontal-polarization optical receiver comprising one or more of the optical detectors, wherein each detector is configured to coherently mix at least a portion of the horizontal-polarization Raman signal and horizontal-polarization third beam to produce a horizontal-polarization electronic signal; and a vertical-polarization optical receiver comprising another one or more of the optical detectors, wherein each detector is configured to coherently mix at least a portion of the vertical-polarization Raman signal and vertical-polarization third beam to produce a vertical-polarization electronic signal.

Aspect 9. The system of aspect 8, wherein determining the characteristic of the electronic signal comprises determining one or more characteristics of the horizontal-polarization and vertical-polarization electronic signals.

Aspect 10. The system of aspect 9, wherein the processor is further configured to determine a polarization of the Raman signal based on the characteristics of the horizontal-polarization and vertical-polarization electronic signals.

Aspect 11. The system of aspect 8, wherein: the horizontal-polarization optical receiver comprises: four optical detectors; and a first 90-degree optical hybrid configured to: combine the horizontal-polarization Raman signal with the horizontal-polarization third beam to produce four combined horizontal-polarization beams, each combined horizontal-polarization beam comprising a portion of the horizontal-polarization Raman signal and a portion of the horizontal-polarization third beam; and direct each of the combined horizontal-polarization beams to one of the four detectors; and the vertical-polarization optical receiver comprises: another four optical detectors; and a second 90-degree optical hybrid configured to: combine the vertical-polarization Raman signal with the vertical-polarization third beam to produce four combined vertical-polarization beams, each combined vertical-polarization beam comprising a portion of the vertical-polarization Raman signal and a portion of the vertical-polarization third beam; and direct each of the combined vertical-polarization beams to one of the another four optical detectors.

Aspect 12. The system of aspect 11, wherein: the four detectors of the horizontal-polarization optical receiver are each configured to coherently mix the portion of the horizontal-polarization Raman signal and the portion of the horizontal-polarization third beam to produce one of four horizontal-polarization electronic signals; the four detectors of the vertical-polarization optical receiver are each configured to coherently mix the portion of the vertical-polarization Raman signal and the portion of the vertical-polarization third beam to produce one of four vertical-polarization electronic signals; and based on the four horizontal-polarization electronic signals and the four vertical-polarization electronic signals, the processor is further configured to determine (i) a polarization of the Raman signal and (ii) a phase difference between the Raman signal and the third beam of light.

Aspect 13. The system of aspect 1, wherein the optical elements comprise an optical combiner configured to combine the first and second beams of light to produce a combined beam that is directed to the sample.

Aspect 14. The system of aspect 13, wherein the optical combiner is part of a photonic integrated circuit (PIC), wherein the first and second beams of light are combined into an optical waveguide of the PIC.

Aspect 15. The system of aspect 13, wherein the optical combiner is a fiber-optic combiner, wherein the first and second beams of light are combined into an optical fiber.

Aspect 16. The system of aspect 1, wherein the optical receiver further comprises an optical combiner configured to combine the Raman signal and the third beam of light to produce one or more combined beams that are each directed to one of the optical detectors.

Aspect 17. The system of aspect 16, wherein the optical combiner is part of a photonic integrated circuit (PIC), wherein the portion of the Raman signal and the portion of the third beam of light are combined into an optical waveguide of the PIC.

Aspect 18. The system of aspect 16, wherein the optical combiner is a fiber-optic combiner, wherein the portion of the Raman signal and the portion of the third beam of light are combined into an optical fiber.

Aspect 19. The system of aspect 1, wherein the optical elements comprise a photonic integrated circuit (PIC) comprising one or more optical waveguides, wherein: one or more optical waveguides are configured to direct the first and second beams of light to the sample; and one or more other optical waveguides are configured to direct the Raman signal and the third beam of light to the one or more of the detectors.

Aspect 20. The system of aspect 1, wherein the first, second, or third light source is a wavelength-tunable light source, wherein the first, second, or third frequency is adjustable over a frequency range corresponding to a wavelength range having a width between approximately 10 nanometers (nm) and approximately 100 nm.

Aspect 21. The system of aspect 1, wherein the frequency offset Ω is between approximately 5 terahertz (THz) and approximately 100 THz.

Aspect 22. The system of aspect 1, wherein: the frequency offset Ω is approximately equal to a vibrational frequency of a particular material; and the processor is further configured to determine, based on the characteristic of the electronic signal, (i) whether the particular material is present in the sample or (ii) an amount or a concentration of the particular material in the sample.

Aspect 23. The system of aspect 1, wherein: the electronic signal comprises a photocurrent signal produced by the detector; and the optical receiver further comprises: an electronic amplifier configured to amplify the photocurrent signal to produce a voltage signal corresponding to the photocurrent signal; and a digitizer configured to produce a digital representation of the voltage signal.

Aspect 24. The system of aspect 23, wherein the processor is configured to determine the characteristic of the electronic signal based on the digital representation of the voltage signal, wherein the characteristic of the electronic signal comprises one or more of: a peak amplitude, an average amplitude, an amplitude at a particular frequency, an amplitude at a particular time, an amplitude at a frequency center, an amplitude at a temporal center, an area, a frequency, a phase, and a polarization.

Aspect 25. The system of aspect 1, wherein each detector has an electronic bandwidth of approximately Δf, and the electronic signal produced by each detector comprises one or more electronic frequency components, each electronic frequency component having a frequency less than or equal to Δf.

Aspect 26. The system of aspect 1, wherein the one or more detectors comprise a PN photodiode, PIN photodiode, avalanche photodiode (APD), single-photon avalanche diode (SPAD), silicon photomultiplier (SiPM), or photomultiplier tube (PMT).

Aspect 27. A method for measuring a Raman signal, the method comprising: producing a first beam of light at a first frequency; producing a second beam of light at a second frequency, wherein the first and second frequencies are offset by a frequency offset Ω; directing the first and second beams of light to a sample; collecting a Raman signal produced by the sample in response to the first and second beams of light; detecting the Raman signal, comprising: producing a third beam of light at a third frequency; and coherently mixing a portion of the Raman signal with at least a portion of the third beam of light to produce an electronic signal; and determining a characteristic of the electronic signal.

Aspect 28. One or more computer-readable non-transitory storage media embodying software that is operable when executed to: produce a first beam of light at a first frequency; produce a second beam of light at a second frequency, wherein the first and second frequencies are offset by a frequency offset Q; direct the first and second beams of light to a sample; collect a Raman signal produced by the sample in response to the first and second beams of light; detect the Raman signal, comprising: produce a third beam of light at a third frequency; and coherently mix a portion of the Raman signal with at least a portion of the third beam of light to produce an electronic signal; and determine a characteristic of the electronic signal.

Various example aspects directed to another Raman spectroscopy system are described below.

Aspect 1. A system comprising: a pump light source configured to produce a pump beam of light at a pump frequency; one or more optical elements configured to: direct the pump beam to a sample; and collect a Raman signal produced by the sample in response to the pump beam, wherein the Raman signal is produced by spontaneous Raman scattering of the pump beam within the sample; an optical receiver configured to detect the Raman signal, the optical receiver comprising: a probe light source configured to produce a probe beam of light at a probe frequency; and one or more optical detectors, wherein each detector is configured to coherently mix a portion of the Raman signal with at least a portion of the probe beam of light to produce an electronic signal; and a processor configured to determine a characteristic of the electronic signal.

Aspect 2. The system of aspect 1, wherein the probe light source comprises a wavelength-tunable laser configured to tune the probe frequency of the probe beam of light to a plurality of frequencies across at least a portion of the Raman signal.

Figure 41:
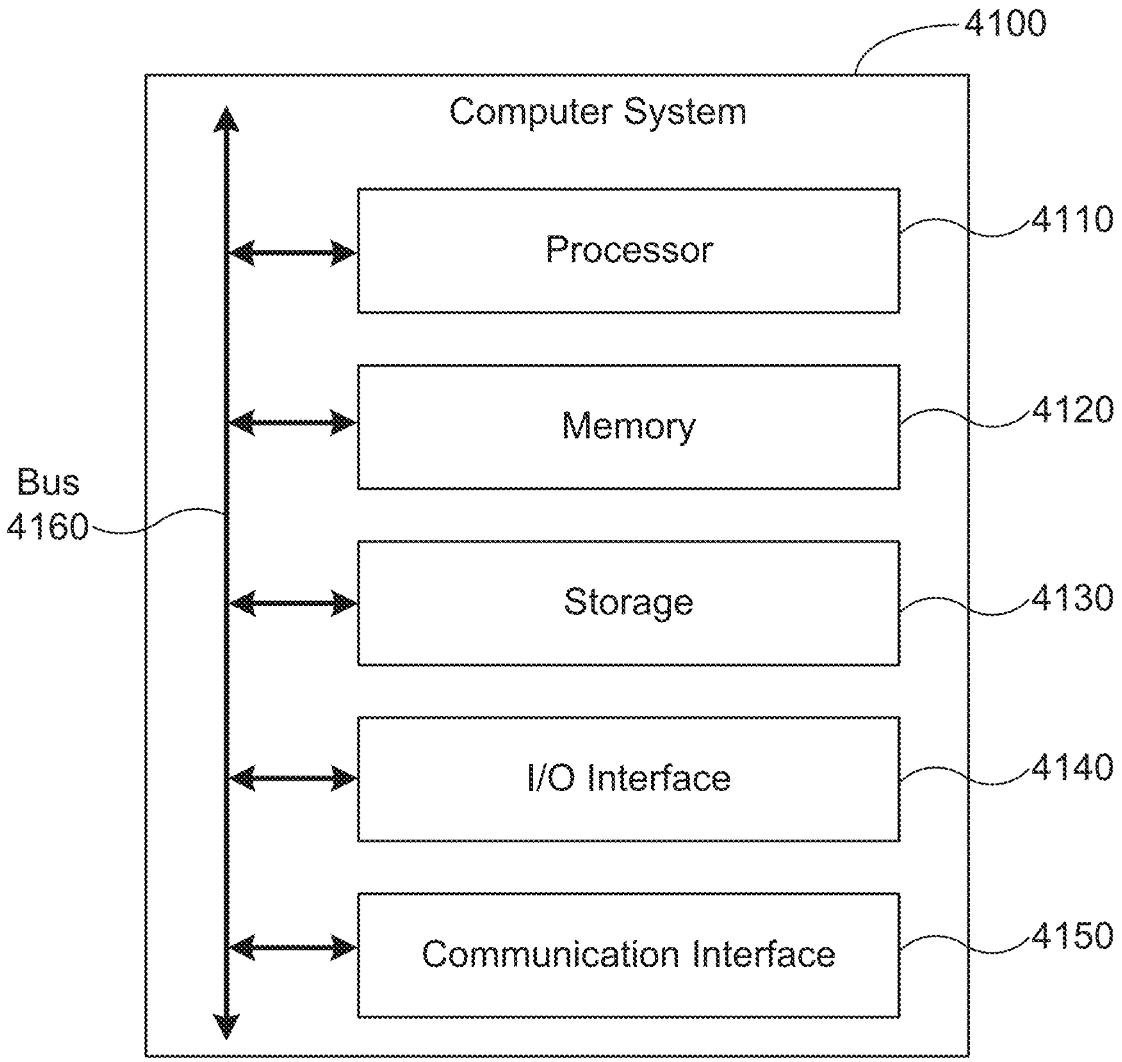
FIG. 41 illustrates an example computer system.

FIG. 41 illustrates an example computer system 4100. One or more computer systems 4100 may perform one or more steps of one or more methods described or illustrated herein. One or more computer systems 4100 may provide functionality described or illustrated herein. Software running on one or more computer systems 4100 may perform one or more steps of one or more methods described or illustrated herein or may provide functionality described or illustrated herein. A computer system may include or may be referred to as a processor, a controller, a computing device, a computing system, a computer, or a data-processing apparatus. Herein, reference to a computer system may encompass one or more computer systems, where appropriate.

Computer system 4100 may take any suitable physical form. As an example, computer system 4100 may be an embedded computer system, a system-on-chip (SOC), an application-specific integrated circuit (ASIC), a field-programmable gate array (FPGA), a single-board computer system (SBC), a desktop computer system, a laptop or notebook computer system, a graphics processing unit (GPU), a mainframe, a mesh of computer systems, a server, a tablet computer system, or any suitable combination of two or more of these. As another example, all or part of computer system 4100 may be combined with, coupled to, or integrated into a variety of devices, including, but not limited to, a medical device, wearable device, camera, camcorder, personal digital assistant (PDA), mobile telephone, smartphone, electronic reading device (e.g., an e-reader), game console, smart watch, clock, calculator, television monitor, flat-panel display, computer monitor, eyewear, or head-mounted display. Where appropriate, computer system 4100 may include one or more computer systems 4100; be unitary or distributed; span multiple locations; span multiple machines; span multiple data centers; or reside in a cloud, which may include one or more cloud components in one or more networks. Where appropriate, one or more computer systems 4100 may perform without substantial spatial or temporal limitation one or more steps of one or more methods described or illustrated herein. As an example, one or more computer systems 4100 may perform in real time or in batch mode one or more steps of one or more methods described or illustrated herein. One or more computer systems 4100 may perform at different times or at different locations one or more steps of one or more methods described or illustrated herein, where appropriate.

As illustrated in the example of FIG. 41, computer system 4100 may include a processor 4110, memory 4120, storage 4130, an input/output (I/O) interface 4140, a communication interface 4150, or a bus 4160. Computer system 4100 may include any suitable number of any suitable components in any suitable arrangement.

Processor 4110 may include hardware for executing instructions, such as those making up a computer program. As an example, to execute instructions, processor 4110 may retrieve (or fetch) the instructions from an internal register, an internal cache, memory 4120, or storage 4130; decode and execute them; and then write one or more results to an internal register, an internal cache, memory 4120, or storage 4130. A processor 4110 may include one or more internal caches for data, instructions, or addresses. A processor 4110 may include one or more internal registers for data, instructions, or addresses. Processor 4110 may include any suitable number of any suitable internal registers, where appropriate. Where appropriate, processor 4110 may include one or more arithmetic logic units (ALUs); may be a multi-core processor; or may include one or more processors 4110.

Memory 4120 may include main memory for storing instructions for processor 4110 to execute or data for processor 4110 to operate on. As an example, computer system 4100 may load instructions from storage 4130 or another source (such as, for example, another computer system 4100) to memory 4120. Processor 4110 may then load the instructions from memory 4120 to an internal register or internal cache. To execute the instructions, processor 4110 may retrieve the instructions from the internal register or internal cache and decode them. During or after execution of the instructions, processor 4110 may write one or more results (which may be intermediate or final results) to the internal register or internal cache. Processor 4110 may then write one or more of those results to memory 4120. One or more memory buses (which may each include an address bus and a data bus) may couple processor 4110 to memory 4120. Bus 4160 may include one or more memory buses. Memory 4120 may include random access memory (RAM). This RAM may be volatile memory, where appropriate. Where appropriate, this RAM may be dynamic RAM (DRAM) or static RAM (SRAM). Memory 4120 may include one or more memories 4120, where appropriate.

Storage 4130 may include mass storage for data or instructions. As an example, storage 4130 may include a hard disk drive (HDD), a floppy disk drive, flash memory, an optical disc, a magneto-optical disc, magnetic tape, or a Universal Serial Bus (USB) drive or a combination of two or more of these. Storage 4130 may include removable or non-removable (or fixed) media, where appropriate. Storage 4130 may be internal or external to computer system 4100, where appropriate. Storage 4130 may be non-volatile, solid-state memory. Storage 4130 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 4130 may include one or more storage control units facilitating communication between processor 4110 and storage 4130, where appropriate. Where appropriate, storage 4130 may include one or more storages 4130.

I/O interface 4140 may include hardware, software, or both, providing one or more interfaces for communication between computer system 4100 and one or more I/O devices. Computer system 4100 may include one or more of these I/O devices, where appropriate. One or more of these I/O devices may enable communication between a person and computer system 4100. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 4140 may include one or more device or software drivers enabling processor 4110 to drive one or more of these I/O devices. I/O interface 4140 may include one or more I/O interfaces 4140, where appropriate.

Communication interface 4150 may include hardware, software, or both providing one or more interfaces for communication (such as, for example, packet-based communication) between computer system 4100 and one or more other computer systems 4100 or one or more networks. As an example, communication interface 4150 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 4100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 4100 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 4100 may communicate using fiber-optic communication based on 100 Gigabit Ethernet (100 GbE), 10 Gigabit Ethernet (10 GbE), or Synchronous Optical Networking (SONET). Computer system 4100 may include any suitable communication interface 4150 for any of these networks, where appropriate. Communication interface 4150 may include one or more communication interfaces 4150, where appropriate.

Bus 4160 may include hardware, software, or both coupling components of computer system 4100 to each other. As an example, bus 4160 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 4160 may include one or more buses 4160, where appropriate.

Various modules, circuits, systems, methods, or algorithm steps described in connection with the implementations disclosed herein may be implemented as electronic hardware, computer software, or any suitable combination of hardware and software. Computer software (which may be referred to as software, computer-executable code, computer code, a computer program, computer instructions, or instructions) may be used to perform various functions described or illustrated herein, and computer software may be configured to be executed by or to control the operation of computer system 4100. As an example, computer software may include instructions configured to be executed by processor 4110. Owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

A computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, a GPU, any other suitable programmable-logic device, discrete gate or transistor logic, discrete hardware components, or any suitable combination thereof. A general-purpose processor may be a microprocessor, or, any conventional processor, controller, microcontroller, GPU, or state machine. A processor may also be implemented as a combination of computing devices, e.g., a combination of a DSP and a microprocessor, a plurality of microprocessors, one or more microprocessors in conjunction with a DSP core, or any other such configuration.

One or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. A computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), Blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

One or more of the figures described herein may include example data that is prophetic. For example, the graphs illustrated FIGS. 3-16, and 19 may include or may be referred to as prophetic examples.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B, or C" means at least one of the following: A; B; C; A and B; A and C; B and C; A, B, and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately $10^4$ s, $10^3$ s, $10^2$ s, 10 s, 1 s, 100 ms, 10 ms, 1 ms, 100 μs, 10 μs, or 1 μs. The term "substantially constant" may be applied to any suitable value, such as for example, an optical power, an electrical current, a wavelength, an optical or electrical frequency, or an optical or electrical phase.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

Various example aspects included in this disclosure may be presented in a range format. It should be understood that a description in range format is merely for convenience and brevity and should not be construed as an inflexible limitation on the scope of a disclosed aspect. Accordingly, the description of a range should be considered to have specifically disclosed all suitable sub-ranges as well as individual numerical values within that range, unless expressly indicated otherwise or indicated otherwise by context. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual values within that range, for example, 1.1, 2, 2.3, 5, and 5.9.

Although the foregoing embodiments have been described in some detail for purposes of clarity of understanding, the invention is not limited to the details provided. There may be numerous alternative ways of implementing the invention. The disclosed embodiments are illustrative and not restrictive.

The invention claimed is:

1. A system comprising:

a pump light source configured to produce a pump beam of light at a pump frequency;

a Stokes light source configured to produce a Stokes beam of light at a Stokes frequency, wherein the pump and Stokes frequencies are offset by a frequency offset Q;

one or more optical elements configured to:

direct the pump and Stokes beams of light to a sample; and collect a Raman signal produced by coherent Raman scattering of the pump and Stokes beams of light at the sample;

an optical receiver configured to detect the Raman signal, the optical receiver comprising:

a probe light source configured to produce a probe beam of light at a probe frequency, wherein the probe light source comprises a wavelength-tunable laser, wherein the probe frequency is adjustable by changing a wavelength of light produced by the wavelength-tunable laser; and an optical detector configured to coherently mix a portion of the Raman signal with at least a portion of the probe beam of light to produce a corresponding photocurrent signal; and an electronic circuit configured to produce a digital output signal corresponding to the photocurrent signal; and a processor configured to determine a characteristic of the photocurrent signal based on the digital output signal.

2. The system of claim 1, wherein:

the probe frequency is $v_3$;

the probe light source is further configured to change the frequency of probe beam of light by a frequency change ΔF to a frequency $v_3+\Delta F$;

the detector is further configured to coherently mix another portion of the Raman signal with at least a portion of the probe beam of light at the frequency $v_3+\Delta F$ to produce a second photocurrent signal;

the electronic circuit is further configured to produce a second digital output signal corresponding to the second photocurrent signal; and the processor is further configured to determine a characteristic of the second photocurrent signal based on the second digital output signal.

3. The system of claim 1, wherein:

the frequency offset Ω is approximately equal to a vibrational frequency of a particular material; and the processor is further configured to determine, based on the determined characteristic of the photocurrent signal, (i) whether the particular material is present in the sample or (ii) an amount or a concentration of the particular material in the sample.

4. The system of claim 1, wherein:

the frequency offset Ω is a first frequency offset $\Omega_1$, and the Raman signal is a first Raman signal;

subsequent to the optical receiver detecting the first Raman signal:

the pump light source is further configured to change the pump frequency to produce a second frequency offset $\Omega_2$ different from the first frequency offset $\Omega_1$;

the optical receiver is further configured to detect a second Raman signal produced by the sample in response to the pump and Stokes beams of light with the second frequency offset $\Omega_2$, wherein the detector is configured to coherently mix a portion of the second Raman signal with at least a portion of the probe beam of light to produce a second photocurrent signal; and the electronic circuit is further configured to produce a second digital output signal corresponding to the second photocurrent signal; and the processor is further configured to determine a characteristic of the second photocurrent signal based on the second digital output signal.

5. The system of claim 1, wherein:

the frequency offset Ω is a first frequency offset $\Omega_1$, and the Raman signal is a first Raman signal;

subsequent to the optical receiver detecting the first Raman signal:

the Stokes light source is further configured to change the Stokes frequency to a new Stokes frequency to produce a second frequency offset $\Omega_2$ different from the first frequency offset $\Omega_1$;

the probe light source is further configured to change the probe frequency to a new probe frequency, wherein the new probe frequency is within 200 GHz of the new Stokes frequency;

the optical receiver is further configured to detect a second Raman signal produced by the sample in response to the pump and Stokes beams of light with the second frequency offset $\Omega_2$, wherein the detector is configured to coherently mix a portion of the second Raman signal with at least a portion of the probe beam of light to produce a second photocurrent signal; and the electronic circuit is further configured to produce a second digital output signal corresponding to the second photocurrent signal; and the processor is further configured to determine a characteristic of the second photocurrent signal based on the second digital output signal.

6. The system of claim 1, wherein the pump light source or the Stokes light source comprises a wavelength-tunable laser, wherein the frequency offset Ω is adjustable by changing a wavelength of the wavelength-tunable laser.

7. The system of claim 1, wherein the pump light source or the Stokes light source comprises two or more fixed-wavelength lasers, each of the fixed-wavelength lasers having a different operating wavelength, wherein the frequency offset Ω is adjustable by selecting one of the fixed-wavelength lasers for operation.

8. The system of claim 1, wherein the wavelength-tunable laser comprises a sampled-grating distributed Bragg reflector (SG-DBR) laser.

9. The system of claim 1, wherein the probe light source comprises:

two or more laser diodes, wherein each of the laser diodes is a fixed-wavelength laser diode or a wavelength-tunable laser diode; and an optical multiplexer configured to combine light produced by each of the laser diodes into a single output beam of light.

10. The system of claim 1, wherein each of the pump light source, the Stokes light source, and the probe light source comprises one or more laser diodes, wherein each laser diode is a fixed-wavelength laser diode or a wavelength-tunable laser diode.

11. The system of claim 1, wherein the pump light source, the Stokes light source, or the probe light source comprises a seed laser configured to produce seed light and an optical amplifier configured to amplify the seed light to produce an output beam of light, wherein the optical amplifier comprises a semiconductor optical amplifier (SOA) or a fiber-optic amplifier.

12. The system of claim 1, wherein the pump light source, the Stokes light source, or the probe light source comprises a distributed feedback (DFB) laser diode.

13. The system of claim 1, wherein the pump light source, the Stokes light source, or the probe light source comprises an external-cavity laser diode, a thermally tuned laser diode, or a sampled-grating distributed Bragg reflector (SG-DBR) laser.

14. The system of claim 1, wherein the pump light source, the Stokes light source, or the probe light source comprises a light-emitting diode (LED), super-luminescent light source, short-pulse laser, broadband light source, fiber laser, or solid-state laser.

15. The system of claim 1, wherein each of the pump, Stokes, and probe frequencies corresponds to a wavelength between approximately 300 nanometers (nm) and approximately 5,000 nm.

16. The system of claim 1, wherein the pump frequency corresponds to a wavelength between approximately 1300 nanometers (nm) and approximately 1400 nm, a wavelength between approximately 890 nm and approximately 920 nm, or a wavelength between approximately 700 nm and approximately 850 nm.

17. The system of claim 1, wherein the probe frequency corresponds to a wavelength between approximately 1500 nanometers (nm) and approximately 1600 nm.

18. The system of claim 1, wherein the detector comprises a PN photodiode, PIN photodiode, avalanche photodiode (APD), single-photon avalanche diode (SPAD), silicon photomultiplier (SiPM), or photomultiplier tube (PMT).

19. The system of claim 1, wherein the detector has an electronic bandwidth between approximately 100 megahertz (MHz) and approximately 50 gigahertz (GHz).

20. The system of claim 1, wherein the portion of the Raman signal that is coherently mixed with the probe beam of light comprises optical frequency components of the Raman signal within a particular frequency range of the probe frequency, wherein the particular frequency range is based on an electronic bandwidth of the detector.

21. The system of claim 20, wherein the particular frequency range extends from approximately $V_3-\Delta f$ to approximately $V_3+\Delta f$, wherein $V_3$ is the probe frequency, and Δf is the electronic bandwidth of the detector.

22. The system of claim 1, wherein the photocurrent signal comprises a coherent- mixing term that is proportional to a product of (i) an amplitude of an electric field of the Raman signal and (ii) an amplitude of an electric field of the probe beam of light.

23. The system of claim 1, wherein the electronic circuit comprises:

an electronic amplifier configured to amplify the photocurrent signal to produce a voltage signal corresponding to the photocurrent signal; and a digitizer configured to produce a digital representation of the voltage signal, wherein the digital output signal comprises the digital representation of the voltage signal.

24. The system of claim 23, wherein the processor is configured to determine the characteristic of the photocurrent signal based on the digital representation of the voltage signal, wherein the characteristic comprises one or more of: a peak amplitude, an average amplitude, an amplitude at a particular frequency, an amplitude at a particular time, an amplitude at a frequency center, an amplitude at a temporal center, an area, a frequency, a phase, and a polarization.

25. The system of claim 23, wherein the voltage signal is a time-domain signal, and the processor is further configured to determine a Fourier transform of the digital representation of the voltage signal to determine a frequency-domain representation of the voltage signal.

26. The system of claim 1, wherein the sample comprises a biological material, an inorganic material, or a crystalline material.

27. The system of claim 1, further comprising a half-wave plate configured to rotate a polarization of the pump or Stokes beam of light prior to being directed to the sample.

28. The system of claim 1, further comprising a quarter-wave plate configured to convert a polarization of the pump or Stokes beam of light to a circular or elliptical polarization prior to being directed to the sample.

29. The system of claim 1, further comprising a half-wave plate configured to rotate a polarization of the probe beam of light.

30. The system of claim 1, further comprising an optical polarizer located between the sample and the optical receiver, wherein the optical polarizer is oriented to transmit light with a polarization associated with the Raman signal.

31. The system of claim 1, further comprising an optical filter located between the sample and the optical receiver, the optical filter configured to transmit one or more wavelengths associated with the Raman signal and block one or more wavelengths associated with the pump or Stokes beam of light.

* * * * *